United States Patent [19]

Eliason et al.

[11] Patent Number: 4,698,759
[45] Date of Patent: Oct. 6, 1987

[54] PROCESS FOR STRUCTURAL GEOLOGIC ANALYSIS OF TOPOGRAPHY AND POINT DATA

[75] Inventors: Jay R. Eliason; Valerie L. C. Eliason, both of Richland, Wash.

[73] Assignee: The United States of America as represented by the United States Department of Energy, Washington, D.C.

[21] Appl. No.: 716,981

[22] Filed: Mar. 28, 1985

[51] Int. Cl.⁴ .............................................. G01V 3/18
[52] U.S. Cl. .................................. 364/420; 324/339; 324/323; 434/153
[58] Field of Search ................. 364/420, 422; 367/38, 367/88, 73, 74, 14; 434/150, 153; 324/323, 339; 33/303, 302

[56] References Cited

U.S. PATENT DOCUMENTS

| 3,943,344 | 3/1976 | Kidode et al. | 364/420 |
| 4,068,160 | 1/1978 | Hunt | 364/420 |
| 4,357,660 | 11/1982 | Hepp | 364/422 |
| 4,551,724 | 11/1985 | Goldstein et al. | 367/88 |
| 4,571,710 | 2/1986 | Neidell et al. | 307/38 |
| 4,592,032 | 5/1986 | Ruckgaber | 367/73 |

Primary Examiner—Jerry Smith
Assistant Examiner—Kim Thanh Tbui
Attorney, Agent, or Firm—Robert Southworth, III; Judson R. Hightower

[57] ABSTRACT

A quantitative method of geologic structural analysis of digital terrain data is described for implementation on a computer. Assuming selected valley segments are controlled by the underlying geologic structure, topographic lows in the terrain data, defining valley bottoms, are detected, filtered and accumulated into a series line segments defining contiguous valleys. The line segments are then vectorized to produce vector segments, defining valley segments, which may be indicative of the underlying geologic structure. Coplanar analysis is performed on vector segment pairs to determine which vectors produce planes which represent underlying geologic structure. Point data such as fracture phenomena which can be related to fracture planes in 3-dimensional space can be analyzed to define common plane orientation and locations. The vectors, points, and planes are displayed in various formats for interpretation.

2 Claims, 38 Drawing Figures

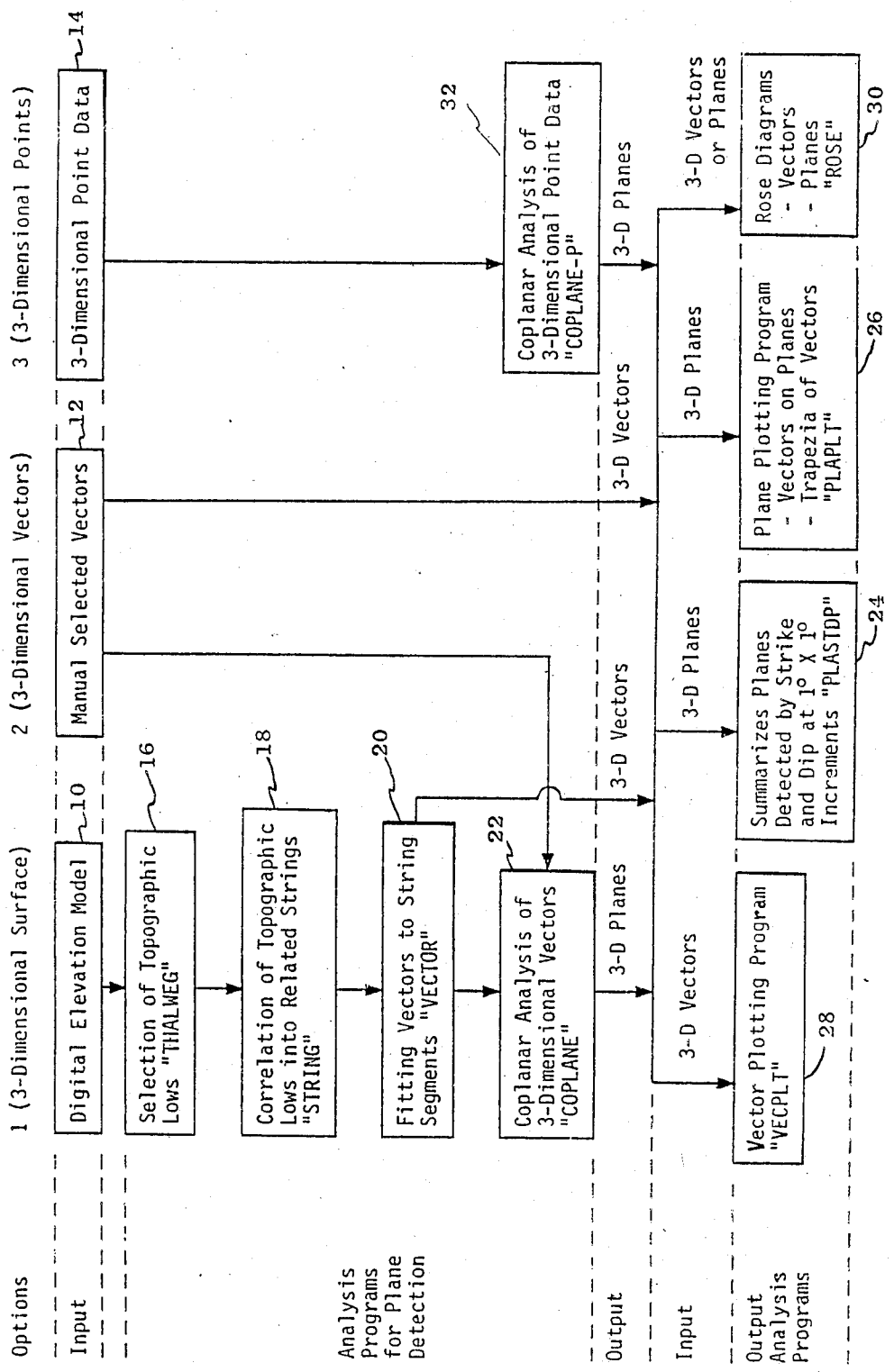

| Node X | Node Y | Elev. | Trend | Plunge | Detects |
|---|---|---|---|---|---|
| 39.00 | 5.00 | 387.50 | 326.31 | 32.02 | 1.00 |
| 96.00 | 5.00 | 305.86 | 45.00 | 24.26 | 2.00 |
| 107.00 | 5.00 | 246.25 | 0.00 | 7.47 | 14.00 |
| 133.00 | 5.00 | 386.84 | 296.57 | 17.80 | 2.00 |
| 190.00 | 5.00 | 507.83 | 0.00 | 29.47 | 6.00 |
| 191.00 | 5.00 | 510.00 | 333.43 | 33.56 | 5.00 |
| 192.00 | 5.00 | 514.29 | 296.57 | 40.84 | 3.00 |
| 40.00 | 6.00 | 382.40 | 26.57 | 30.19 | 1.00 |
| 97.00 | 6.00 | 299.19 | 33.69 | 22.43 | 2.00 |
| 107.00 | 6.00 | 245.00 | 0.00 | 7.41 | 15.00 |
| 132.00 | 6.00 | 382.14 | 288.43 | 21.94 | 2.00 |
| 190.00 | 6.00 | 500.00 | 341.57 | 26.22 | 7.00 |
| 41.00 | 7.00 | 378.33 | 26.57 | 31.12 | 1.00 |
| 98.00 | 7.00 | 293.70 | 33.69 | 25.22 | 1.00 |
| 107.00 | 7.00 | 243.75 | 0.00 | 7.47 | 15.00 |
| 132.00 | 7.00 | 380.00 | 296.57 | 19.93 | 2.00 |
| 190.00 | 7.00 | 495.86 | 341.57 | 29.22 | 7.00 |
| 41.00 | 8.00 | 370.00 | 326.31 | 27.86 | 1.00 |
| 99.00 | 8.00 | 288.43 | 26.57 | 27.12 | 1.00 |
| 107.00 | 8.00 | 242.50 | 0.00 | 4.99 | 15.00 |
| 132.00 | 8.00 | 380.00 | 296.57 | 27.66 | 1.00 |
| 144.00 | 8.00 | 419.33 | 288.43 | 9.42 | 1.00 |
| 189.00 | 8.00 | 491.30 | 0.00 | 27.28 | 6.00 |
| 42.00 | 9.00 | 365.46 | 326.31 | 26.81 | 1.00 |
| 99.00 | 9.00 | 285.00 | 45.00 | 26.03 | 2.00 |
| 107.00 | 9.00 | 241.28 | 0.00 | 2.56 | 15.00 |
| 132.00 | 9.00 | 378.43 | 296.57 | 30.27 | 1.00 |
| 138.00 | 9.00 | 408.76 | 296.57 | 33.88 | 2.00 |
| 143.00 | 9.00 | 417.50 | 288.43 | 9.72 | 1.00 |
| 145.00 | 9.00 | 420.00 | 270.00 | 8.27 | 4.00 |
| 146.00 | 9.00 | 422.00 | 270.00 | 8.94 | 5.00 |
| 147.00 | 9.00 | 425.33 | 270.00 | 11.94 | 4.00 |
| 189.00 | 9.00 | 485.15 | 341.57 | 27.92 | 7.00 |
| 43.00 | 10.00 | 360.00 | 33.69 | 26.04 | 2.00 |
| 99.00 | 10.00 | 281.67 | 45.00 | 25.67 | 3.00 |
| 100.00 | 10.00 | 277.51 | 26.57 | 22.44 | 1.00 |
| 107.00 | 10.00 | 240.00 | 0.00 | 2.76 | 15.00 |
| 109.00 | 10.00 | 250.00 | 296.57 | 25.13 | 1.00 |
| 137.00 | 10.00 | 400.00 | 296.57 | 31.09 | 2.00 |
| 138.00 | 10.00 | 407.14 | 296.57 | 33.47 | 1.00 |

FIG. 6

| Node X | Node Y | Elev. | Trend | Plunge | Detects | String No. |
|---|---|---|---|---|---|---|
| 39.00 | 5.00 | 387.50 | 326.31 | 32.02 | 1.00 | 1.00 |
| 40.00 | 6.00 | 382.40 | 26.57 | 30.19 | 1.00 | 1.00 |
| 41.00 | 7.00 | 378.33 | 26.57 | 31.12 | 1.00 | 1.00 |
| 41.00 | 8.00 | 370.00 | 326.31 | 27.86 | 1.00 | 1.00 |
| 42.00 | 9.00 | 365.46 | 326.31 | 26.81 | 1.00 | 1.00 |
| 43.00 | 10.00 | 360.00 | 33.69 | 26.04 | 2.00 | 1.00 |
| 44.00 | 11.00 | 355.71 | 26.57 | 30.40 | 2.00 | 1.00 |
| 44.00 | 12.00 | 350.00 | 326.31 | 30.19 | 1.00 | 1.00 |
| 45.00 | 12.00 | 348.58 | 18.43 | 24.96 | 3.00 | 1.00 |
| 45.00 | 13.00 | 343.20 | 326.31 | 26.42 | 2.00 | 1.00 |
| 46.00 | 13.00 | 346.13 | 18.43 | 31.32 | 3.00 | 1.00 |
| 46.00 | 14.00 | 338.70 | 341.57 | 31.81 | 3.00 | 1.00 |
| 47.00 | 15.00 | 335.00 | 296.57 | 35.13 | 2.00 | 1.00 |
| 48.00 | 16.00 | 330.00 | 296.57 | 35.13 | 2.00 | 1.00 |
| 49.00 | 17.00 | 325.00 | 326.31 | 36.02 | 1.00 | 1.00 |
| 50.00 | 18.00 | 320.00 | 296.57 | 36.89 | 1.00 | 1.00 |
| 50.00 | 19.00 | 310.00 | 296.57 | 35.13 | 2.00 | 1.00 |
| 51.00 | 20.00 | 307.50 | 296.57 | 37.01 | 1.00 | 1.00 |
| 51.00 | 21.00 | 299.08 | 296.57 | 36.44 | 1.00 | 1.00 |
| 52.00 | 21.00 | 302.61 | 341.57 | 34.79 | 1.00 | 1.00 |
| 52.00 | 22.00 | 295.00 | 296.57 | 35.13 | 1.00 | 1.00 |
| 53.00 | 23.00 | 290.00 | 296.57 | 33.56 | 1.00 | 1.00 |
| 54.00 | 24.00 | 286.00 | 296.57 | 33.61 | 2.00 | 1.00 |
| 54.00 | 25.00 | 279.08 | 296.57 | 33.44 | 1.00 | 1.00 |
| 55.00 | 25.00 | 282.00 | 296.57 | 32.96 | 1.00 | 1.00 |
| 55.00 | 26.00 | 272.50 | 296.57 | 30.38 | 1.00 | 1.00 |
| 56.00 | 27.00 | 270.00 | 296.57 | 32.47 | 1.00 | 1.00 |
| 57.00 | 28.00 | 263.87 | 26.57 | 33.05 | 1.00 | 1.00 |
| 58.00 | 29.00 | 258.33 | 26.57 | 32.02 | 1.00 | 1.00 |
| 58.00 | 30.00 | 250.00 | 341.57 | 28.93 | 2.00 | 1.00 |
| 59.00 | 31.00 | 245.00 | 26.57 | 31.74 | 1.00 | 1.00 |
| 60.00 | 32.00 | 238.17 | 26.57 | 26.09 | 1.00 | 1.00 |
| 60.00 | 33.00 | 231.81 | 0.00 | 22.43 | 1.00 | 1.00 |
| 61.00 | 34.00 | 227.73 | 33.69 | 25.04 | 1.00 | 1.00 |
| 62.00 | 35.00 | 222.40 | 26.57 | 26.73 | 1.00 | 1.00 |
| 62.00 | 36.00 | 217.77 | 341.57 | 27.62 | 1.00 | 1.00 |
| 63.00 | 37.00 | 211.67 | 341.57 | 24.85 | 1.00 | 1.00 |
| 64.00 | 37.00 | 212.55 | 18.43 | 27.85 | 1.00 | 1.00 |
| 64.00 | 38.00 | 208.18 | 26.57 | 28.46 | 1.00 | 1.00 |

FIG. 9

VECTOR CRITERIA

1) Vectors formed from the same string have common end points.

2) Vector lengths are determined using the following relationships.

| String Node Length | Vector Node Length |
|---|---|
| 0-3 | 0 |
| 4-8 | 4-8 |
| 9 | 5,5 |
| 10 | 6,5 |
| 11 | 6,6 |
| 12 | 7,6 |
| 13 | 7,7 |
| 14 | 8,7 |
| 15 | 8,8 |

Strings with node lengths greater than 15 are calculated using the following functions:

$$ANN = Integer( SN-1 / TV-1 ) + SN$$

$$NTV = Integer( ANN / TV)$$

$$NR = ANN - ( TV * NTV )$$

where

SN = String Nodes
TV = Test Vector (set to 7 nodes)
ANN = Adjusted Node Number
NTV = Number of Test Vectors
NR = Node Remainder

| Node Remainder | Vectors | |
|---|---|---|
| 6 | NTV   + One | 6 Node Vector |
| 5 | NTV-1 + Two | 6 Node Vectors |
| 4 | NTV-2 + Three | 6 Node Vectors |
| 3 | NTV-3 + Three | 8 Node Vectors |
| 2 | NTV-2 + Two | 8 Node Vectors |
| 1 | NTV-1 + One | 8 Node Vector |

FIG.11

| STRING NO. | END PT. #1 NODE X | NODE Y | NODE ELEV. | END PT. #2 NODE X | NODE Y | NODE ELEV. | LENGTH | VECTOR TREND | PLUNGE |
|---|---|---|---|---|---|---|---|---|---|
| 1. | 39. | 5. | 387.50 | 64. | 38. | 200.18 | 394.75 | 37.15 | 24.43 |
| 2. | 96. | 5. | 305.86 | 104. | 18. | 243.57 | 145.55 | 31.61 | 23.17 |
| 3. | 107. | 5. | 246.25 | 107. | 44. | 195.00 | 371.86 | 0.00 | 7.85 |
| 4. | 133. | 5. | 386.84 | 132. | 9. | 378.43 | 39.31 | 345.96 | 12.07 |
| 5. | 190. | 6. | 500.00 | 177. | 44. | 294.01 | 382.95 | 341.11 | 28.28 |
| 6. | 146. | 25. | 361.43 | 150. | 20. | 393.33 | 61.05 | 321.34 | 27.59 |
| 6. | 150. | 20. | 393.33 | 150. | 13. | 426.89 | 66.75 | 0.00 | 26.69 |
| 6. | 150. | 13. | 426.89 | 144. | 8. | 419.33 | 74.47 | 230.19 | 5.80 |
| 7. | 138. | 9. | 408.76 | 134. | 12. | 380.00 | 47.67 | 306.87 | 31.10 |
| 7. | 134. | 12. | 380.00 | 130. | 14. | 356.85 | 42.64 | 296.57 | 28.50 |
| 8. | 110. | 12. | 253.93 | 112. | 16. | 259.62 | 42.64 | 206.57 | 7.60 |
| 9. | 127. | 14. | 344.34 | 116. | 18. | 280.00 | 111.60 | 289.98 | 29.96 |
| 10. | 113. | 19. | 263.89 | 112. | 22. | 258.91 | 30.15 | 341.57 | 9.38 |
| 11. | 117. | 27. | 276.60 | 119. | 30. | 280.00 | 34.38 | 213.69 | 5.65 |
| 12. | 144. | 29. | 337.92 | 128. | 36. | 281.25 | 166.52 | 293.63 | 18.79 |
| 13. | 127. | 37. | 274.14 | 122. | 40. | 248.47 | 55.60 | 300.96 | 24.78 |
| 13. | 122. | 40. | 248.47 | 118. | 44. | 220.00 | 53.94 | 315.00 | 27.83 |
| 14. | 66. | 41. | 190.00 | 69 | 44. | 175.00 | 40.45 | 45.00 | 20.34 |
| 15. | 126. | 41. | 250.00 | 128. | 44. | 234.29 | 34.38 | 33.69 | 24.56 |
| 16. | 5. | 46. | 110.00 | 70. | 46. | 162.18 | 619.77 | 270.00 | 4.81 |
| 17. | 72. | 46. | 164.00 | 105. | 46. | 191.45 | 314.65 | 270.00 | 4.99 |
| 18. | 109. | 46. | 194.68 | 116. | 46. | 205.06 | 66.75 | 270.00 | 9.51 |
| 19. | 119. | 46. | 212.55 | 176. | 46. | 284.44 | 543.49 | 270.00 | 7.53 |
| 20. | 179. | 46. | 290.00 | 195. | 46. | 310.00 | 152.56 | 270.00 | 7.47 |
| 21. | 71. | 48. | 170.92 | 82. | 78. | 286.36 | 304.67 | 200.14 | 20.75 |
| 21. | 82. | 78. | 286.36 | 85. | 83. | 306.48 | 55.60 | 210.96 | 19.89 |
| 21. | 85. | 83. | 306.48 | 86. | 88. | 324.14 | 48.62 | 191.31 | 19.96 |
| 22. | 107. | 48. | 195.00 | 107. | 134. | 265.63 | 820.01 | 180.00 | 4.92 |
| 23. | 130. | 48. | 232.40 | 132. | 53. | 270.00 | 51.35 | 201.80 | 36.21 |
| 23. | 132. | 53. | 270.00 | 131. | 57. | 288.54 | 39.31 | 165.96 | 25.25 |
| 24. | 173. | 50. | 307.34 | 164. | 61. | 370.00 | 135.52 | 140.71 | 24.81 |
| 25. | 119. | 51. | 229.23 | 120. | 56. | 281.14 | 115.21 | 245.56 | 24.25 |
| 26. | 111. | 56. | 224.79 | 109. | 61. | 215.86 | 51.35 | 338.20 | 9.87 |
| 27. | 133. | 57. | 294.14 | 136. | 59. | 303.20 | 34.38 | 236.31 | 14.76 |
| 28. | 138. | 60. | 309.05 | 144. | 64. | 340.00 | 68.76 | 236.31 | 24.23 |
| 29. | 134. | 61. | 321.57 | 136. | 71. | 393.33 | 97.24 | 191.31 | 36.43 |
| 29. | 136. | 71. | 393.33 | 138. | 76. | 426.91 | 51.35 | 201.80 | 33.18 |
| 30. | 164. | 62. | 374.55 | 162. | 64. | 383.61 | 26.97 | 135.00 | 18.57 |
| 31. | 110. | 63. | 219.17 | 127. | 76. | 335.00 | 204.06 | 232.59 | 29.58 |
| 31. | 127. | 76. | 335.00 | 135. | 88. | 445.00 | 137.52 | 213.69 | 38.66 |

FIG. 14

Separated Vector Segments:

Vector Segments With A Common End Point:

|  |  | Vector #1 | | | | Vector #2 | | | |
|  |  | End Pt. #1 | | End Pt. #2 | | End Pt. #1 | | End Pt. #2 | |
| Plane | | Node | Node | Node | Node | Node | Node | Node | Node |
| Strike | Dip | X | Y | X | Y | X | Y | X | Y |
|---|---|---|---|---|---|---|---|---|---|
| 24.70 | 85.58 | 136. | 71. | 138. | 76. | 110. | 12. | 112. | 16. |
| 25.64 | 79.99 | 138. | 78. | 141. | 87. | 110. | 12. | 112. | 16. |
| 26.58 | 74.84 | 126. | 41. | 128. | 44. | 134. | 61. | 136. | 71. |
| 26.43 | 74.55 | 126. | 41. | 128. | 44. | 136. | 71. | 138. | 76. |
| 26.40 | 74.49 | 126. | 41. | 128. | 44. | 138. | 78. | 141. | 87. |
| 26.61 | 74.91 | 126. | 41. | 128. | 44. | 146. | 97. | 152. | 107. |
| 26.69 | 77.10 | 146. | 97. | 152. | 107. | 110. | 12. | 112. | 16. |
| 26.23 | 75.77 | 146. | 97. | 152. | 107. | 126. | 41. | 128. | 44. |
| 26.09 | 75.37 | 146. | 97. | 152. | 107. | 130. | 48. | 132. | 53. |
| 26.39 | 76.23 | 146. | 97. | 152. | 107. | 134. | 61. | 136. | 71. |
| 26.47 | 76.46 | 146. | 97. | 152. | 107. | 136. | 71. | 138. | 76. |
| 27.07 | 82.85 | 130. | 48. | 132. | 53. | 126. | 41. | 128. | 44. |
| 27.11 | 78.01 | 138. | 78. | 141. | 87. | 146. | 97. | 152. | 107. |
| 27.09 | 78.27 | 146. | 97. | 152. | 107. | 138. | 78. | 141. | 87. |
| 28.93 | 72.55 | 39. | 5. | 64. | 38. | 71. | 48. | 82. | 78. |
| 28.34 | 71.38 | 39. | 5. | 64. | 38. | 91. | 96. | 103. | 116. |
| 28.35 | 71.39 | 39. | 5. | 64. | 38. | 115. | 138. | 117. | 146. |
| 28.61 | 75.03 | 110. | 12. | 112. | 16. | 126. | 41. | 128. | 44. |
| 28.82 | 79.47 | 126. | 41. | 128. | 44. | 110. | 12. | 112. | 16. |
| 28.06 | 70.00 | 71. | 48. | 82. | 78. | 39. | 5. | 64. | 38. |
| 28.76 | 68.41 | 71. | 48. | 82. | 78. | 115. | 138. | 117. | 146. |
| 28.59 | 80.83 | 130. | 48. | 132. | 53. | 110. | 12. | 112. | 16. |
| 28.62 | 68.04 | 134. | 61. | 136. | 71. | 164. | 124. | 174. | 137. |
| 28.74 | 75.85 | 138. | 78. | 141. | 87. | 174. | 139. | 186. | 173. |
| 28.07 | 77.00 | 91. | 96. | 103. | 116. | 71. | 48. | 82. | 78. |
| 28.82 | 63.00 | 164. | 124. | 174. | 137. | 134. | 61. | 136. | 71. |
| 28.16 | 74.03 | 174. | 139. | 186. | 173. | 110. | 12. | 112. | 16. |
| 28.01 | 74.29 | 174. | 139. | 186. | 173. | 126. | 41. | 128. | 44. |
| 28.41 | 73.60 | 174. | 139. | 186. | 173. | 134. | 61. | 136. | 71. |
| 28.54 | 73.37 | 174. | 139. | 186. | 173. | 136. | 71. | 138. | 76. |
| 28.70 | 73.10 | 174. | 139. | 186. | 173. | 138. | 78. | 141. | 87. |
| 29.51 | 85.10 | 96. | 5. | 104. | 18. | 146. | 97. | 152. | 107. |
| 29.41 | 79.75 | 130. | 48. | 132. | 53. | 117. | 27. | 119. | 30. |
| 29.17 | 67.44 | 134. | 61. | 136. | 71. | 110. | 12. | 112. | 16. |
| 29.18 | 67.42 | 134. | 61. | 136. | 71. | 117. | 27. | 119. | 30. |
| 29.07 | 75.42 | 138. | 78. | 141. | 87. | 164. | 124. | 174. | 137. |
| 29.45 | 85.35 | 146. | 97. | 152. | 107. | 96. | 5. | 104. | 18. |
| 29.29 | 64.24 | 164. | 124. | 174. | 137. | 110. | 12. | 112. | 16. |

FIG. 17

```
STRIKE                          DIP DEGREES
 DEG.   80°------------------------------------------------------------------90°

PROCESS FOR STRUCTURAL GEOLOGIC ANALYSIS OF TOPOGRAPHY AND POINT DATA

BACKGROUND OF THE INVENTION

The present invention relates to a computer process for determining planes in a 3-dimensional space using individual data points and more specifically to such a process for performing structural geologic analysis on topographical data.

It has been long known by earth scientists that many physiographic relief forms, such as stream valleys, mountain escarpments and the like, are controlled by the underlying geologic structure of the area. Geologic structures, for example bedding and fracture planes and geologic faults, affect the differential erosion of the surface materials. original work in this field of study was performed by W. H. Hobbs and described by him in "Lineaments of the Atlantic Border Region", *Bull. Geol. Soc. Am.*, Vol. 15, 1903. The term "lineament" is therein defined as any mappable, single or composite linear feature of the surface, whose parts are aligned in a rectilinear or slightly curvilinear relationship and which differs distinctly from the patterns of adjacent features and presumably reflects a subsurface phenomenon. Since this original work, over two thousand lineament studies have been published.

Studies by early structural geologists were limited by the availability of high quality topographic maps and their abiltiy to gain synoptic views of large areas of the earth. Aerial photography, imaging from rockets and more recently remote imaging from satellite systems now provide an overwhelmingly large database for structural geologic analysis.

However, assessment of local structural features, such as the orientation of jointing patterns, faults, and the like, are often found to be highly dependent on the interpreter. Studies have shown that significant variations in interpretation can be expected from several photo analysts using the same imagery. These studies utilizing various data sets, such as aerial and satellite photography, imagery from optical mechanical imaging systems, imaging radar data and photos of low angle illuminated plastic relief maps, indicate that all of these types of data contain a bias which is related to the illumination angle. Shadow enhancement tends to accent lineaments at approximately 30 degrees on either side of the illumination angle and suppress lineaments on the axis of the illumination. Similar effects have been observed in box filtered digital data and by the applicant in lineament studies utilizing digital shaded topography.

It is therefore desirable to establish a quantitative link between topographic relief patterns and geologic structures where the bias of the interpreter is substantially reduced or eliminated.

SUMMARY OF THE INVENTION

In accordance with the present invention, in a particular embodiment thereof, geologic structural analysis is performed on digital terrain and/or point data using a series of computer programs to produce planes in 3-dimensional space representative of the underlying geologic structure of an area. The derived planes and their defining components, vectors and/or points in 3-dimensional space, are analyzed and displayed to allow interpretation of the underlying geologic structure.

In accordance with an aspect of the present invention. topographic lows in the digital terrain data are detected and filtered to produce points representative of valley bottoms. Contiguous valley bottom points are combined to produce line or string segments representative of valleys. Each valley segment is divided into a series of connecting vectors having a range of predefined lengths based on the total number of valley bottom points in the string. The vectors, being lines in space, each have an associated trend and plunge defined respectively as the azimuthal direction of the vector in a 360 degree coordinate system and an angle measured from a horizontal plane in a downward direction. The individual vectors associated with each segment are combined into longer vectors based on a specified trend and plunge range and the combined vectors are tested against each other to determine which vectors define planes related to geologic structure. Those vectors having a common end point uniquely define a plane. When vectors do not have a common end point, the poles to the planes are tested against a divergent test value to determine if the vectors do define a geologically significant plane. The resultant planes and their associated vectors are displayed in various formats, such as line plots, rose diagrams and the like.

According to another aspect of the present invention, geologic data defined by points in 3-dimensional space are analyzed to define planes. In such an application, all vectors produced by each data point and all other data points are tested against all possible vector combinations produced by all other data points to determine if the vectors define planes. As previously described, a divergent test value is employed with respect to vectors not having common end point. Resultant planes and associated vectors are displayed.

It is accordingly an object of the present invention to provide an improved method of analyzing topographic and point data to define geologic strucures.

It is another object of the present invention to provide a more accurate method of interpretation and analysis of physiologic relief forms relating to geologic structures.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

DRAWINGS

FIG. 1 is a flow chart for computerized structural geologic analysis of topography according to the present invention, FIGS. 2A through 2C comprise a flow chart for a "THALWEG" program employed in determining valley bottoms from digital terrain data, FIG. 3 illustrates a valley detector node array, FIG. 4 is a plot illustrating the unfiltered valley detects from program "THALWEG", FIG. 5 is a plot illustrating the filtered valley detects from program "THALWEG", FIG. 6 is an example of a table illustrating a portion of the output of program "THALWEG", FIGS. 7A and 7B comprise a flow chart for a program for accumulating valley bottoms into strings, FIG. 8 is an idealized representation of the filtered output of program "THALWEG", FIG. 9 is an example of a table illustrating the output of program "STRING", FIGS. 10A through 10C comprise a flow chart for a program fitting vectors to string segments, FIG. 11 illustrates the defining criteria for vectors, FIG. 12 is an example of a plot of vectors of string valley nodes using the criteria shown in FIG. 11, FIG. 13 is an example of a plot of the combined vectors using 10 degree trend and plunge variance on the vectors in FIG. 12, FIG. 14 is an example of a table showing the output file of program "VECTOR", FIGS. 15A and 15B constitute a flow chart for a program used in analyzing 3-dimensional vectors to define planes, FIGS. 16A and 16B illustrate methods of determining poles to planes for separated and connected vectors, FIG. 17 is an example of a table illustrative of the output of program "COPLANE", FIGS. 18A and 18B constitute a flow chart for a program used in an analyzing 3-dimensional points to define planes, FIG. 19 is a flow chart for a program employed for displaying vectors, FIG. 20 is a flow chart for a program utilized in producing a table summary of detected planes by strike and dip at 1×1 increments, FIG. 21 is an example of a portion of a table produced by program "PLASTDP", FIGS. 22A and 22B comprise a flow chart for a program used in plotting coplanar vectors in various formats, FIGS. 23 through 25 are vector plots using the various options of program "PLAPLT", FIGS. 26A and 26B comprise a flow chart of a program employed for producing rose diagrams of vector and plane data, and FIGS. 27 and 28 are rose diagram plots of vector and plane data, respectively, using program "ROSE".

DETAILED DESCRIPTION

Figure 2A:
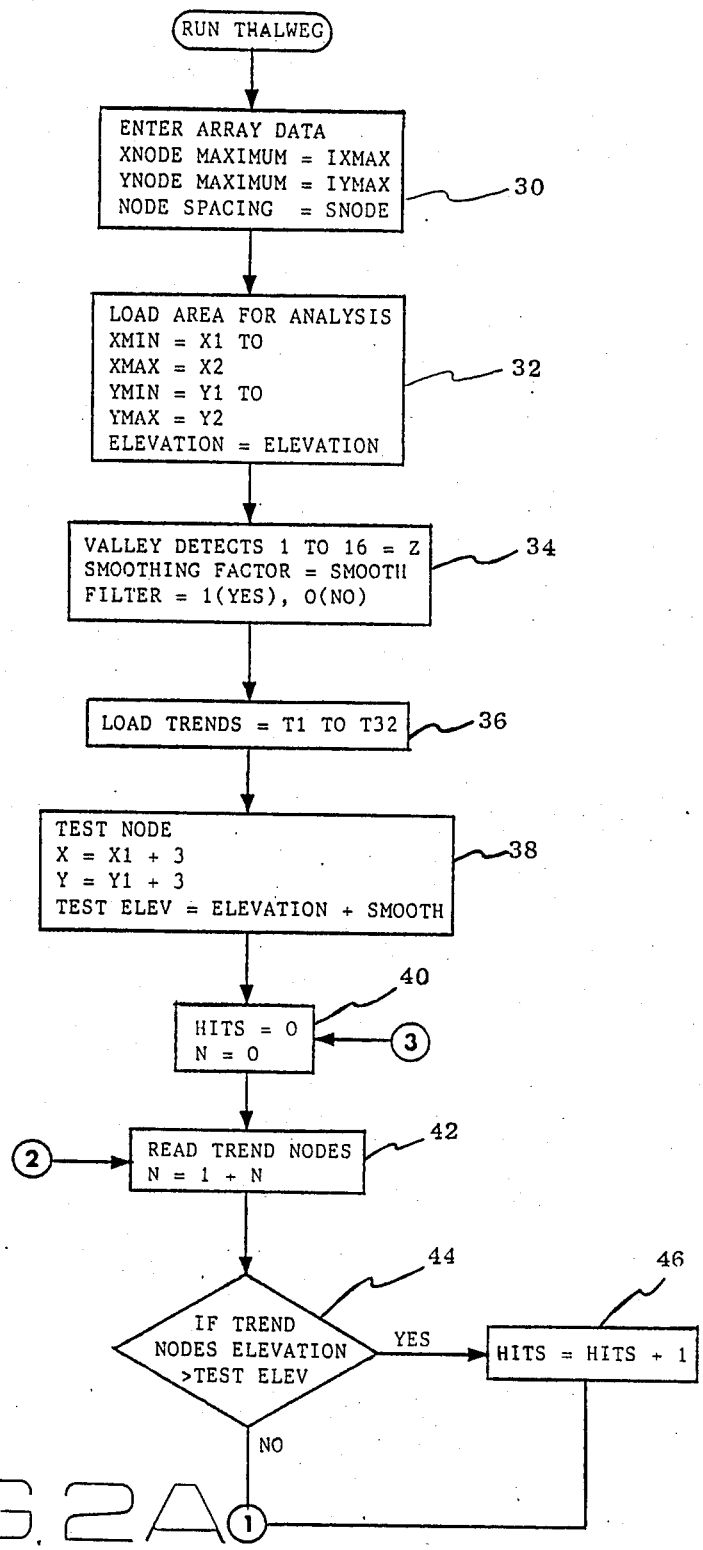

The generalized flow chart of FIG. 1 illustrates alternative methods of geologic structural analysis according to the present invention. At the top of the figure are listed three analysis options: 3-dimensional surface analysis, 3-dimensional vector analysis, and 3-dimensional point analysis. The input data for the various analyses are respectively Digital Elevation Model 10, Manual Selected Vectors 12, and 3-Dimensional Point Data 14.

In option 1, the data to be analyzed is digital terrain data representative of locations and elevations corresponding to points on a topographic map such as produced by the United States Geological Survey. This data is stored in the memory of a computing system, for example a Vax 11/780 manufactured by Digital Equipment Corp., in an M×N matrix.

Program "THALWEG" 16 accesses the stored data and processes the same to detect topographic lows defining valley bottoms or nodes. Generally, during the detecting process, more than one data point is associated with each valley bottom, but a filtering process is employed to reduce the multiple detections to a single point. The data is stored and then processed by program "STRING" 18 to produce a series of line segments representative of the detected valleys. The output data from the program "STRING" 18 is stored for processing by program "VECTOR" 20.

Program "VECTOR" 20 evaluates each valley string to produce a series of connected vectors having individual lengths falling within a pre-defined limit. The vectors from each valley string are combined according to pre-defined trend and plunge criteria to produce longer vectors, with the final vector lengths representing the selected valley segments as controlled by the underlying geologic structure of the area. The output data of program "VECTOR" is stored and processed by program "COPLANE" 22.

Program "COPLANE" 22 evaluates the vector data and defines planes representative of the geologic structure of the area. Each vector is evaluated against non-connecting vectors to determine if a valid plane exists by determining the cross product of vectors formed by a first test vector and each end point of a second vector. The poles to respective planes formed by the vectors are evaluated against pre-defined divergence trend and plunge values and if the poles to the planes fall within the divergence test values, the trends and plunges of the two planes are averaged to define a valid plane. In the case where two vectors have a common end point, a valid plane is defined by these vectors.

The output data of program "COPLANE" 22 is processed by display programs "PLASTDP" 24 and "PLAPLT" 26 to produce respectively a table listing of the strike and dip of the planes at 1°×1° increments, and plots of planes and their associated vectors and trapezia of vectors. In addition, the output data of program "VECTOR" 20 is processed by display program "VECPLT" 28 to provide plots of vectors. Further, program "ROSE" 30 supplies rose diagrams of both the program "VECTOR" 20 and program "COPLANE" 22 outputs. Referring to Option 2 in FIG. 1, the input data to be processed comprises Manual Selected Vectors 12. The manual selection of vectors can be accomplished by an individual examining a topographic map and determining vectors associated with valley segments. This data can be manually entered into the computer using a keyboard and can be processed using program "COPLANE" 22 as previously described. In addition, the vector data can be displayed by using programs "VECPLT" 28 and "ROSE" 30.

Turning now to Option 3 in FIG. 1, the input data to be processed comprises a 3-Dimensional Point Data 14, for Example defining earthquake hypocenters related to geologic faulting. Each data point is checked against all possible four point combinations in the data set and two planes are determined using vector cross products, as previously described, for each four point combination. The poles to the two planes are checked against pre-defined trend and plunge divergence values and if the poles fall within the divergence test values, then the strike and dip of the plane are determined. The output data is stored for processing by the display programs.

Figure 2B:
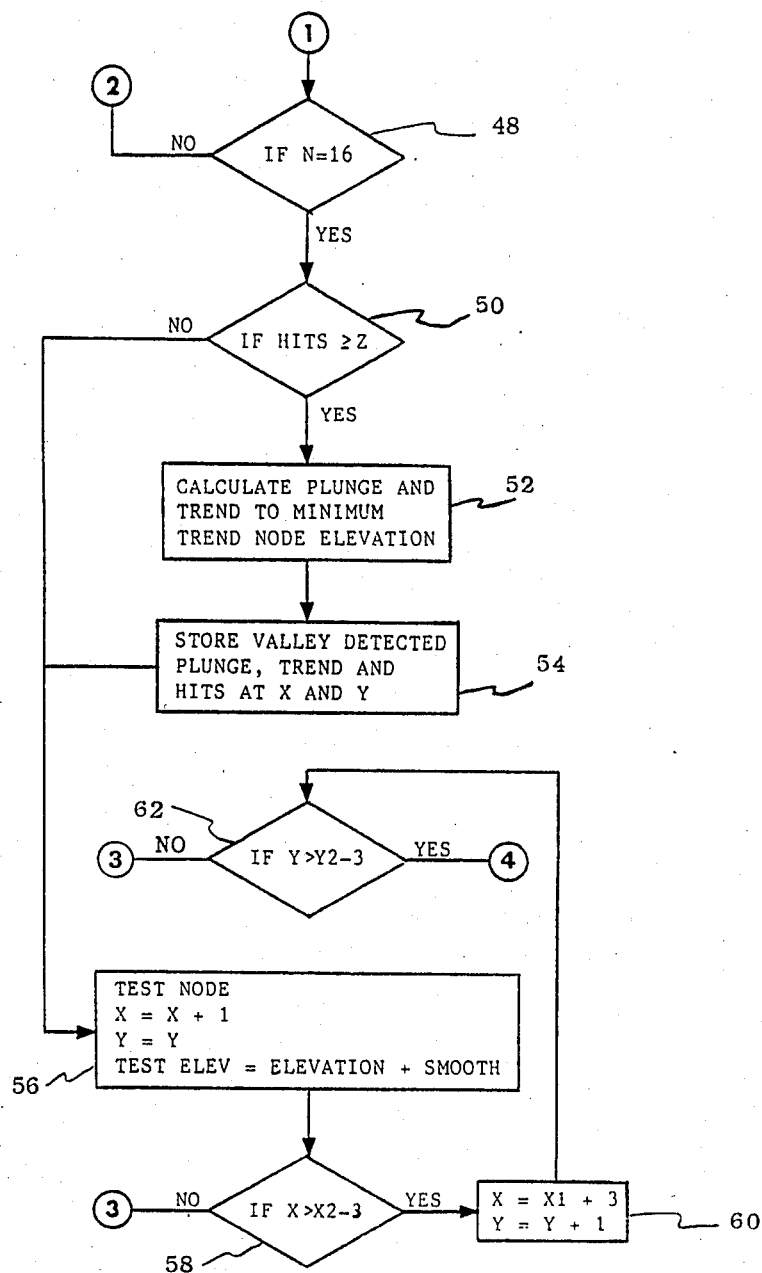
Figure 2C:
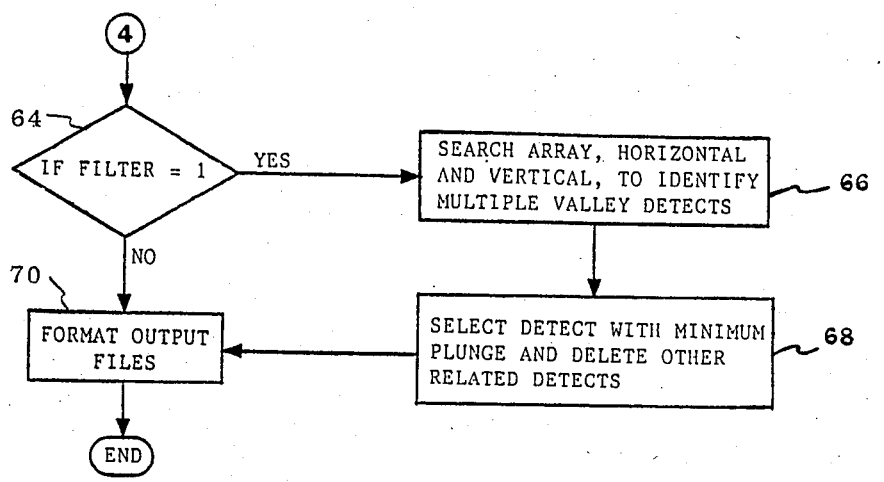
Figure 3:
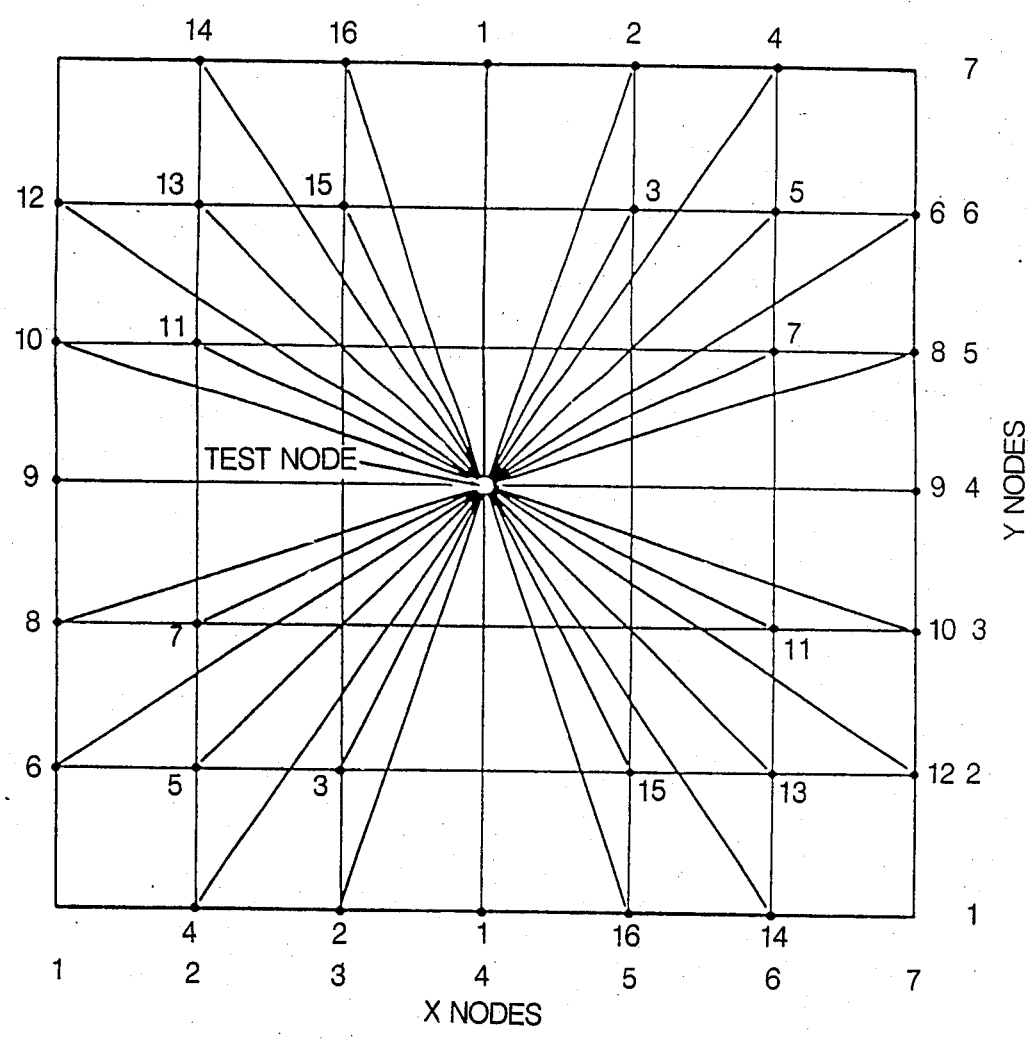

Referring now to FIGS. 2A through 2C, the flow chart is illustrated for the program "THALWEG" 16 for detecting valley bottoms or nodes from the digital terrain data. The program uses a 7×7 "node detector" illustrated in FIG. 3 which "moves" over the terrain data matrix from point to point. The test node (central node) of the detector is tested against end point nodes along sixteen independent trends to determine if the test node is lower than both end point nodes. If the end point nodes of any trend are higher than the test node, then the test node is considered a valley node and the trend direction and plunge from the end nodes to the test node are calculated and stored. When all sixteen trend directions have been tested, the minimum plunge angle to the minimum trend node in the detector is calculated and stored along with the trend direction.

The node detector has excellent characteristics for detecting minor valleys on hillsides. A delta elevation, hereinafter referred to as the smoothing factor, can be added to the test node to compensate for inaccuracies in the original digital terrain data, with this smoothing factor being the key to optimizing detection of valley nodes. Setting the smoothing factor too large will cause minor valley nodes to be missed, while if the smoothing factor is too small, elevation inaccuracies may interfere with detected valleys causing them to be lost in subsequent filtering steps.

Figure 4:
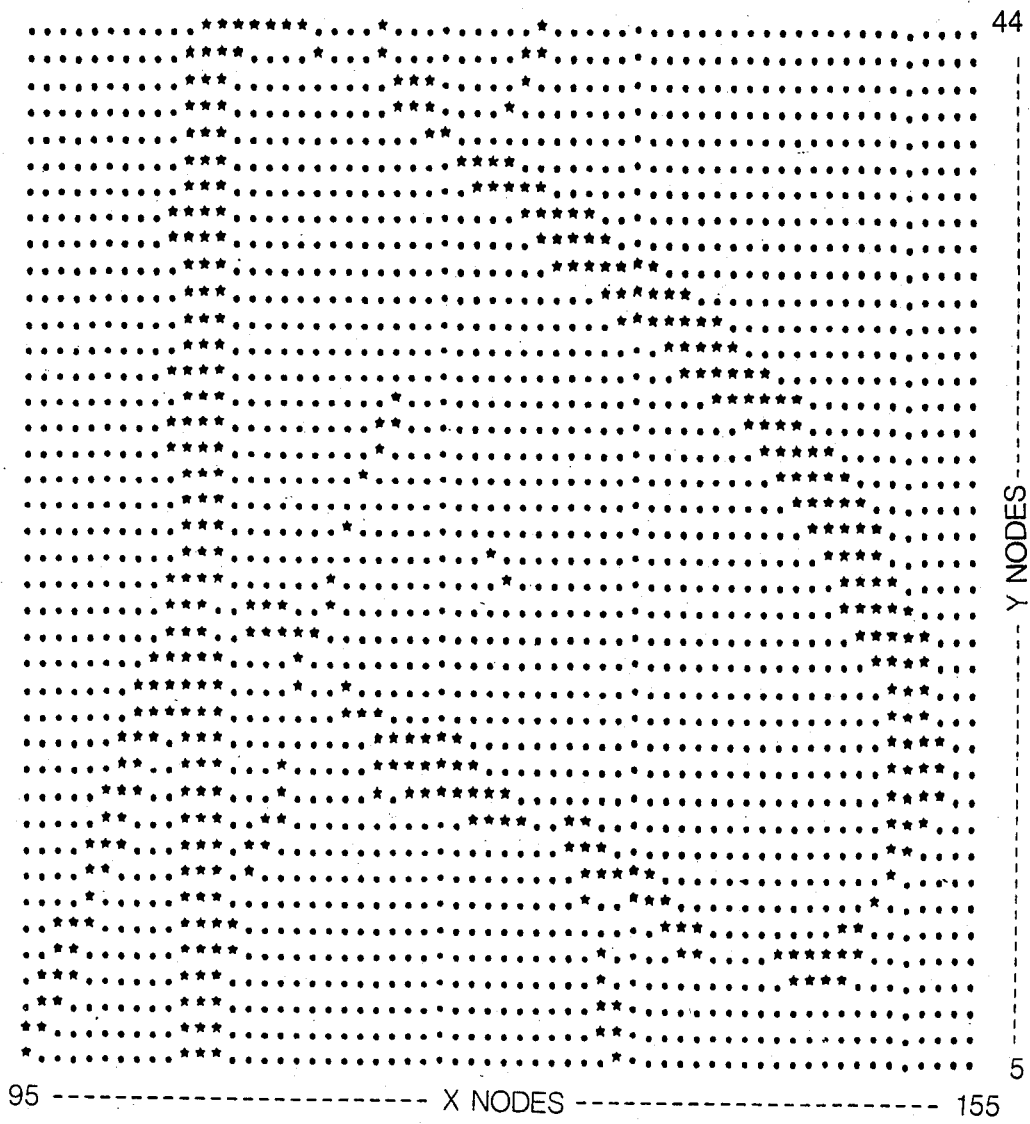
Figure 5:
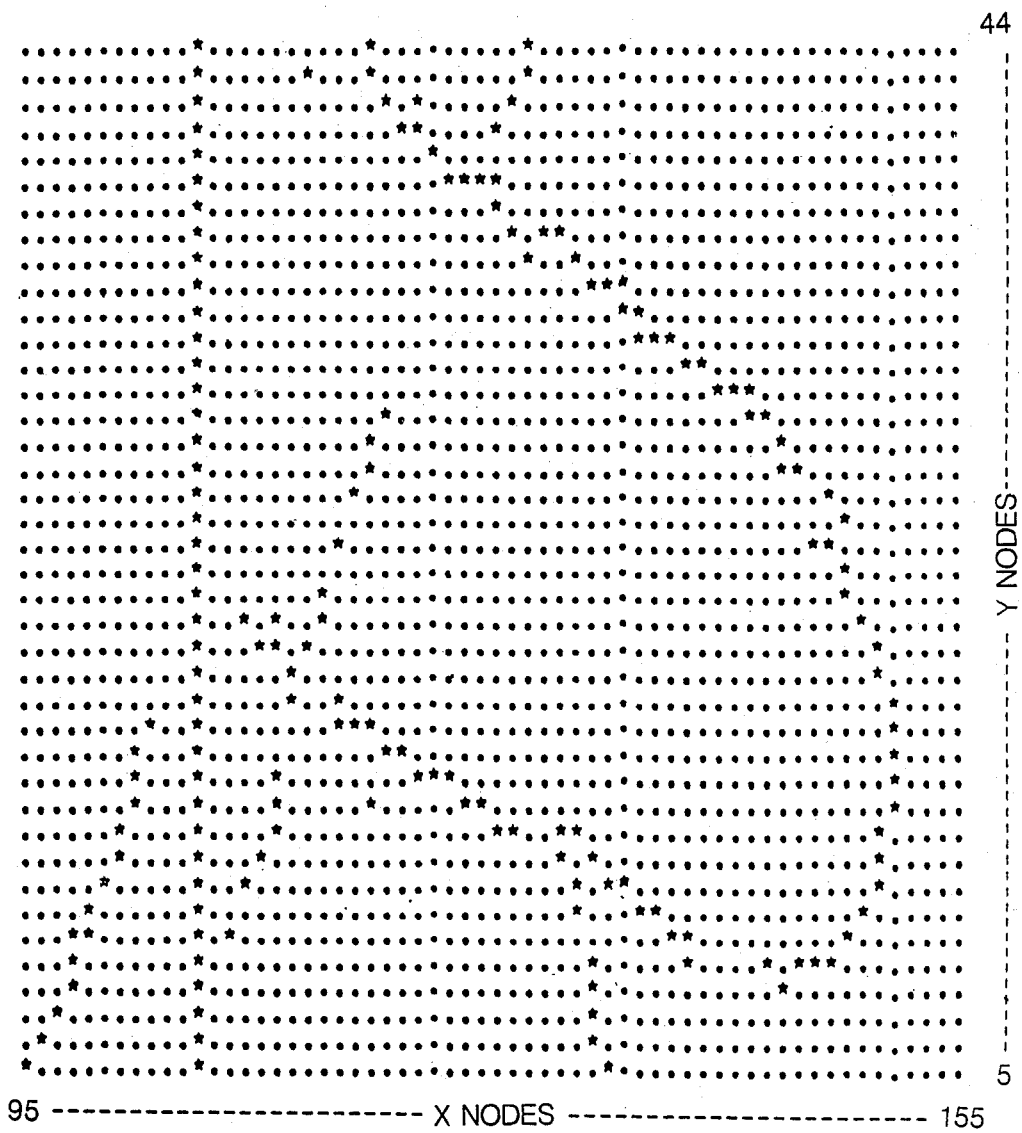

Due to the size of the detector, several nodes along most valley bottoms are detected but these valley nodes are reduced to a single node most representative of the valley bottom. The stored valley node data is searched in both the horizontal and vertical directions to filter out multiple valley nodes. The filter used in the preferred embodiment sequentially searches each column and row in the array to determine if there are more than seven consecutive valley nodes in a row and if this condition is true, then filtering of those data points will not occur. When there are seven or less consecutive valley nodes in a row, the plunge values for the nodes are compared against each other to determine the valley node with the shallowest plunge angle which is then used as the valley node. In addition, a three by three box filter is utilized to eliminate isolated valley detects. Examples of the unfiltered and filtered outputs from program "THALWEG" 16 are shown in FIGS. 4 and 5.

Referring again to FIG. 2, blocks 30 through 40 relate to the loading of data and the initialization of the variables in the program. Blocks 42 through 54 relate to the valley node detector previously described. Blocks 56 through 62 increment the valley node detector through the terrain data array and blocks 64 through 68 relate to the filtering of the detected valley nodes.

In block 30, the digital terrain data is entered into the computer system in an IXMAX by IYMAX defined matrix. In addition, the spacing between elevation points in the data is stored in SNODE. Since the total digital terrain data is generally very large, smaller portions of the data set can be tested before processing the total data file, as depicted in block 32. In block 34, Z sets the minimum number of valley detects required from the valley node detector to process plunge and trend data. The smoothing factor is the delta elevation in the same dimension as the terrain data that is added to the test node of the valley node detector. The thirty-two trend values shown being loaded in in block 36 are related to the sixteen valley node detector trends in that they define the azimuthal direction from each end point of the valley node trends to the test node. To prevent the valley node detector from exceeding the bounds of the data matrix, the detector does not test data points in the three beginning and ending columns and rows of the matrix. This criteria is shown being initialized in block 38 along with the initialization of the test elevation which is equal to the test node elevation and the smoothing factor elevation. In block 40, incremental counters "Hits" and "N" are set to 0 where "Hits" represents the number of times that both end points of a valley node detector trend are higher than the test point and "N" represents the sixteen trends of the valley node detector.

The valley node detection process is initiated in block 42 by setting the detector trend to 1 and reading the elevations of the end point nodes. The end point node elevations are tested against the test elevation as shown in decision block 44. If the elevation of an end point is higher than the test node elevation, then the Hits counter is incremented by 1 as noted in block 46 and the trend directions and plunge angles are calculated from both end points to the test point and stored. The program proceeds to decision block 48 and determines if all sixteen valley node detector trend directions have been tested. If the condtion in decision block 44 was false, the program advances to block 48. If the condition in block 48 is false (e.g. N$\neq$16), then the program returns to block 42 where the detector trend is incremented by 1, and the end point nodes for that trend are loaded and tested in block 44. When the condition in block 48 is true (e.g. N=16), the program advances to decision block 50 where the Hits counter is tested against the value z defined in block 34. If the condition is true, then the minimum plunge angle and trend direction to the test point are determined as shown in block 52 and stored in memory in block 54 along with the Hits value. The program then proceeds to block 56 as is the case if the condition in block 50 is false. Block 56 is the initial block of the valley node detector incrementer for positioning the valley node detector over each elevation point in the terrain data matrix. As in other types of matrix searching systems, the points within the matrix are searched sequentially in the x direction, with the y direction being sequentially incremented by 1 at the end of each x direction search. As previously stated, the incrementer as used prevents the valley node detector from exceeding the limits of the data array by restricting the nodes being tested from the three beginning and ending rows and columns of the data matrix.

Returning to block 56, the x value is incremented by 1 while the y value is held constant. The test elevation value at that location is then stored. The program then tests the x value as shown in decision block 58 to determine if the value exceeds the limits of the data matrix for the valley node detector. If the condition is true, then the x value is set to its initial value and the y value is incremented by 1 as noted in block 60. The y value is then tested in decision block 62 to ascertain if it also exceeds the limits of the data matrix for the valley node detector. If the condition is true, then the detector has been positioned over all the relevant points in the data matrix and the program advances to decision block 64. If the condition is not true, then the program returns to block 40 where counters Hits and N are reset to 0 and the valley node detection process is initiated again. Likewise, if the condition in decision block 58 is false, the program returns to block 40.

When all the points in the terrain data matrix have been tested, the program advances to decision block 64 where the filter option is tested. If filter in block 34 was set to 1, then the program continues to block 66 where, as previously described, the output data file of the valley node detector is searched in both the horizontal and vertical directions to identify multiple valley detects. The valley detect with the minimum plunge angle is taken as the node most representative of the valley bottom as shown in block 68. This data is then formatted and stored in an output file as indicated in block 70. If filter in decision block 64 is 0, then the unfiltered data is formatted and stored. An example of the data stored in the output file is given in the table of FIG. 6 wherein the x node and y node define points relative to the terrain data array, ELEV. is the elevation from the terrain data at that point, Trend and Plunge are respectively the azimuthal direction and the minimum angle related to the detected valley node and Detects are the number of Hits from block 46.

Figure 7A:
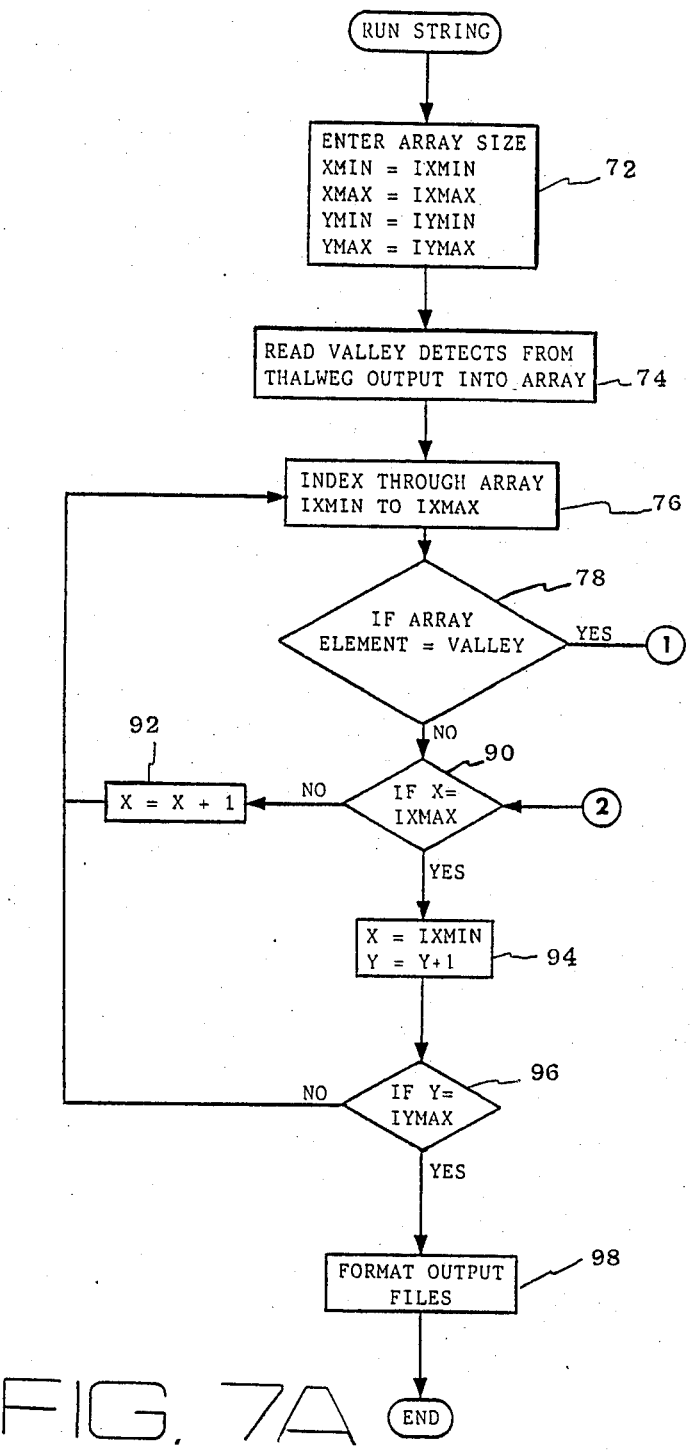
Figure 7B:
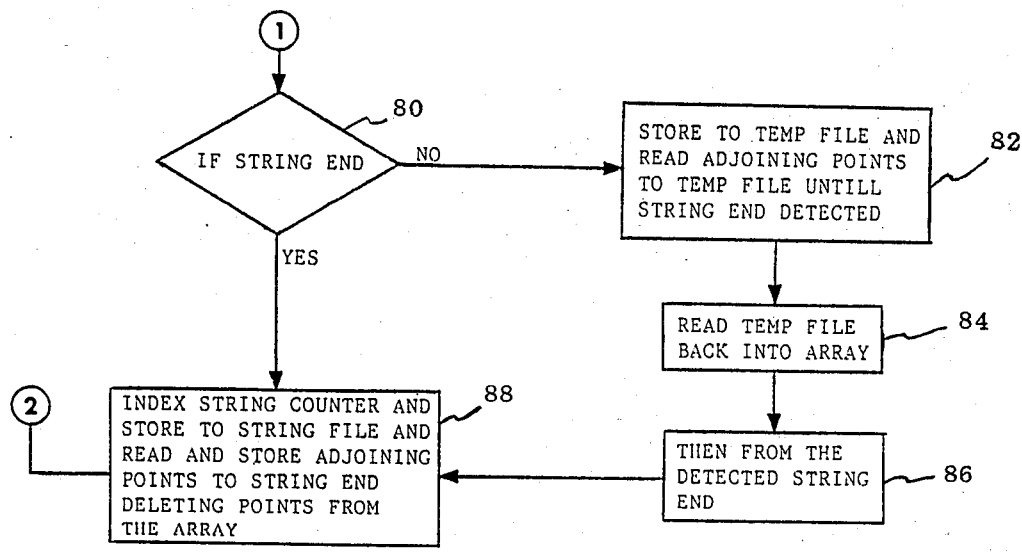

The output file of program "THALWEG" 16 is used as the input data to program "STRING" 18 in FIG. 1, shown in greater detail in the flow chart of FIGS. 7A and 7B. This program sorts the valley nodes into related valley strings, the valley strings being made up of all node points which are within a valley and adjacent each other. The valley node detects from program "THALWEG" 16 are stored in an array format equal in size to the digital terrain model and search is made of the array in order from minimum x to maximum x and minimum y to maximum y.

Figure 8:
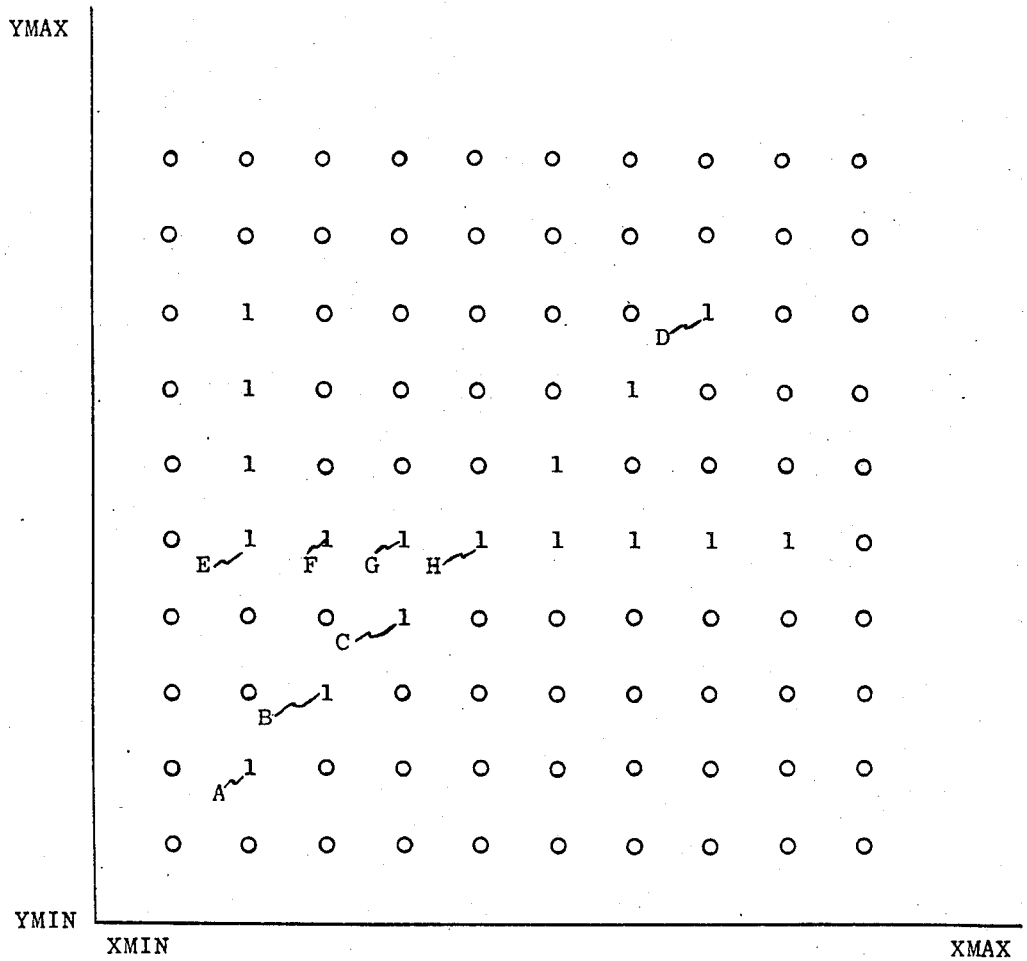

Referring to FIG. 8, there is illustrated an idealized array of the valley node detects from program "THALWEG" 16. The array is initially searched in the x direction with the y direction being incremented at the end of each x row. When a valley node is detected, as is shown at point A, the program first determines if the node is an end point, wherein an end point is defined as a detected valley node point having one and only adjacent valley node point. If the node is an end point, as point A, a string counter is indexed and the value of string counter is stored to a string file along with the x and y location of the point, the elevation of the point, the Trend and Plunge and Detects from the program "THALWEG" output file. The program then stores the location of the node for recall, deletes the contents of the node from the array and moves to the next adjacent node point, B, in the valley trend. It should be noted that once a valley is detected, the program follows that valley trend to its end point and substantially in the same direction in most cases, ignoring connecting side valleys. The program again tests for adjacent nodes and, if found, stores the node information, deletes the node from the array and moves the next adjacent node, C. This process is repeated until the program detects another end point, D, whereupon it stores the node information, deletes the node from the array and returns to the next x point adjoining the original end point.

If during the search of the array, a valley node is detected that is not an end point, E, then the program will store that point in a temporary file, delete it from the array and continue to the next adjoining node point, F. The program is designed in this instance to first test in the x direction for an adjoining valley node when a non-end point is first encountered. Point F and all succeeding points in the string are stored in the temporary file and deleted from the array until an end point is detected, point G. It should be remembered that point H was deleted from the array during the processing of the first string. The points stored in the temporary file are then read back into the array, the string counter is indexed again and the program does back through the string storing and deleting as previously described. The program subsequently returns to the next x point, F, adjoining the point where the non-end point detection was made and continues the search in the x direction.

Referring to the flow charts of FIGS. 7A and 7B, the array size is defined in block 72 as IXMIN to IXMAX and IYMIN to IYMAX. The valley detects from the output file of program "THALWEG" 16 are read into the array as shown in block 74. The program is then set to index through the array from IXMIN to IXMAX as shown in block 76 while testing each point to determine if a valley node is present as shown in block 78. If a valley node is detected, the program advances to block 80 and the adjacent points are tested to determine if the detected node is an end point. If the node is not an end point, the program proceeds to block 82 wherein the node and all adjoining nodes in the string are read into a temporary file until the end of the string is encountered. The program then reads the nodes from the temporary file back into the array as shown in block 84 and proceeds to block 86 where the end point of the string is encountered. In block 88, the program indexes the string counter and stores to a string file the node information for the end point and adjoining points in the string deleting the node from the array in the process. Returning to block 80, if the detected node is an end point, then the program proceeds directly to block 88 and performs the indexing, storing and deleting as previously described.

The program then moves to decision block 90 in which the x value is tested to determine if it is equal to IXMAX. If the condition is false, the x value is incremented by 1 in block 92 and the next array point in the x direction is tested for a valley node as shown in block 78. If the condition in block 90 is true, then the program advances to block 94 and the x value is set to IXMIN while the y value is incremented by 1. The y value is tested in decision block 96 to determine if it is equal to IYMAX. If the condition is false, the program tests the first x value in the new row for a valley node. If the test in block 96 is true, then all the array points have been tested and the information stored in the string file at block 88 is formatted for output as noted in block 98. FIG. 9 is an example of a table showing a portion of a formatted output of program "STRING" 18.

The string of valley nodes produced by program "STRING" 18 is now analyzed to select valley segments that will accurately represent the alley with the minimum number of segments and this analysis is performed employing program "VECTOR", 20 in FIG. 1. The first step in the process is to produce a series of nodal length vectors representative of the strings. FIG. 11 lists the criteria for defining the nodal lengths of the vectors. As shown in FIG. 11, vectors formed from the same string have common end points. In addition, string lengths of less than four nodes are omitted from the analysis. The vector lengths are equal to the string node length for the case where the string node lengths are from four to eight, while for string node lengths from nine to fifteen, two vectors are created for each node string length, keeping in mind that both vectors share a common end point.

In a case where the string node lengths are greater than fifteen, the strings will be arbitrarily divided into vectors having string node lengths of seven with additional vectors having string node lengths varying from six to eight. The formulas shown in FIG. 11 are used to calculate the vector node lengths. By way of example and referring to the formulas, terms and tables, assume that a string contains 23 nodes. SN is then equal to 23. Test Vector, TV, which is the arbitrary vector node length, is equal to 7. The adjusted node number, ANN, is then equal to:

$$ANN = \text{Integer}(23 - 1/7 - 1) + 23$$

$$ANN = 26,$$

the number of test vectors, NTV, is equal to:

NTV = Integer(26/7)

NTV = 3, and the node remainder, NR, is equal to:

NR = 26 − (7×3)

NR = 5

With a node remainder, NR, equal to 5 and referring to the tables at the bottom of FIG. 11, the total number of seven node vectors is equal to:

NTV − 1

3 − 1 = 2

Therefore, a string having a node length of 23 would be divided into two 7-node vectors and two 6-node vectors.

After each string valley has been vectorized, the trend direction and plunge angle is calculated for each vector segment. The vector segments are tested against a set of trend and plunge variance values defined by the operator. In a preferred embodiment, the variance values were set at 10 degrees.

Figure 12:
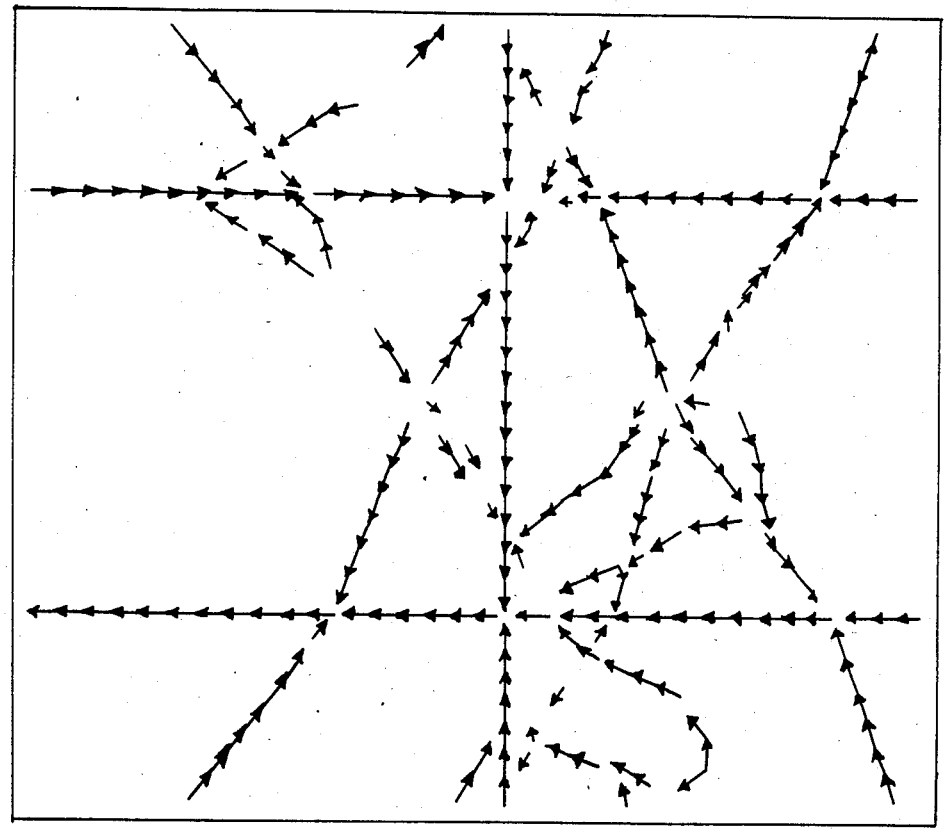
Figure 13:
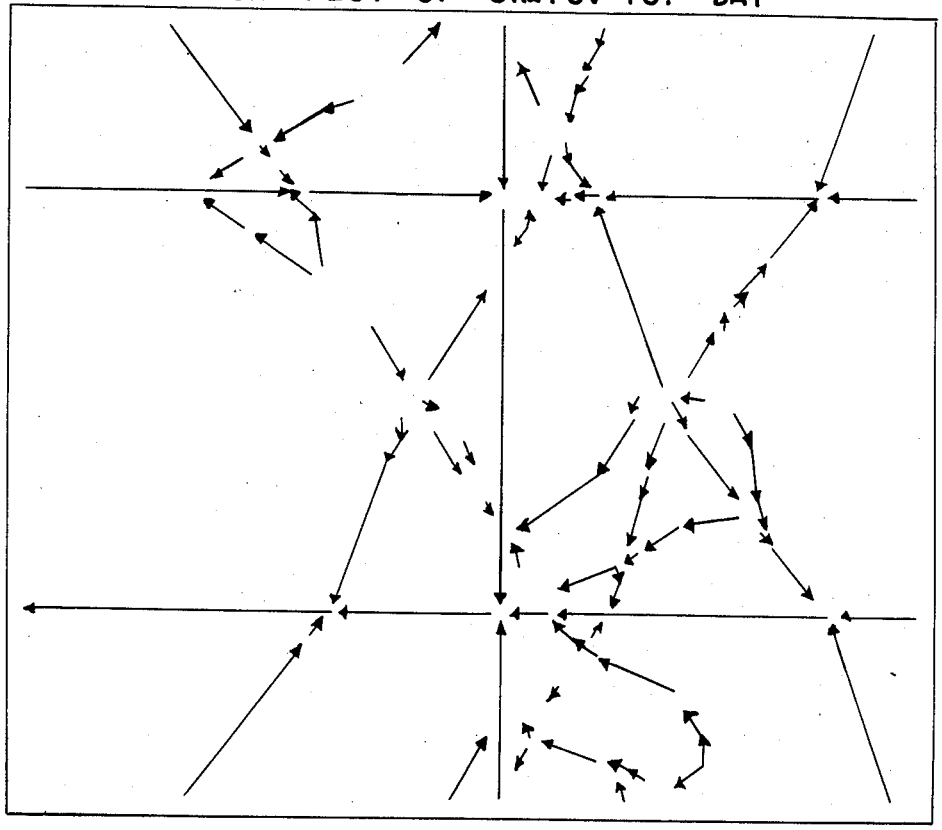

For those sequentially connected vectors whose trend and plunge values fall within the variance range, a new vector is calculated along with the trend, plunge, and length of the new vector. The relevant information associated with each vector, i.e. string number, trend, plunge, length, end points x and y and their elevations, is then stored. Each string is processed in the same manner until all strings are vectorized. FIGS. 12 and 13 are plots showing examples of vectorized string data where the vectors in FIG. 12 are not combined and the vectors in FIG. 13 are combined using 10 degree variance values.

Figure 10A:
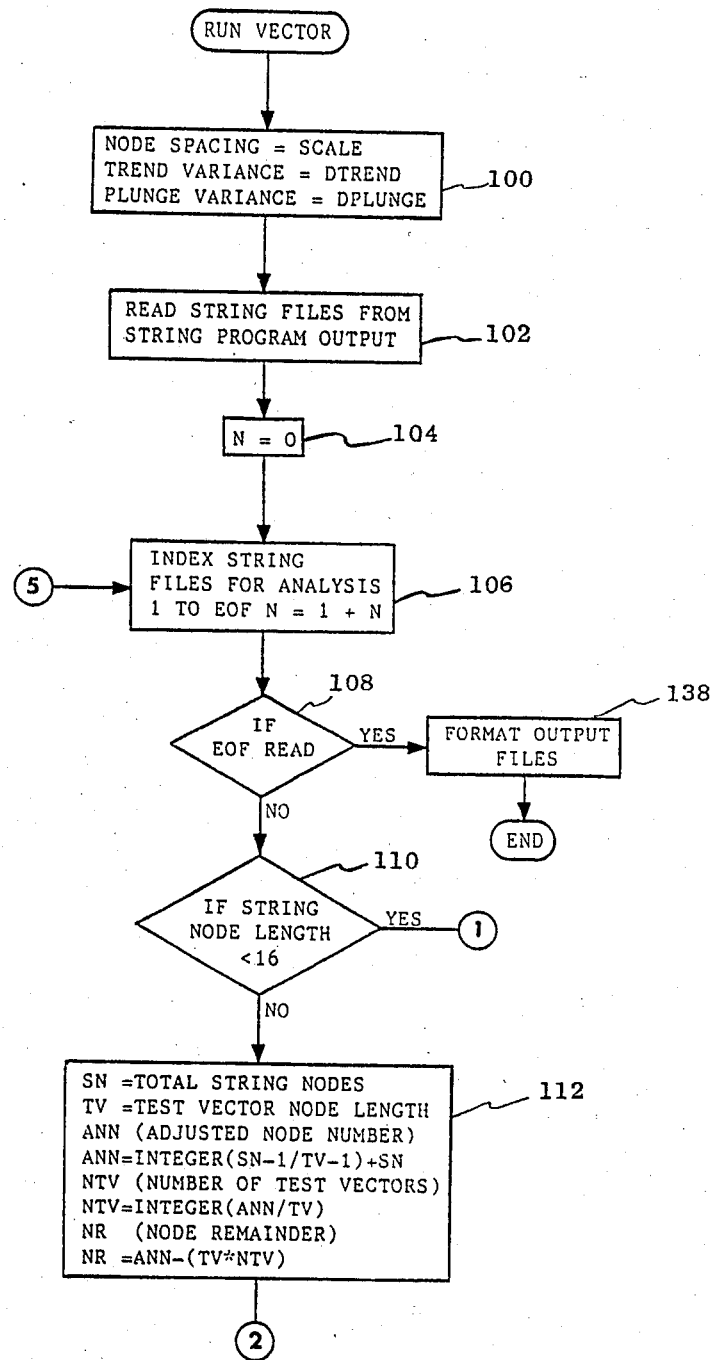
Figure 10B:
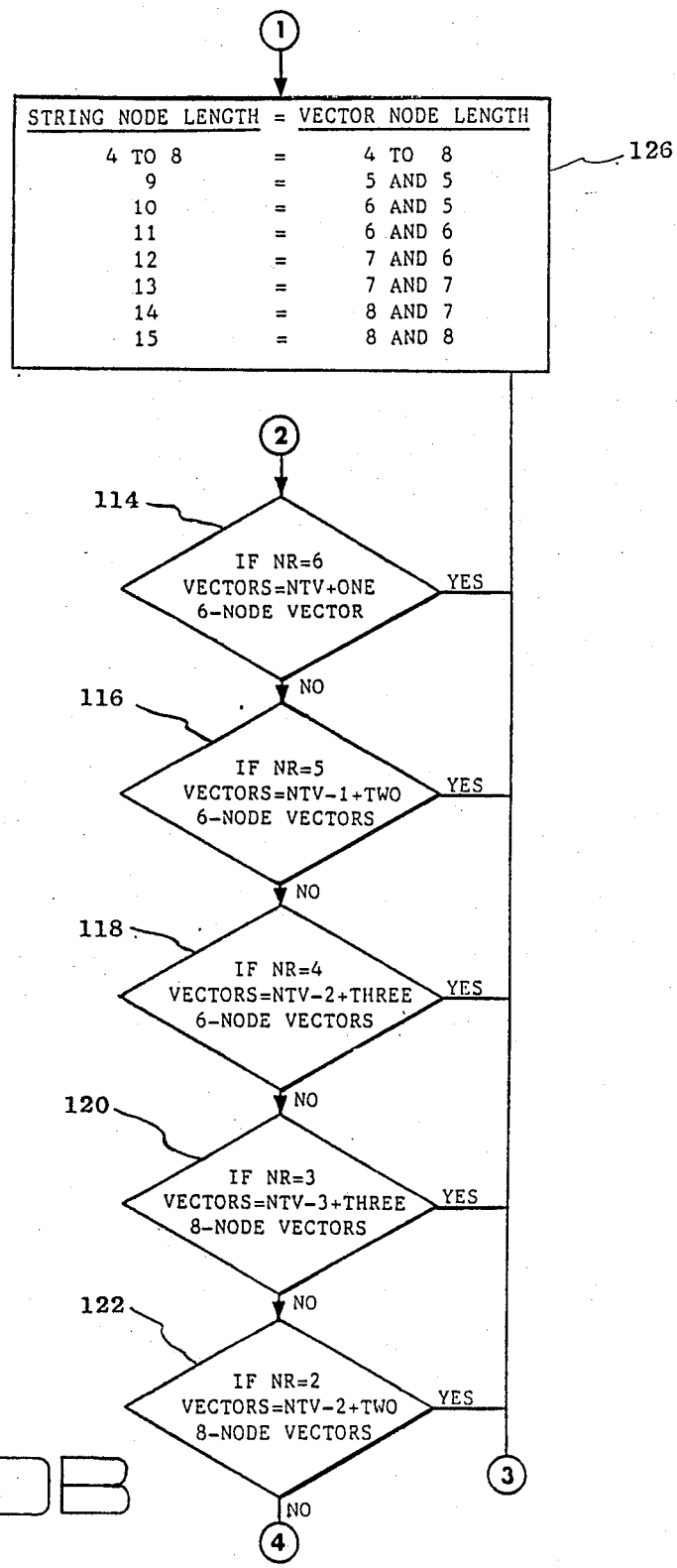
Figure 10C:
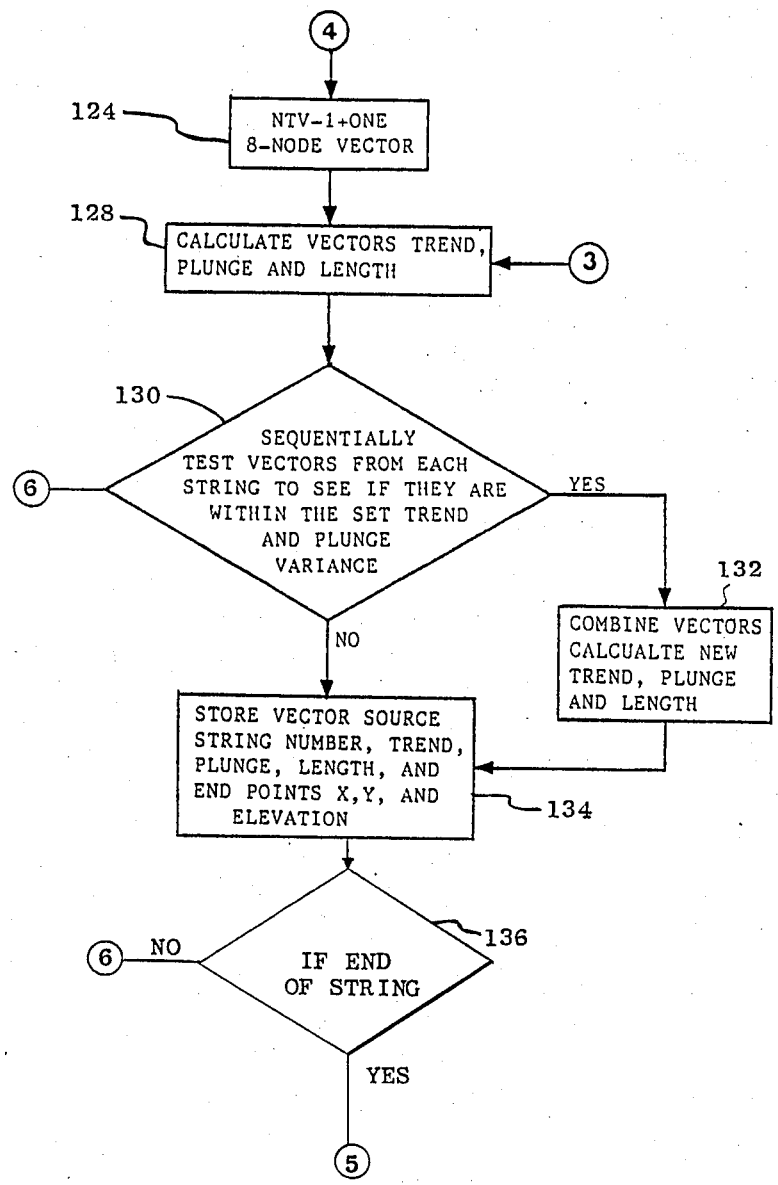

Referring now to the flow chart of FIGS. 10A through 10C for program "VECTOR", the scale is set equal to the node spacing of the terrain data and the trend and plunge variances are defined in block 100. The output file of program "STRING" 16 is read into a working file in block 102. The string files are indexed in ascending order for analysis, the string counter is set to 1 and an End of File flag, EOF, is set in block 106. Decision block 108 tests for the End of File flag and if the flag is not read, the program follows to decision block 110 where a determination is made regarding the total number of nodes in the string. If the string node length is greater than 16, then the program advances to block 112 where the node remainder is calculated as previously described. The program then proceeds through decision blocks 114 to 122 and block 124 to determine the number and lengths of vectors for the string.

Returning to decision block 110, if the string node length is less than 16, then the program transfers to block 126 for a determination based on the criteria shown in the block and previously described. The program then enters block 128 where the trends, plunges, and lengths are calculated for the vectors determined in blocks 114 through 126. In decision block 130, the vectors in the string are sequentially tested against the trend and plunge variance values and if sequential vectors fall within the variance values, they are combined, and the trend, plunge and length of the new vector is calculated as noted in block 132. The string number, trend, plunge, length, x and y values, and the elevations of the x and y values for the vector are stored as shown in block 134 after which the program moves forward to block 136 for making a determination as to whether the end of the string has been encountered. If the program is not at the end of the string, the program proceeds to decision block 130 to test sequentially the remaining vectors against the trend and variance values. If the end of the string is encountered in block 136, then the program returns to block 106 for incrementing the string counter by 1 and the next string is indexed.

Returning to decision block 130, if the trend and plunge of a vector are outside the variance values, then the program moves to block 134 where the data shown in the block is stored, and block 136 is then entered to determine if the end of the string has been encountered. After all the vectors in a string have been stored, the program proceeds to block 106 where, as previously stated, the string counter is incremented by 1 and the next string vectorized. This is repeated until the End of File flag is read in decision block 108 indicating that all the strings have been vectorized. The program then transfers to block 138 for formatting the stored vector data to an output file. An example of vector data in the output file of program "STRING" 18 is shown in the table of FIG. 14.

Figure 15A:
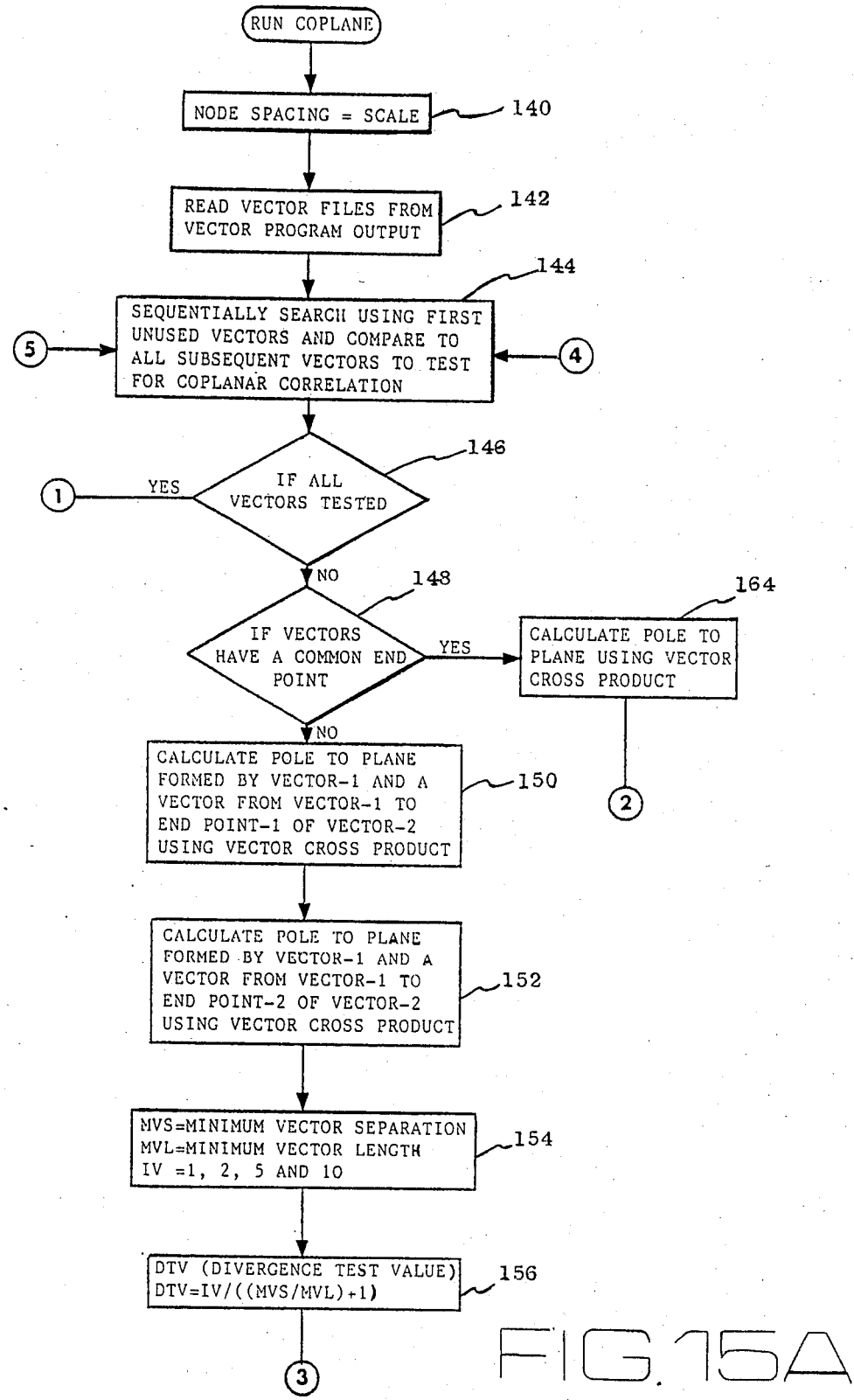
Figure 15B:
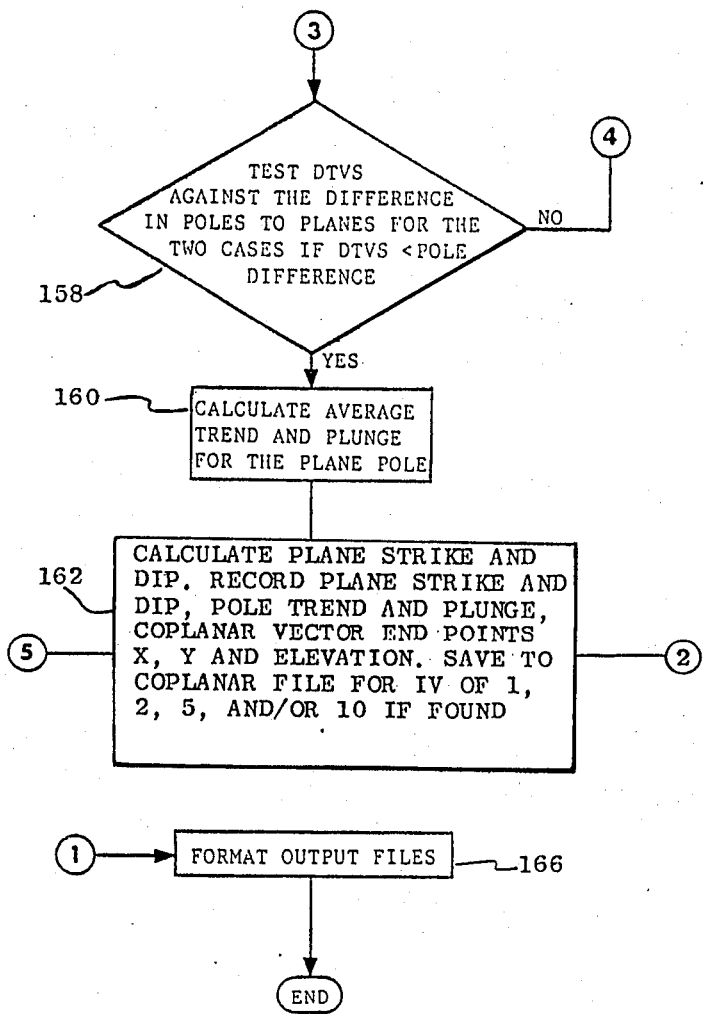

The analysis of the original digital terrain data has now been reduced to a file of vector segments in 3-dimensional space. The output file of program "VECTOR" 20 contains vectors with common end points which were derived from the same valley string, and isolated vectors related to other valley strings. Program "COPLANE" 22, in FIG. 1, and shown in greater detail in FIGS. 15A and 15B, correlates these vectors in 3-dimensional space to determine if geologically significant planes exist.

Figure 16A:
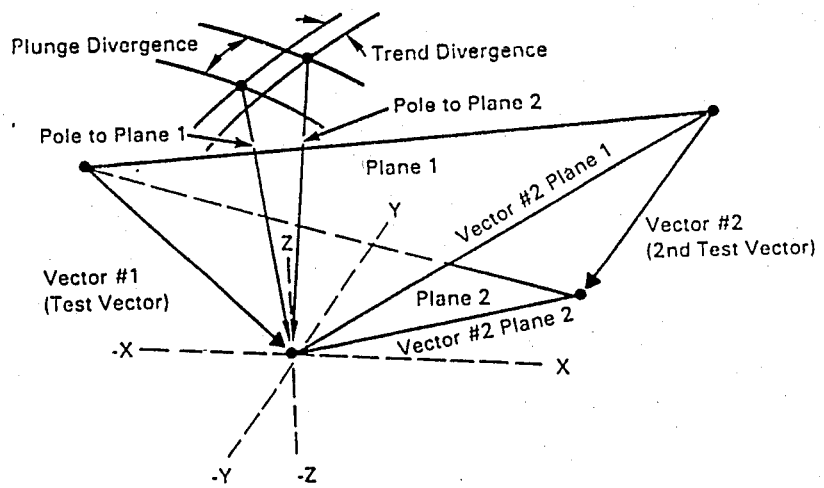
Figure 16B:
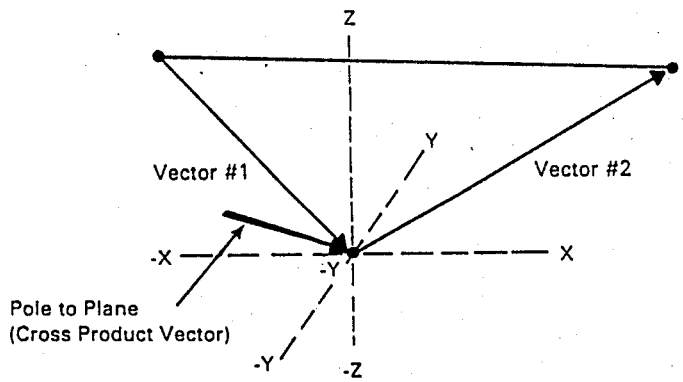

Referring now to FIG. 16A, there is illustrated a method for determining planes from vectors. Separated vectors are analyzed by calculating the cross product of the two vectors formed by the first test vector and one end of the second test vector to determine a pole to a plane 1. Then a pole to a plane 2 is determined by calculating the cross product of the two vectors formed by the first test vector and the other end of the second test vector. The divergence of these two poles in trend and plunge is tested against divergence test values to determine if the planes are substantially coplanar. If the planes are substantially coplanar, then the actual strike, dip and pole to the common plane is the average value for the two planes. A special case for coplanar correlations is shown in FIG. 16B where the two test vectors have a common end point. Under these conditions, the vectors uniquely define a plane and the pole to the plane.

Due to the original node spacing of the digital terrain data, a nonlinear test for coplanar correlation has been devised. Coplanar vectors which are close but do not have a common end point would be missed by the analysis of "COPLANE" 22 unless the divergence test is set at several degrees. However, this large divergence test value would in turn cause many unrelated vectors to be classified as coplanar and this effect is emphasized if one or both of the vectors are short. Therefore, the divergence test values used in this program are calculated from the function:

$$DTV = IV/((MVS/MVL)+1)$$

where
- DTV = Divergent Test Value
- IV = Input Value in degrees
- MVS = Minimum Vector Separation
- MVL = Minimum Vector Length This function causes the divergent test to depend on both the minimum vector separation and the minimum vector length. There are four values assigned to Input Value, IV, and this requires four divergence tests to be performed on the differences between the trends and the plunges to the poles of the two test planes. In addition, four files are created to store the data relating to each Divergent Test Value.

Referring again to FIGS. 15A and 15B, block 140 illustrates the scale as being set to the original node spacing of the digital terrain data. The output file of program "VECTOR" 20 is read into a working file as noted in block 142, and in block 144, the first unused vector is loaded and compared against the first of all subsequent vectors to test for coplanar correlation. In decision block 146, a determination is made if all unused vectors have been tested against subsequent vectors. If the condition is false, the program follows to decision block 148 where a determination is made as to whether a common end point exists for the vectors. If the vectors do not have a common end point, the program proceeds to blocks 150 and 152 for calculation of poles to the planes using vector cross products as previously described. The program then advances to block 154 wherein the Minimum Vector Separation, MVS, and the Minimum Vector Length, MVL, are calculated and where the input values, IV, are set to 1, 2, 5 and 10 respectively. In block 156, the divergence test values are calculated for IV equal to 1, 2, 5 and 10. The program then advances to decision block 158 for testing each of the divergence test values against the differences in both the trend and plunge of the poles. If the differences in the trend and plunge of the poles are less than any of the divergence test values, then the program advances to block 160 and the average trend and plunge values of the poles are calculated to produce an average plane pole. The program proceeds to block 162 where the strike and dip of the plane are calculated and stored in the Coplane file corresponding to the Divergent Test Value giving a true condition. In addition, the x and y end point locations and elevations for the coplanar vectors are stored in the file. It should be remembered that each of the four Divergent Test Values are tested in block 158 requiring four Coplanar Files in block 162 to store the results. After testing, calculating and storing the data in blocks 158 through 162, the program returns to block 144 for testing the next sequential vector. If all conditions in block 158 were false, the program also returns to block 144.

Returning to block 148, where vectors are tested for common end points, if this condition is true the program proceeds to block 164 with the pole to the plane being calculated using the vector cross product. The program then transfers to block 162 where the strike and dip of the plane are calculated and stored along with the elevation and location of the x and y end points of the coplanar vectors. Again the program proceeds to block 144 where the next sequential vector is found for testing. The testing of the unused vectors against all other vectors is repeated until all vectors have been tested against each other whereupon the result of decision block 146 is true and block 166 is entered with the data stored in the various Coplanar files being formatted to output files. An example of data stored in the output file of programs "COPLANE" 22 is shown in FIG. 17.

It is also possible to perform coplanar analysis of 3-dimensional point data as shown in FIG. 1 by using program "COPLANE-P" 32. This program is similar to program "COPLANE" 22 in that the coplanar analysis of vectors is performed in substantially the same manner. However, the input data set to program "COPLANE-P" are points in 3-dimensional space requiring additional processing in order to provide coplanar analysis. Each point in the data set is combined with all other four point combinations in the data set to produce vector combinations which are tested for coplanar correlation.

Figure 18A:
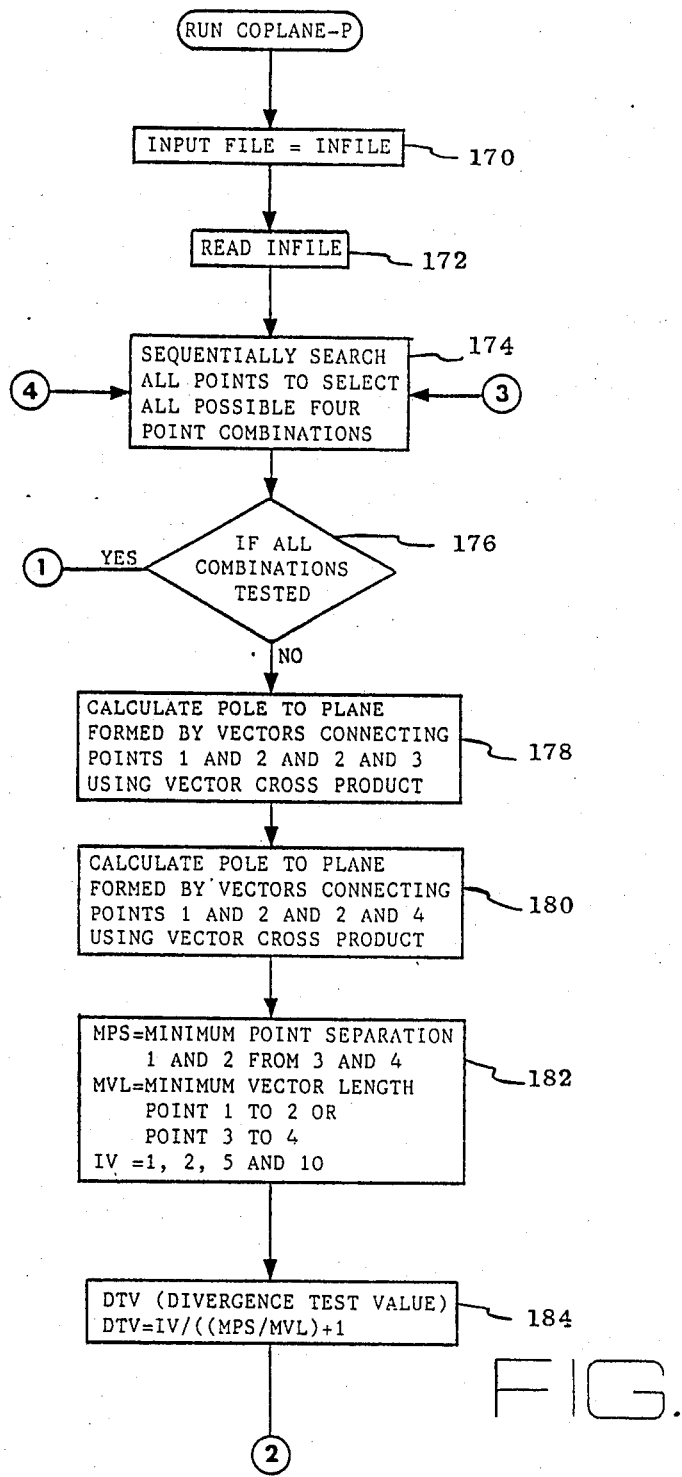
Figure 18B:
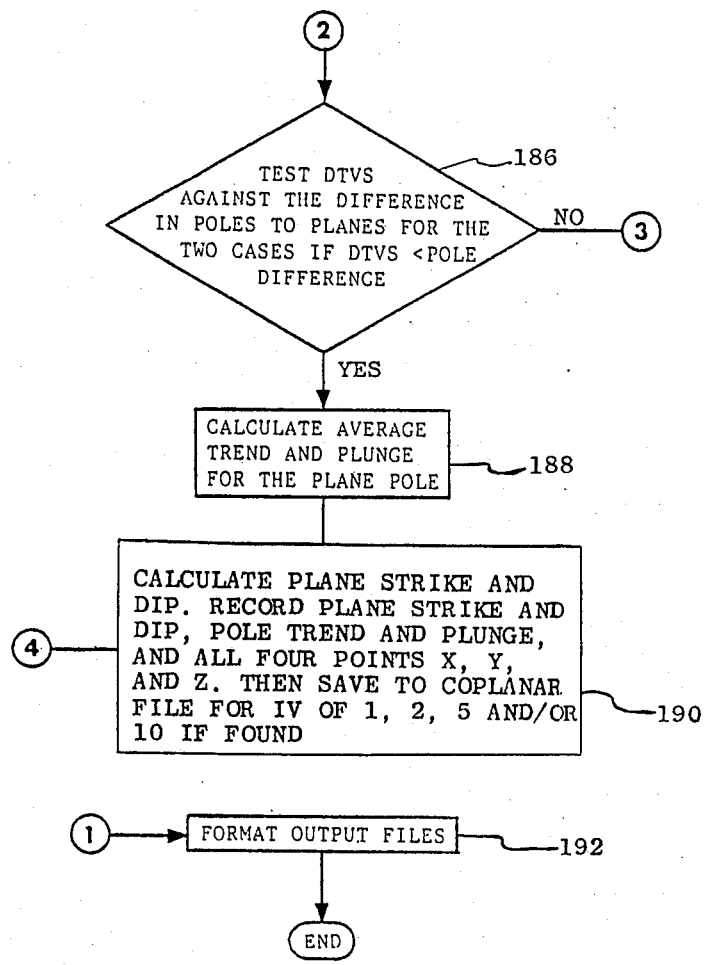

Referring now to FIGS. 18A and 18B, showing the flow chart for program "COPLANE-P", the file to be tested is defined in block 170 and the 3-dimensional point data is read into the file in block 172. The program then advances to block 174 where all the data points are sequentially searched to select all four point combinations. In decision block 176, the program tests to determine if all four point combinations have been selected and tested, and if the condition is false, the program proceeds to block 178, the beginning of the coplane analysis. In blocks 178 and 180, vectors are formed from the points and the poles to planes formed therefrom are calculated. The calculation process was previously described in relation to FIGS. 16A and 16B. The program then proceeds to block 182 where the Minimum Point Separation, MPS, and the Minimum Vector Length, MVL, are calculated and the Input Value, IV, is set to 1, 2, 5 and 10. The Divergent Test Values are calculated in block 184.

The program proceeds to decision block 186 in which each Divergent Test Value is tested against the differences in the trend and plunge for the two poles. For each divergent test that is true, the program calculates the average trend and plunge for the plane pole as noted in block 188. The strike and dip of the plane are then calculated and stored, along with the elevations and x and y locations of the four points in the respective Coplanar file as shown in block 190. The program then returns to block 174 to obtain four more points, or the program reaches this block from decision block 186 when all test conditions in block 186 are false. The program continues the coplanar analysis until all possible data point combinations have been tested whereupon the test in decision block 176 is true and the program transfers to block 192 whereby the various coplanar files are formatted to output files.

Returning to FIG. 1, a series of output analysis programs are provided to display the output files of hereinabove described programs, as well as manually selected vectors, for geologic interpretation and verification of the program outputs. Programs "VECPLT" 28, "PLAPLT" 26 and "ROSE" 30 utilize known Calcomp program plot commands.

Figure 19:
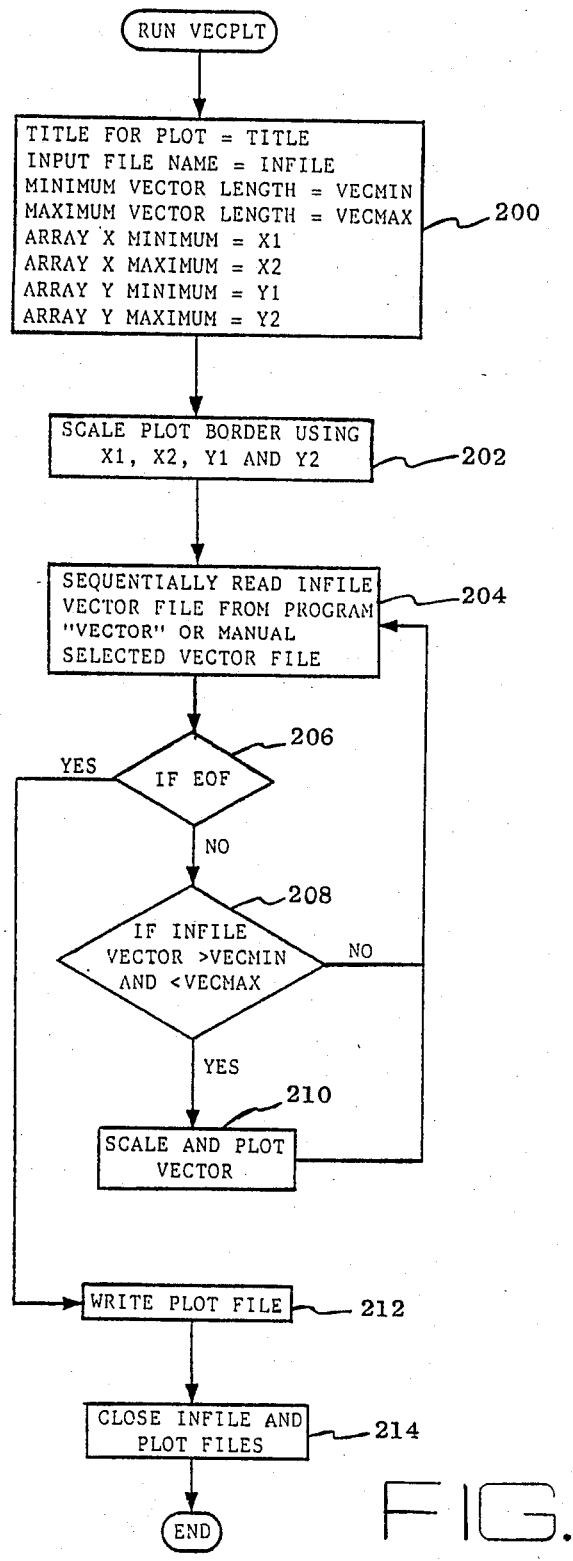

Referring now to FIG. 19, the flow chart is illustrated for program "VECPLT" 28 which plots the output file of program "VECTOR" 20, or the manually selected vectors. In block 200, title information, minimum and maximum vector length and array size is entered in addition to definition of the file for processing. In block 202, the plot border is scaled employing the array information from block 200. The program then sequentially reads the vectors from the Infile in block 204 and determines each time if the End of File, EOF, has been encountered as noted in decision block 206. The vectors are tested in decision block 208 to determine if they are within the minimum and maximum vector lengths and when the vectors are within the minimum and maximum vector length limits, they are scaled and plotted as noted in block 210 using standard Calcomp program commands. When vectors are outside the minimum and maximum vector lengths, they are omitted from the scaling and plotting process. When the End of File, EOF, is encountered, the program advances to block 212 where accumulated Calcomp program commands are written to a Plot File. The program then proceeds to block 214 in which the In file and the Plot Files are closed. FIGS. 12 and 13 are also examples of the plotted data from this program.

Figure 20:
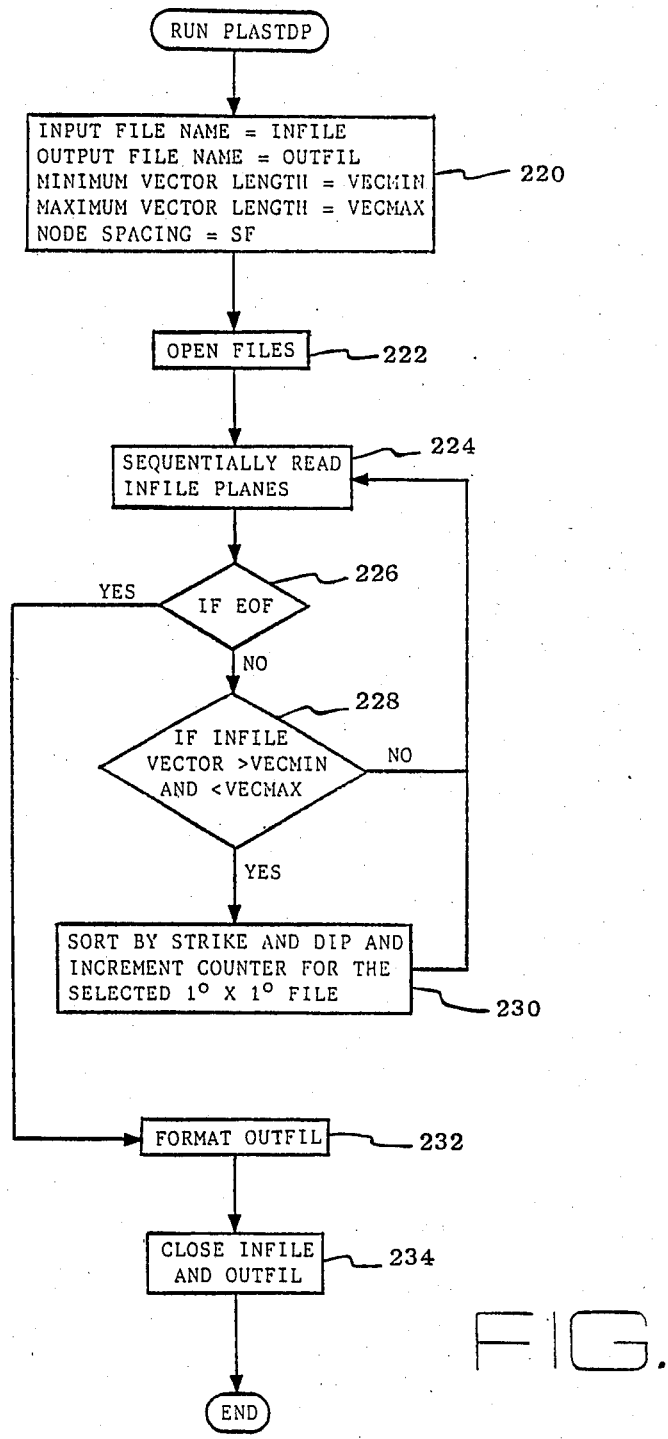

Referring now to FIG. 20, there is shown a flow chart for program "PLASTDP" 24 which produces a table summarizing the strikes and dips of planes from programs "COPLANE" 22 and "COPLANE-P" 32. The table is formatted in 1 degree increments for both strike and dip and the contents of the table are the number of planes found for each strike and dip combination. In block 220, the input and output files are defined along with the minimum and maximum vector lengths and node spacing. In block 222, the input and output files are opened. The program sequentially reads the Infile planes in block 224 and tests each time for the End of File, EOF, in block 226. Until the End of File is encountered, the program calculates the vector lengths for each plane and determines if the vector lengths are outside the minimum and maximum vector length values as noted in decision block 228. When the planes vectors are within the minimum and maximum vector length values, the program sorts the planes in 1 degree increments for both strike and dip and increment counters total the number of planes for each strike and dip as shown in block 230. If the vector lengths for a plane are outside the minimum and maximum vector length, then the plane is not sorted by the program, as shown in decision block 228. When the End of File, EOF, is encountered in decision block 226, the program proceeds to block 232 where the sorted strike and dip data is formatted to the output file and the program then closes both the input and output files as shown in block 234. FIG. 21 is an example of a portion of an output file of program "PLASTDP" 24.

Figure 22A:
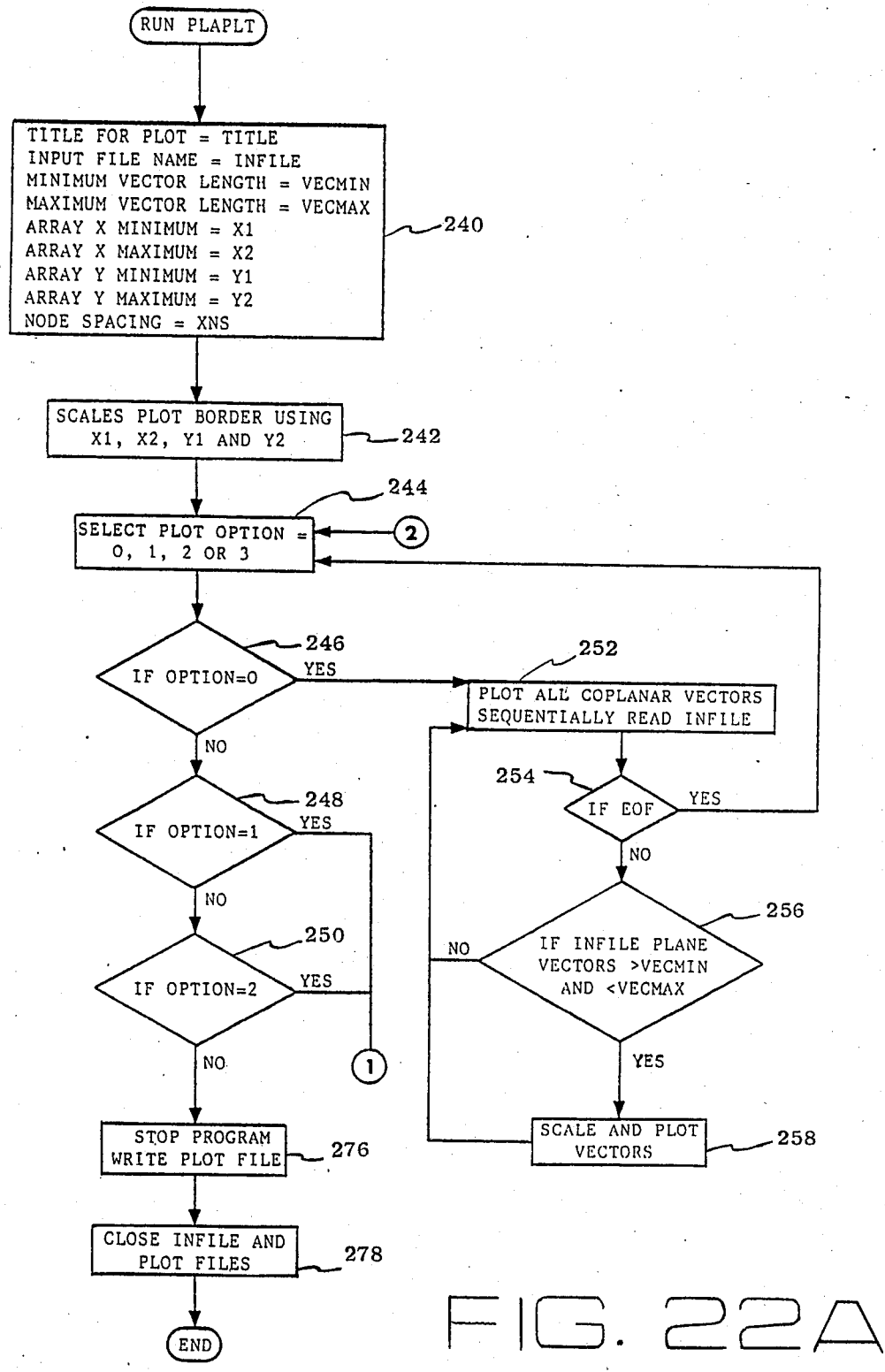
Figure 22B:
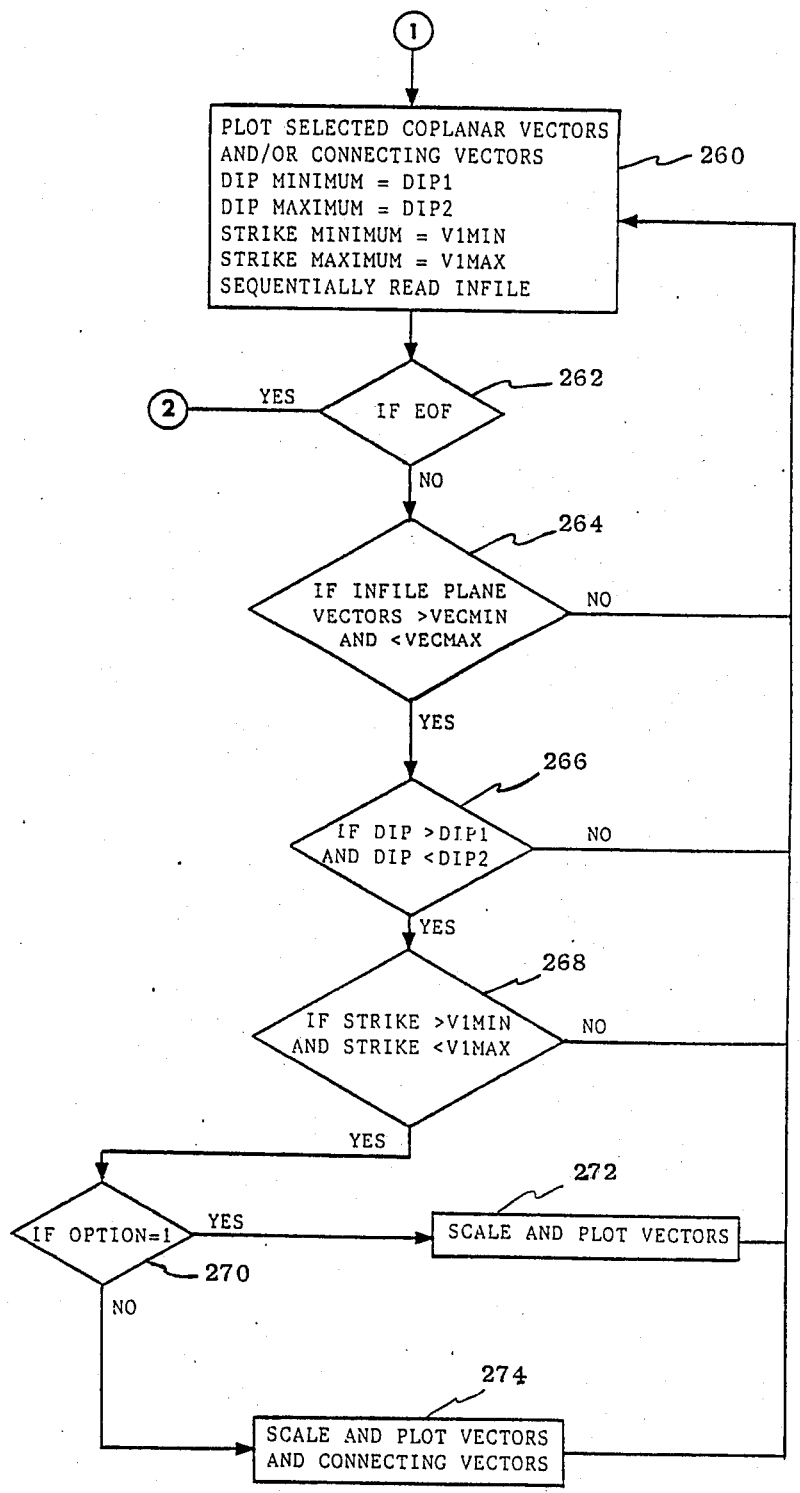

Referring to FIGS. 22A and 22B, there is shown a flow chart for program "PLAPLT" 26 which produces multiple plots from the output files of program "COPLANE" 22 and "COPLANE-P" 32. The first option is a plot of all coplanar vectors falling within a specified range of vector lengths. This option can be used in conjunction with program "PLASTDP" 24 in which vector lengths also have a specified range. The second option plots the coplanar vectors within a specified strike and dip range. The final option is for plotting vectors which are coplanar and connected by vectors from their end points. This allows the projection of the trapezium thus formed to be plotted.

Block 240 shows the title for the plot, the input file to be used, the minimum and maximum vector lengths, the array size, and the node spacing being defined. The plot border is scaled in block 242 using the previous array values. At block 244, the plot option is selected with options 0, 1 and 2 relating to plots as mentioned below and option 3 ending the program. After the plot option has been selected, the program proceeds through blocks 246, 248 and 250 to determine which plot routine to initialize. If option 0 is selected, the program proceeds to block 252 wherein all coplanar vectors are read sequentially from the Infile. As long as the End of File is not encountered, the condition in decision block 254 is false and the sequentially read vectors will be tested against the minimum and maximum vector length values as shown in decision block 256. Those vectors that fall within the minimum and maximum vector length range are scaled and plotted using Calcomp program commands and accumulated in a file as shown in block 258, while those vectors that are outside the minimum and maximum vector length range are not scaled and plotted. When the End of File is encountered, the condition in decision block 254 is true and the program returns to block 244 to select another option.

If option 1 or 2 is selected, the program advances to block 260 wherein the minimum and maximum strikes and dips are set and the Infile is sequentially read. As long as the End of File, EOF, is not encountered, the condition in decision block 262 is false, and the program continues on to decision block 264 with the vector lengths being checked to determine if they are within the minimum and maximum vector length range. For those vectors meeting the criteria in decision block 264, the program proceeds to decision blocks 266 and 268 wherein the dips and strikes of the planes associated with the vectors are tested against the minimum and maximum dip range and strike range. For those vectors associated with the planes that are within the minimum and maximum dip range and strike range, the program proceeds to decision block 270 and a determination is made as to which option was chosen. If option 1 was chosen, the program goes to block 272 with the vectors being scaled, plotted using Calcomp program commands and accumulated in a file. If option 2 was chosen, the program moves to block 274 for scaling and plotting the vectors, connecting vectors using Calcomp program commands and accumulating the same in a file.

Figure 23:
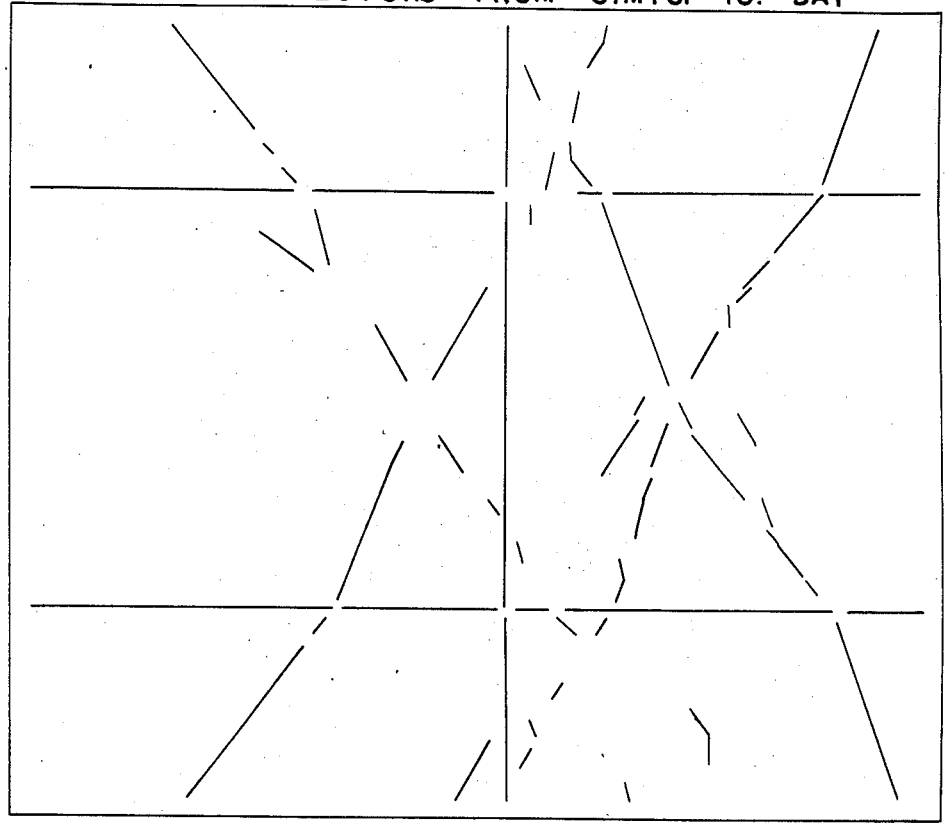
Figure 24:
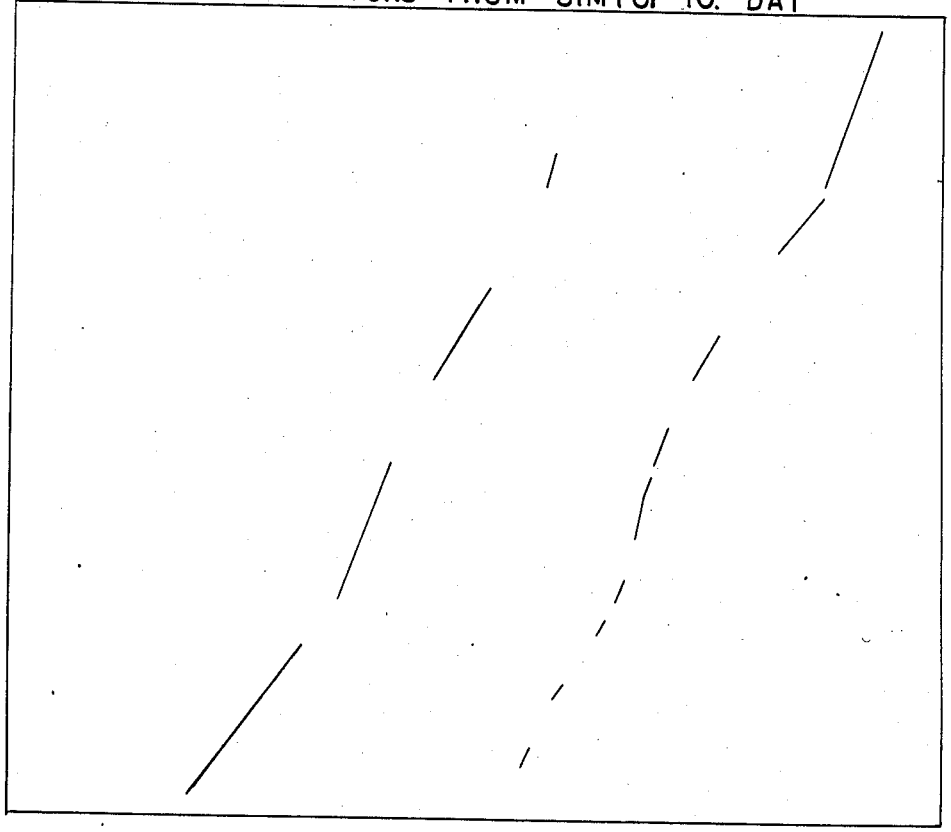
Figure 25:
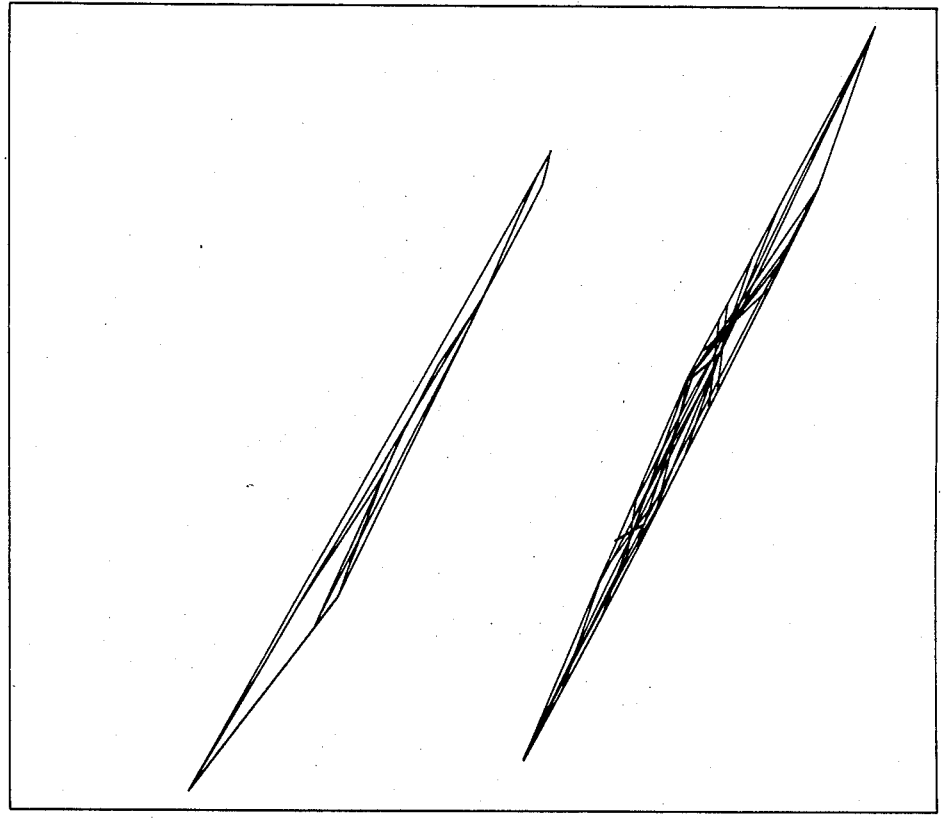

When the End of File, EOF, is encountered in block 262, the program proceeds to block 244 to wait for the next option. If option three is chosen, the conditions in decision blocks 246, 248 and 250 are all false and the program advances to block 276 wherein the plot files are written, the program closing the Infiles and plot files as noted in block 278. Examples of the plots from options 0, 1 and 2 are shown respectively by FIGS. 23, 24 and 25. These plots correspond to the data given by FIGS. 4, 5, 12 and 13.

Figure 26A:
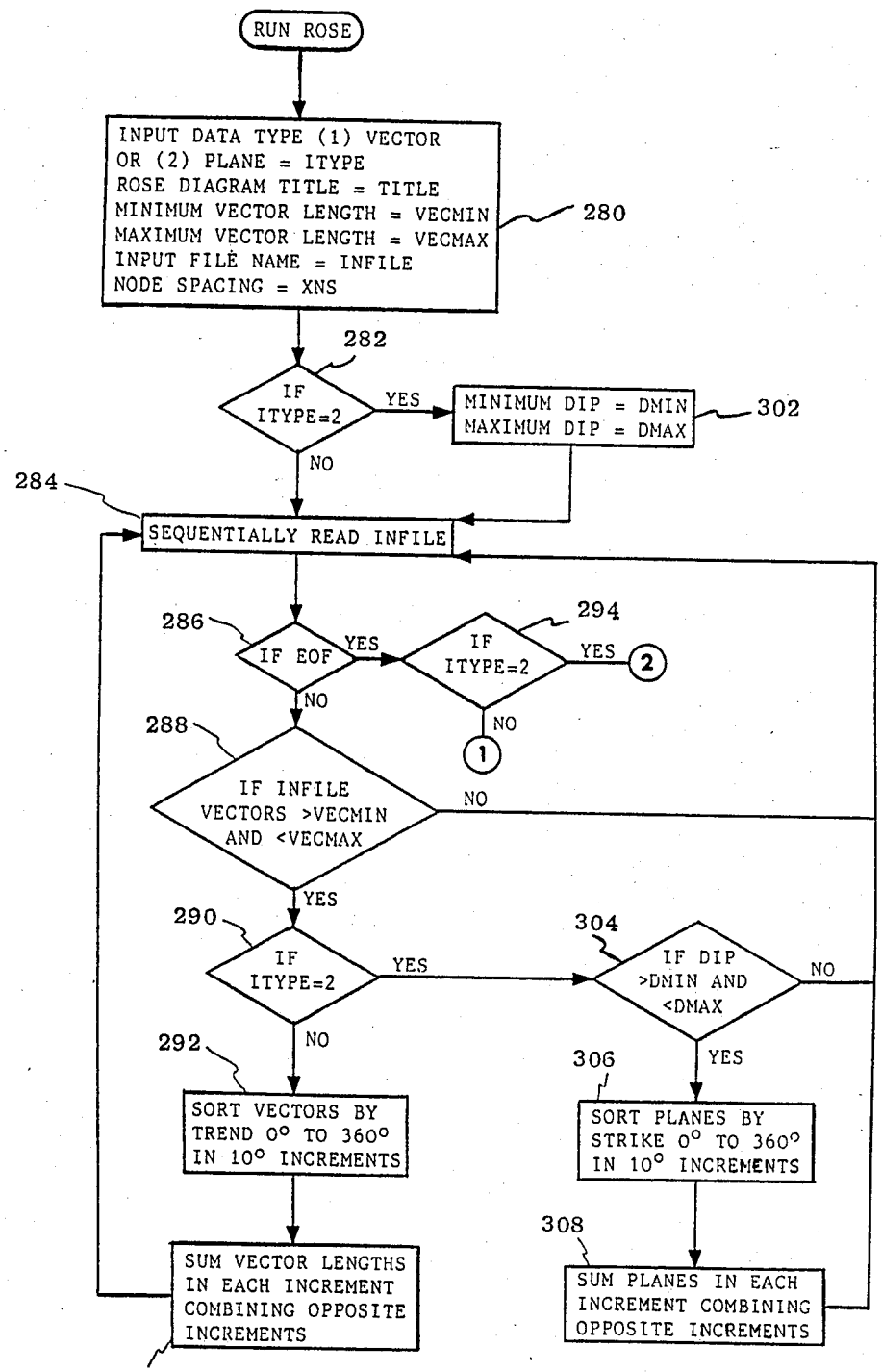
Figure 26B:
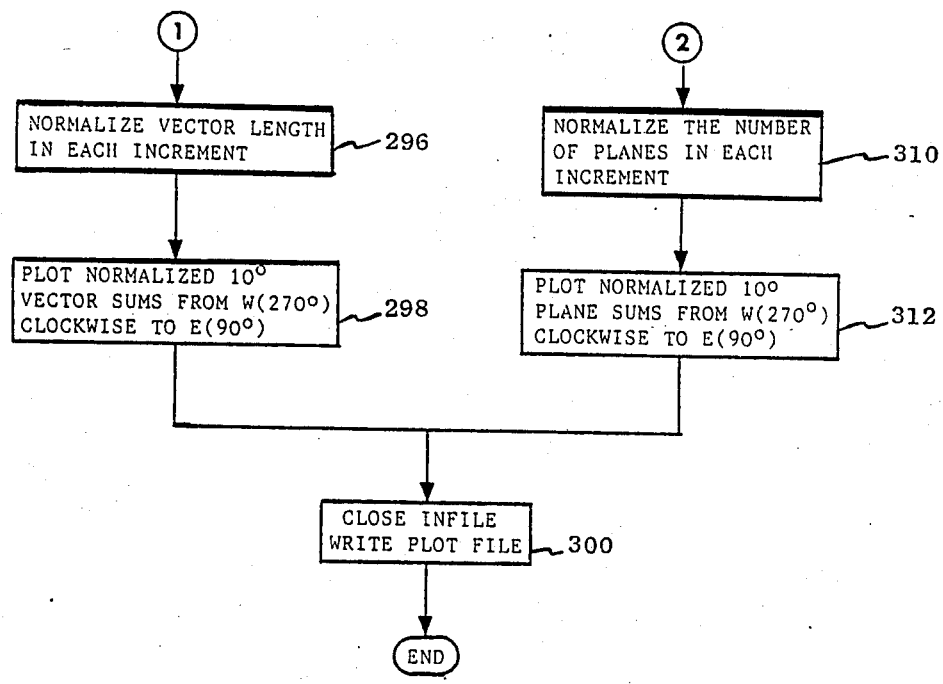

Referring now to FIGS. 26A and 26B, a flow chart for program "ROSE" 30 is illustrated for plotting vector data and plane data in rose diagram form. The rose diagrams developed are segmented in trend for vectors, or strike for planes, by 10 degree increments, and are normalized for vector length or number of planes depending on the type of input file. Vectors are selected for the analysis according to a length range which is specified by the operator, while planes are analyzed only if they were formed by vectors within a specified length range.

In block 280, the input data type, the title of the plot, the minimum and maximum vector length, the input file to be read and the node spacing are all defined. It will be assumed for the purpose of initial explanation that the input data are vectors from the program "VECTOR" 20 output file, or, alternatively, Manually Selected Vectors. The program sequentially reads the vectors from the Infile as shown in block 284 after determining the input data type in decision block 282. As long as the End of File, EOF, is not encountered in decision block 286, the program will test the vector lengths against the minimum and maximum vector lengths in decision block 288. After each vector length is tested, the program again makes the determination as to the type of data being used as noted in decision block 290. Assuming vector input data type, the vectors are sorted by trend in 10 degree increments from 0 to 360 degrees in block 292. In block 295, the vector lengths are continually summed for each increment, with opposite increments being combined, that is to say any vector whose trend is greater than 90 degrees and less than or equal to 180 degrees will have 180 degrees added to its trend value before summing, and any vector whose trend is greater than 180 degrees and less than 270 degrees will have 180 degrees subtracted from its trend value before summing.

When End of File is encountered in decision block 286, the program passes to decision block 294 for a determination of input data type, with the program proceeding to block 296 for vector type data where summed vector lengths in 10 degree increments are normalized. In block 298 the normalized 10 degree vector sums are plotted from 270 degrees clockwise to 90 degrees using Calcomp program commands, after which the program advances to block 300 for closing the Infile and writing the plot file.

Returning now to decision block 282, if the input data is from the output files of program "COPLANE" 22 or "COPLANE-P" 32, then the input data type is 2 and the program in block 302 defines the minimum and maximum dip. Then, in block 284, the Infile is sequentially read until the End of File, EOF, is encountered. The vector lengths associated with the planes in the Infile are tested against the vector length limits in decision block 288, and if the vector lengths are within range, the program proceeds to decision block 304, through decision block 290, which tests for input data type. In decision block 304 the dip angles of the planes are tested against the dip angle limits and when the dip angles of the planes are within range, the program advances to block 306 for sorting the strike directions of the planes in 10 degree increments. In block 308 the planes are continually summed with the strikes of planes of opposite increments, i.e. combined in the same manner as were trend directions for vectors.

Figure 27:
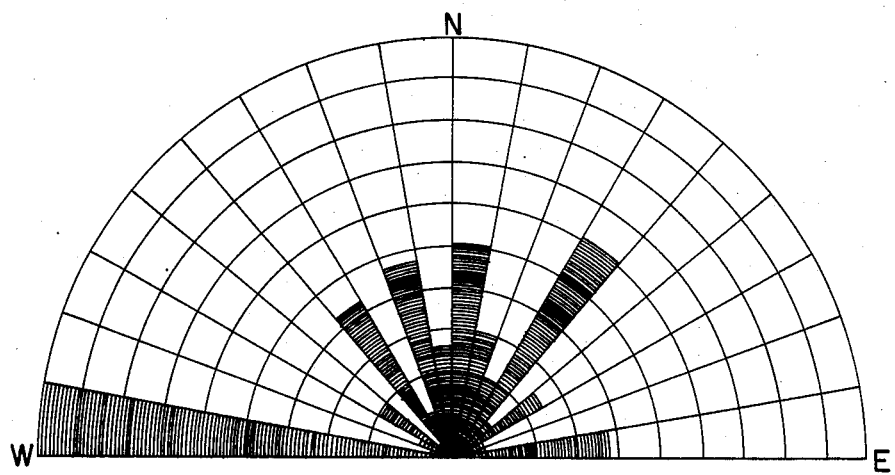
Figure 28:
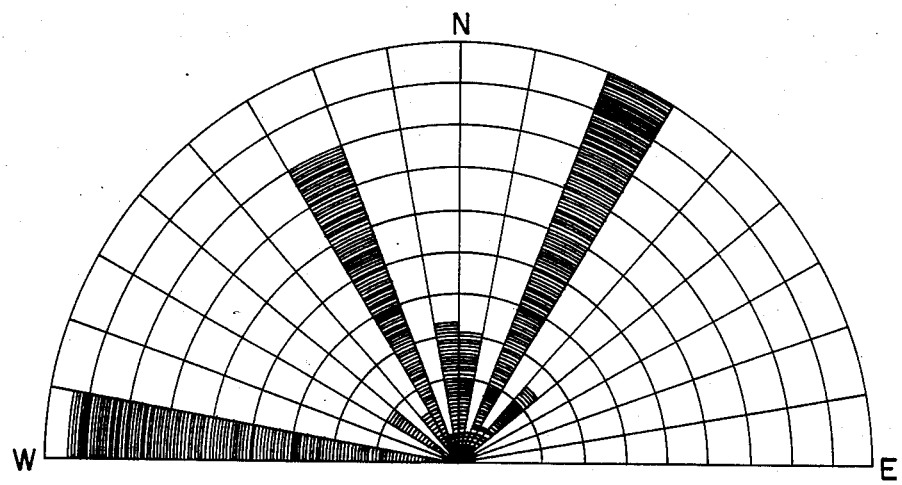

When all the plane data in the Infile has been read, the End of File is encountered and the program proceeds to decision block 294 through decision block 286. Since the input data type is planar, the program moves to block 310 wherein the number of planes in each increment is normalized, and in block 312 the normalized plane sums are plotted and stored using Calcomp program commands. In block 300 the Infile is closed and the plot file is written. FIGS. 27 and 28 are examples of rose diagram plots using the above program. FIG. 27 is a plot of normalized vector lengths corresponding to the vectors shown in FIG. 13, and FIG. 28 is a plot of the normalized number of coplanar correlations detected by strike.

Listings of Fortran programs generally implementing the flow charts hereinbefore described are included in Appendix I to this specification.

While a preferred embodiment of the present invention has been shown and described, it will be apparent to those skilled in the art that many changes and modifications may be made without departing from the invention in its broader aspects. For example, there are other methods of defining coplanar vectors such as line interceptors and statistical techniques. The appended claims are therefore intended to cover all such changes and modifications as fall within the true spirit and scope of the invention.

APPENDIX I for patent application entitled

PROCESS FOR STRUCTURAL GEOLOGIC ANALYSIS OF TOPOGRAPHY

```
C      PROGRAM:  THALWEG
C      WRITTEN BY:  JAY R. ELIASON - JULY 1983
C      FUNCTION:  DETECTS VALLEY NODES IN DIGITAL TOPOGRAPHIC ARRAYS
C      THIS PROGRAM REQUIRES THE FOLLOWING ASSIGNMENTS:
C      ASSIGN (INPUT FILE NAME) FOR001 [INPUT DATA FILE]
C      ASSIGN VALLEY.DAT FOR002 [LINE PRINTER FORMATED FILE OR VALLEY
                                  DETECTION]
C      ASSIGN DISPANL.DAT FOR004 [OUTPUT DATA FILE INCLUDES XNODE, YNODE,
C                                  ELEVATION, TREND, PLUNGE, HITS]
C      ASSIGN COUNT.DAT FOR005 [SUMMARY FILE OF VALLEY DETECTS CORRESPONDING
C                                TO 32 TRENDS, 0-360 DEGREES]
C      ASSIGN TOTAL.DAT FOR006 [SUMMARY FILE OF VALLEY DETECTS CORRESPONDING
C                                TO 16 TRENDS, 0-180 DEGREES]
C      ************** DIMENSION FILE DESCRIPTIONS **************
C      ***** INPUT - CONTAINS THE INPUT DATA
C      ***** VALLEY - CONTAINS ALL "0" EXCEPT WHERE VALLEYS ARE
C                     DETECTED "1"
C      ***** VALLEY1 - HORIZONTAL FILTERED VALLEY DETECTS WHICH IS ALSO
C                      USED TO ACCUMULATE THE FINAL VALLEY DETECT DATA
C      ***** VALLEY2 - VERTICAL FILTERED VALLEY DETECTS
C      ***** TREND - TREND FILE FOR DETECTED VALLEYS
C      ***** WORK - TEMPORARY FILE USED TO STORE THE 7 X 7 NODE DATA
C                    USED BY THE VALLEY DETECTOR
C      ***** T - TRENDS USED FOR OUTPUT
```

```
C     ***** DISPANL - FILE USED TO ACCUMULATE OUTPUT DATA, XNODE,
C                     YNODE, ELEVATION, TREND, PLUNGE & HITS
C     ***** DETECT - ELEVATION DATA FOR DETECTED NODES
C     ***** COUNT - SUMMARY OF DETECTED VALLEYS BY TREND 0-360 DEGREES
C     ***** TOTAL - SUMMARY OF DETECTED VALLEYS BY TREND 0-180 DEGREES
C     ***** T1 - TRENDS USED BY THE VALLEY DETECTOR
C     ***** PLUNGE - PLUNGE OF DETECTED VALLEYS
C     ***** HITS - TOTAL VALLEY DETECTOR DETECTS FOR EACH NODE
C     ***********************************************************
C
      REAL INPUT
      DIMENSION INPUT(650,650),VALLEY(650,650),TREND(650,650),WORK(33,5)
      DIMENSION T(32),DISPANL(50000,6),DETECT(650,650),VALLEY1(650,650)
      DIMENSION COUNT(32,2),TOTAL(16,2),T1(32),PLUNGE(650,650),HITS(650,650)
      DIMENSION VALLEY2(650,650),BUFFER(1800)
      INTEGER Z,VALLEY,X1,X2,Y1,Y2,A,B,C,F,VALLEY1,WORM,VALLEY2
      BYTE VA(2)
      DATA VA/'.','*'/
      TYPE *, 'ENTER INPUT ARRAY X NODE MAXIMUM'
      ACCEPT *, IXMAX
      TYPE *, 'ENTER INPUT ARRAY Y NODE MAXIMUM'
      ACCEPT *, IYMAX
      TYPE *, 'ENTER NODE SPACING IN FEET'
      ACCEPT *, SNODE
      TYPE *, 'ENTER INPUT AREA TO BE ANALYSED'
      TYPE *, 'XMIN, XMAX AND YMIN, YMAX'
      ACCEPT *, X1,X2,Y1,Y2
      TYPE *, 'ENTER THE NUMBER OF COINCIDENT VALLEY'
      TYPE *, 'DETECTS REQUIRED FROM 1 TO 16'
      ACCEPT *, Z
      TYPE *, 'ENTER A SMOOTHING FACTOR IN FEET'
      ACCEPT *, SMOOTH
      TYPE *, 'WORM FILTER'
      TYPE *, 'ENTER 1 FOR FILTERED OUTPUT'
      TYPE *, 'ENTER 0 FOR UNFILTERED OUTPUT'
      ACCEPT *, WORM
C     *************** READING INPUT DATA ***************
      DO 4 IY=1,Y2
      READ(1)(BUFFER(IX),IX=1,IXMAX)
      IF(IY.EQ.1) TYPE *, 'READING INPUT FILE'
      IF (IY.GE.Y1) GO TO 3
      GO TO 4
3     DO 4 IX1=X1,X2
      INPUT(IX1,IY)=BUFFER(IX1)
4     CONTINUE
      TYPE *, 'INPUT FILE READY'
C     *************** INITILIZING ARRAYS ***************
      DO 1 J=Y1,Y2
      DO 1 I=X1,X2
      VALLEY1(I,J)=0
      VALLEY2(I,J)=0
      VALLEY(I,J)=0
      TREND(I,J)=-1.0
1     CONTINUE
      TYPE *, 'DATA FILES READY'
C     ******** ASSIGNING TREND BUFFER FOR CALCULATIONS ********
      T1(2)=0.0
      T1(1)=180.0
      T1(31)=18.43
      T1(32)=198.43
      T1(29)=26.57
      T1(30)=206.57
      T1(27)=33.69
      T1(28)=213.69
      T1(25)=45.0
      T1(26)=225.0
      T1(23)=56.31
      T1(24)=236.31
      T1(21)=63.43
      T1(22)=243.43
```

```
            T1(19)=71.57
            T1(20)=251.57
            T1(17)=90.0
            T1(18)=270.0
            T1(15)=108.43
            T1(16)=288.43
            T1(13)=116.57
            T1(14)=296.57
            T1(11)=123.69
            T1(12)=303.69
            T1(9)=135.0
            T1(10)=315.0
            T1(7)=146.31
            T1(8)=326.31
            T1(5)=153.43
            T1(6)=333.43
            T1(3)=161.57
            T1(4)=341.57
C           ******** CALCULATION LOOP FOR VALLEY DETECTION ********
            TYPE *, 'CALCULATIONS INITIATED'
            I=X1-1
            J=Y1
2           IF (I.EQ.(X2-6).AND.J.EQ.(Y2-6)) GO TO 100
            IF (I.EQ.(X2-6)) GO TO 10
            I=I+1
            GO TO 20
10          I=X1
            J=J+1
            TYPE *, 'COMPLETED CALCULATION OF LINE',J
20          K=1
            L=1
            WORK(K,L)=I+3
            L=L+1
            WORK(K,L)=J+3
            L=L+1
            WORK(K,L)=INPUT((I+3),(J+3))
            L=L+1
            WORK(K,L)=WORK(K,(L-1))-WORK(1,3)
            L=L+1
            WORK(K,L)=WORK(K,(L-1))*1
            L=1
            K=K+1
            WORK(K,L)=I+3
            L=L+1
            WORK(K,L)=J
            L=L+1
            WORK(K,L)=INPUT((I+3),J)
            L=L+1
            WORK(K,L)=WORK(K,(L-1))-WORK(1,3)
            L=L+1
            WORK(K,L)=WORK(K,(L-1))* .942809042
            L=1
            K=K+1
            WORK(K,L)=I+3
            L=L+1
            WORK(K,L)=J+6
            L=L+1
            WORK(K,L)=INPUT((I+3),(J+6))
            L=L+1
            WORK(K,L)=WORK(K,(L-1))-WORK(1,3)
            L=L+1
            WORK(K,L)=WORK(K,(L-1))* .942809042
            L=1
            K=K+1
            WORK(K,L)=I+4
            L=L+1
            WORK(K,L)=J
            L=L+1
            WORK(K,L)=INPUT((I+4),J)
            L=L+1
```

```
WORK(K,L)=WORK(K,(L-1))-WORK(1,3)
L=L+1
WORK(K,L)=WORK(K,(L-1))* .894427191
L=1
K=K+1
WORK(K,L)=I+2
L=L+1
WORK(K,L)=J+6
L=L+1
WORK(K,L)=INPUT((I+2),(J+6))
L=L+1
WORK(K,L)=WORK(K,(L-1))-WORK(1,3)
L=L+1
WORK(K,L)=WORK(K,(L-1))* .894427191
L=1
K=K+1
WORK(K,L)=I+4
L=L+1
WORK(K,L)=J+1
L=L+1
WORK(K,L)=INPUT((I+4),(J+1))
L=L+1
WORK(K,L)=WORK(K,(L-1))-WORK(1,3)
L=L+1
WORK(K,L)=WORK(K,(L-1))* 1.264911064
L=1
K=K+1
WORK(K,L)=I+2
L=L+1
WORK(K,L)=J+5
L=L+1
WORK(K,L)=INPUT((I+2),(J+5))
L=L+1
WORK(K,L)=WORK(K,(L-1))-WORK(1,3)
L=L+1
WORK(K,L)=WORK(K,(L-1))* 1.264911064
L=1
K=K+1
WORK(K,L)=I+5
L=L+1
WORK(K,L)=J
L=L+1
WORK(K,L)=INPUT((I+5),J)
L=L+1
WORK(K,L)=WORK(K,(L-1))-WORK(1,3)
L=L+1
WORK(K,L)=WORK(K,(L-1))* .784464541
L=1
K=K+1
WORK(K,L)=I+1
L=L+1
WORK(K,L)=J+6
L=L+1
WORK(K,L)=INPUT((I+1),(J+6))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I+5
L=L+1
WORK(K,L)=J+1
L=L+1
WORK(K,L)=INPUT((I+5),(J+1))
L=L+1
WORK(K,L)=WORK(K,(L-1))-WORK(1,3)
L=L+1
WORK(K,L)=WORK(K,(L-1))* 1.0
L=1
```

```
K=K+1
WORK(K,L)=I+1
L=L+1
WORK(K,L)=J+5
L=L+1
WORK(K,L)=INPUT((I+1),(J+5))
L=L+1
WORK(K,L)=WORK(K,(L-1))-WORK(1,3)
L=L+1
WORK(K,L)=WORK(K,(L-1))* 1.0
L=1
K=K+1
WORK(K,L)=I+6
L=L+1
WORK(K,L)=J+1
L=L+1
WORK(K,L)=INPUT((I+6),(J+1))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I
L=L+1
WORK(K,L)=J+5
L=L+1
WORK(K,L)=INPUT(I,(J+5))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I+5
L=L+1
WORK(K,L)=J+2
L=L+1
WORK(K,L)=INPUT((I+5),(J+2))
L=L+1
WORK(K,L)=WORK(K,(L-1))-WORK(1,3)
L=L+1
WORK(K,L)=WORK(K,(L-1))* 1.264911064
L=1
K=K+1
WORK(K,L)=I+1
L=L+1
WORK(K,L)=J+5
L=L+1
WORK(K,L)=INPUT((I+1),(J+5))
L=L+1
WORK(K,L)=WORK(K,(L-1))-WORK(1,3)
L=L+1
WORK(K,L)=WORK(K,(L-1))* 1.264911064
L=1
K=K+1
WORK(K,L)=I+6
L=L+1
WORK(K,L)=J+2
L=L+1
WORK(K,L)=INPUT((I+6),(J+2))
L=L+1
WORK(K,L)=WORK(K,(L-1))-WORK(1,3)
L=L+1
WORK(K,L)=WORK(K,(L-1))* .894427191
L=1
K=K+1
WORK(K,L)=I
L=L+1
WORK(K,L)=J+4
```

```
L=L+1
WORK(K,L)=INPUT(I,(J+4))
L=L+1
WORK(K,L)=WORK(K,(L-1))-WORK(1,3)
L=L+1
WORK(K,L)=WORK(K,(L-1))* .894427191
L=1
K=K+1
WORK(K,L)=I+6
L=L+1
WORK(K,L)=J+3
L=L+1
WORK(K,L)=INPUT((I+6),(J+3))
L=L+1
WORK(K,L)=WORK(K,(L-1))-WORK(1,3)
L=L+1
WORK(K,L)=WORK(K,(L-1))* .942809042
L=1
K=K+1
WORK(K,L)=I
L=L+1
WORK(K,L)=J+3
L=L+1
WORK(K,L)=INPUT(I,(J+3))
L=L+1
WORK(K,L)=WORK(K,(L-1))-WORK(1,3)
L=L+1
WORK(K,L)=WORK(K,(L-1))* .942809042
L=1
K=K+1
WORK(K,L)=I+6
L=L+1
WORK(K,L)=J+4
L=L+1
WORK(K,L)=INPUT((I+6),(J+4))
L=L+1
WORK(K,L)=WORK(K,(L-1))-WORK(1,3)
L=L+1
WORK(K,L)=WORK(K,(L-1))* .894427191
L=1
K=K+1
WORK(K,L)=I
L=L+1
WORK(K,L)=J+2
L=L+1
WORK(K,L)=INPUT(I,(J+2))
L=L+1
WORK(K,L)=WORK(K,(L-1))-WORK(1,3)
L=L+1
WORK(K,L)=WORK(K,(L-1))* .894427191
L=1
K=K+1
WORK(K,L)=I+5
L=L+1
WORK(K,L)=J+4
L=L+1
WORK(K,L)=INPUT((I+5),(J+4))
L=L+1
WORK(K,L)=WORK(K,(L-1))-WORK(1,3)
L=L+1
WORK(K,L)=WORK(K,(L-1))* 1.264911064
L=1
K=K+1
WORK(K,L)=I+1
L=L+1
WORK(K,L)=J+2
L=L+1
WORK(K,L)=INPUT((I+1),(J+2))
L=L+1
WORK(K,L)=WORK(K,(L-1))-WORK(1,3)
```

```
L=L+1
WORK(K,L)=WORK(K,(L-1))* 1.264911064
L=1
K=K+1
WORK(K,L)=I+6
L=L+1
WORK(K,L)=J+5
L=L+1
WORK(K,L)=INPUT((I+6),(J+5))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I
L=L+1
WORK(K,L)=J+1
L=L+1
WORK(K,L)=INPUT(I,(J+1))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I+5
L=L+1
WORK(K,L)=J+5
L=L+1
WORK(K,L)=INPUT((I+5),(J+5))
L=L+1
WORK(K,L)=WORK(K,(L-1))-WORK(1,3)
L=L+1
WORK(K,L)=WORK(K,(L-1))* 1.0
L=1
K=K+1
WORK(K,L)=I+1
L=L+1
WORK(K,L)=J+1
L=L+1
WORK(K,L)=INPUT((I+1),(J+1))
L=L+1
WORK(K,L)=WORK(K,(L-1))-WORK(1,3)
L=L+1
WORK(K,L)=WORK(K,(L-1))* 1.0
L=1
K=K+1
WORK(K,L)=I+5
L=L+1
WORK(K,L)=J+6
L=L+1
WORK(K,L)=INPUT((I+5),(J+6))
L=L+1
WORK(K,L)=WORK(K,(L-1))-WORK(1,3)
L=L+1
WORK(K,L)=WORK(K,(L-1))* .784464541
L=1
K=K+1
WORK(K,L)=I+1
L=L+1
WORK(K,L)=J
L=L+1
WORK(K,L)=INPUT((I+1),J)
L=L+1
WORK(K,L)=WORK(K,(L-1))-WORK(1,3)
L=L+1
WORK(K,L)=WORK(K,(L-1))* .784464541
L=1
K=K+1
```

```
        WORK(K,L)=I+4
        L=L+1
        WORK(K,L)=J+5
        L=L+1
        WORK(K,L)=INPUT((I+4),(J+5))
        L=L+1
        WORK(K,L)=WORK(K,(L-1))-WORK(1,3)
        L=L+1
        WORK(K,L)=WORK(K,(L-1))* 1.264911064
        L=1
        K=K+1
        WORK(K,L)=I+2
        L=L+1
        WORK(K,L)=J+1
        L=L+1
        WORK(K,L)=INPUT((I+2),(J+1))
        L=L+1
        WORK(K,L)=WORK(K,(L-1))-WORK(1,3)
        L=L+1
        WORK(K,L)=WORK(K,(L-1))* 1.264911064
        L=1
        K=K+1
        WORK(K,L)=I+4
        L=L+1
        WORK(K,L)=J+6
        L=L+1
        WORK(K,L)=INPUT((I+4),(J+6))
        L=L+1
        WORK(K,L)=WORK(K,(L-1))-WORK(1,3)
        L=L+1
        WORK(K,L)=WORK(K,(L-1))* .894427191
        L=1
        K=K+1
        WORK(K,L)=I+2
        L=L+1
        WORK(K,L)=J
        L=L+1
        WORK(K,L)=INPUT((I+2),J)
        L=L+1
        WORK(K,L)=WORK(K,(L-1))-WORK(1,3)
        L=L+1
        WORK(K,L)=WORK(K,(L-1))* .894427191
        L=1
        K=0
        B=0
        TEST=WORK(1,3)+SMOOTH
        DO 50 K=2,32,2
        IF (WORK((K+1),3).GT.TEST.AND.WORK(K,3).GT.TEST) GO TO 30
        GO TO 50
30      B=B+1
50      CONTINUE
        IF (B.GE.Z) GO TO 60
        GO TO 2
C       ***** SETS VALLEY DETECTS IN OUTPUT ARRAY *****
60      VALLEY ((I+3),(J+3))=1
C       ***** SETS THE NUMBER OF DETECTS FOR EACH NODE *****
        HITS((I+3),(J+3))=B
C       ***** DETERMINES TREND OF VALLEY *****
        C=0
        K=0
        TMIN=WORK(2,5)
        DO 90 K=2,33
        TR=WORK(K,5)
        IF (TR.LE.TMIN) GO TO 70
        GO TO 90
70      TMIN=TR
        C=K
90      CONTINUE
        TRND=T1(C-1)
        TREND ((I+3),(J+3))=TRND
```

```
C     ***** RECORDS ELEVATION OF THE VALLEY NODE *****
      DETECT((I+3),(J+3))=INPUT((I+3),(J+3))
C     ***** CALCULATES PLUNGE OF THE VALLEY *****
      PLUNGE((I+3),(J+3))=ATAN(TMIN/(SNODE*2.826427))*57.295
      GO TO 2
100   IF (WORM.EQ.0) GO TO 170
C     ********** FILTERS VALLEY ARRAY **********
      TYPE *, 'FILTERING OUTPUT'
C     ******** VERTICAL PASS 7 SEGMENT WORM FILTER ********
      M=0
      DO 117 J=Y1,Y2
      DO 114 I=X1,X2
      N=VALLEY(I,J)
      IF (N.EQ.1) GO TO 101
      IF (N.EQ.0.AND.M.EQ.0) GO TO 114
      GO TO 102
101   M=M+1
      GOTO 114
102   IF (M.GT.7) GO TO 113
      IF (M.EQ.1) GO TO 112
      PLMIN=90.0
      DO 111 K=1,M
      PL=ABS(PLUNGE((I-K),J))
      IF (PL.LT.PLMIN) GO TO 110
      GO TO 111
110   PLMIN=PL
      L=K
111   CONTINUE
      VALLEY1((I-L),J)=1
      GO TO 113
112   VALLEY1((I-1),J)=1
113   M=0
114   CONTINUE
117   CONTINUE
C     ***** 7 X 7 BOX FILTER OF VERTICAL PASS WORM FILTER OUTPUT *****
      I=X1-1
      J=Y1
130   IF (I.EQ.(X2-6).AND.J.EQ.(Y2-6)) GO TO 136
      IF (I.EQ.(X2-6)) GO TO 131
      I=I+1
      GO TO 132
131   I=X1
      J=J+1
132   M=VALLEY1((I+3),(J+3))
      IF (M.EQ.1) GO TO 133
      GO TO 130
133   F=0
      DO 135 L=J,(J+6)
      DO 135 K=I,(I+6)
      N=VALLEY1(K,L)
      IF (N.EQ.1) GO TO 134
      GO TO 135
134   F=F+1
135   CONTINUE
      IF (F.GT.2) GO TO 130
      VALLEY1((I+3),(J+3))=0
      GO TO 130
C     ***** HORIZONTAL PASS 7 SEGMENT WORM FILTER *****
136   M=0
      DO 120 I=X1,X2
      DO 128 J=Y1,Y2
      N=VALLEY(I,J)
      IF (N.EQ.1) GO TO 115
      IF (N.EQ.0.AND.M.EQ.0) GO TO 128
      GO TO 116
115   M=M+1
      GO TO 128
116   IF (M.GT.7) GO TO 127
      IF (M.EQ.1) GO TO 126
      PLMIN=90.0
```

```
              DO 125 K=1,M
              PL=ABS(PLUNGE(I,(J-K)))
              IF (PL.LT.PLMIN) GO TO 124
              GO TO 125
124           PLMIN=PL
              L=K
125           CONTINUE
              VALLEY2(I,(J-L))=1
              GO TO 127
126           VALLEY2(I,(J-1))=1
127           M=0
128           CONTINUE
120           CONTINUE
C     ***** 7 X 7 BOX FILTER OF HORIZONAL PASS WORM FILTER OUTPUT *****
              I=X1-1
              J=Y1
150           IF (I.EQ.(X2-6).AND.J.EQ.(Y2-6)) GO TO 156
              IF (I.EQ.(X2-6)) GO TO 151
              I=I+1
              GO TO 152
151           I=X1
              J=J+1
152           M=VALLEY2((I+3),(J+3))
              IF (M.EQ.1) GO TO 153
              GO TO 150
153           F=0
              DO 155 L=J,(J+6)
              DO 155 K=I,(I+6)
              N=VALLEY2(K,L)
              IF (N.EQ.1) GO TO 154
              GO TO 155
154           F=F+1
155           CONTINUE
              IF (F.GT.2) GO TO 150
              VALLEY2((I+3),(J+3))=0
              GO TO 150
C     ***** MERGER OF VERTICAL & HORIZONTAL VALLEY DATA SETS *****
156           M=0
              DO 158 I=X1,X2
              DO 158 J=Y1,Y2
              M=VALLEY2(I,J)
              IF (M.EQ.1) GO TO 157
              GO TO 158
157           VALLEY1(I,J)=M
158           CONTINUE
C     ********** REMOVAL OF FOURTH BOUNDRY NODE **********
              J=Y1+3
              TYPE *, 'MINIMUM Y ANALYSED', Y1
              DO I=X1,X2
              VALLEY1(I,J)=0
              END DO
              J=Y2-3
              TYPE *, 'MAXIMUM Y ANALYSED', Y2
              DO I=X1,X2
              VALLEY1(I,J)=0
              END DO
              I=X1+3
              TYPE *, 'MINIMUM X ANALYSED', X1
              DO J=Y1,Y2
              VALLEY1(I,J)=0
              END DO
              I=X2-3
              TYPE *, 'MAXIMUM X ANALYSED', X2
              DO J=Y1,Y2
              VALLEY1(I,J)=0
              END DO
C     ********** ASSIGNING TREND BUFFER FOR OUTPUT **********
170           A=0
              TYPE *, 'FORMATING OUTPUT FILES'
              T(1)=0.0
```

```
              T(2)=180.0
              T(3)=18.43
              T(4)=198.43
              T(5)=26.57
              T(6)=206.57
              T(7)=33.69
              T(8)=213.69
              T(9)=45.0
              T(10)=225.0
              T(11)=56.31
              T(12)=236.31
              T(13)=63.43
              T(14)=243.43
              T(15)=71.57
              T(16)=251.57
              T(17)=90.0
              T(18)=270.0
              T(19)=108.43
              T(20)=288.43
              T(21)=116.57
              T(22)=296.57
              T(23)=123.69
              T(24)=303.69
              T(25)=135.0
              T(26)=315.0
              T(27)=146.31
              T(28)=326.31
              T(29)=153.43
              T(30)=333.43
              T(31)=161.57
              T(32)=341.57
C             ***** ENTER TREND VALUES IN THE COUNT & TOTAL OUTPUT FILES *****
              DO 137 I=1,32
              COUNT(I,1)=T(I)
137           CONTINUE
              N=0
              DO 138 I=1,31,2
              N=N+1
              TOTAL(N,1)=T(I)
138           CONTINUE
C             ******* DATA FOR XNODE, YNODE, ELEVATION, TREND, PLUNGE *****
C             ******* AND HITS ENTERED INTO THE DISPANL OUTPUT FILE ********
139           DO 144 L=Y1,Y2
              DO 144 K=X1,X2
              IF (WORM.EQ.1) GO TO 140
              F=VALLEY(K,L)
              GO TO 141
140           F=VALLEY1(K,L)
141           IF (F.EQ.1) GO TO 142
              GO TO 144
142           A=A+1
              DISPANL(A,1)=K
              DISPANL(A,2)=L
              DISPANL(A,3)=DETECT(K,L)
              DISPANL(A,4)=TREND(K,L)
              DISPANL(A,5)=ABS(PLUNGE(K,L))
              DISPANL(A,6)=HITS(K,L)
C             ******* TOTAL VALLEY DETECTS CORRESPONDING TO 32 TRENDS *******
C             ******* 0-360 DEGREES ENTERED INTO THE COUNT OUTPUT FILE ******
              J=TREND(K,L)
              DO 144 M=1,32
              N=COUNT(M,1)
              IF (N.EQ.J) GO TO 143
              GO TO 144
143           COUNT(M,2)=COUNT(M,2)+1
144           CONTINUE
C             ******* TOTAL VALLEY DETECTS CORRESPONDING TO 16 TRENDS *******
C             ******* 0-180 DEGREES ENTERED INTO THE TOTAL OUTPUT FILE ******
              DO 145 K=2,32,2
              TOTAL((K/2),2)=COUNT(K,2)+COUNT((K-1),2)
```

```
145     CONTINUE
C       ********** WRITE DATA FILES TO DISK **********
        IF (WORM.EQ.1) GO TO 147
        DO 146 K=Y1,Y2
        J=Y2-K+Y1
        WRITE (2,180)(VA(VALLEY(I,J)+1),I=X1,X2)
146     CONTINUE
        GO TO 149
147     DO 148 K=Y1,Y2
        J=Y2-K+Y1
        WRITE(2,180)(VA(VALLEY1(I,J)+1),I=X1,X2)
148     CONTINUE
149     WRITE (4,200) ((DISPANL(J,I),I=1,6),J=1,A)
        WRITE (5,210) ((COUNT(J,I),I=1,2),J=1,32)
        WRITE (6,220) ((TOTAL(J,I),I=1,2),J=1,16)
180     FORMAT (1X,130A1)
200     FORMAT (6F10.2)
210     FORMAT (2F10.2)
220     FORMAT (2F10.2)
        STOP
        END
C       PROGRAM: STRING
C       AUTHOR:  JAY R. ELIASON  --  FEBRUARY 1984
C       FUNCTION: DETECTS RELATED STRINGS OF VALLEY NODES
C                 IDENTIFIED BY PROGRAM THALWEG
C
C       THIS PROGRAM REQUIRES THE FOLLOWING ASSIGNMENTS:
C       ASSIGN (INPUT FILE NAME) FOR001   (INPUT DATA FILE)
C       ASSIGN STRING.DAT FOR002  (OUTPUT DATA FILE)
C
C
        DIMENSION ELEV(700,700), TREND(700,700), PLUNGE(700,700)
        DIMENSION HITS(700,700), SEARCH(700,700), STRING(40000,7)
        DIMENSION TEMP(40000,2)

INTEGER Z,S,SS,TMP,HITS,SAVEX,SAVEY,SEARCH,PREVOUS1,PREVOUS2
        INTEGER X,Y
        TYPE *,'ENTER INPUT ARRAY X NODE MAXIMUM AND MINIMUM'
        ACCEPT *, IXMAX, IXMIN
        TYPE *,'ENTER INPUT ARRAY Y NODE MAXIMUM AND MINIMUM'
        ACCEPT *, IYMAX, IYMIN
        DO J=IXMIN,IXMAX
        IF (J.NE.IXMIN) GOTO 8
        TYPE *,'INITILIZING SEARCH MATRIX'
8       DO I=IYMIN,IYMAX
        SEARCH(J,I)=0
        END DO
        END DO
        TYPE *,'SEARCH MATRIX INITILIZED'
        DO I=1,40000
        READ (1,12000,END=1)(XX,YY,EE,TT,PP,HH)
        IF (I.EQ.1) TYPE *,'READING INPUT DATA'
        X=INT(XX)
        Y=INT(YY)
        IH=INT(HH)
        ELEV(X,Y)=EE
        TREND(X,Y)=TT
        PLUNGE(X,Y)=PP
        HITS(X,Y)=IH
        SEARCH(X,Y)=1
        END DO
1       TYPE *,'INPUT DATA READY'
        SAVEX=0
        SAVEY=0
        X=IXMIN+4
        Y=IYMIN+4
        S=0
        SS=0
        TYPE *,'CALCULATIONS INITIATED'
2       PREVOUS1=1
```

```
        PREVOUS2=1
        L=1
        TMP=0
        M=0
3       IF(SEARCH(X,Y).EQ. 0 .AND. X .NE. (IXMAX-4)) GOTO4
        IF(SEARCH(X,Y).EQ. 1) GOTO 5
        X=IXMIN+3
        Y=Y+1
        IF(Y .GT. (IYMAX-4)) GOTO 11000
4       X=X+1
        GOTO 3
5       TNODE1=SEARCH(X+1,Y)
        TNODE2=SEARCH(X+1,Y-1)
        TNODE3=SEARCH(X,Y-1)
        TNODE4=SEARCH(X-1,Y-1)
        TNODE5=SEARCH(X-1,Y)
        TNODE6=SEARCH(X-1,Y+1)
        TNODE7=SEARCH(X,Y+1)
        TNODE8=SEARCH(X+1,Y+1)
        IF (TNODE1.EQ.1) GOTO 6
101     L=L+1
        IF (TNODE2.EQ.1) GOTO 6
102     L=L+1
        IF (TNODE3.EQ.1) GOTO 6
103     L=L+1
        IF (TNODE4.EQ.1) GOTO 6
104     L=L+1
        IF (TNODE5.EQ.1) GOTO 6
105     L=L+1
        IF (TNODE6.EQ.1) GOTO 6
106     L=L+1
        IF (TNODE7.EQ.1) GOTO 6
107     L=L+1
        IF (TNODE8.EQ.1) GOTO 6
108     IF (TMP.NE.0) GOTO 500
        GOTO 1111
6       M=M+1
        IF (M.EQ.1) GOTO 10
        GOTO 11
10      Z=L
        GOTO 100
11      IF (M.EQ.2) GOTO 12
        GOTO 13
12      Z=(Z*10)+L
        GOTO 100
13      IF (M.EQ.3) GOTO 14
        GOTO 15
14      Z=(Z*10)+L
        GOTO 100
15      Z=(Z*10)+L
        GOTO 100
100     IF (100+L.EQ.101) GOTO 101
        IF (100+L.EQ.102) GOTO 102
        IF (100+L.EQ.103) GOTO 103
        IF (100+L.EQ.104) GOTO 104
        IF (100+L.EQ.105) GOTO 105
        IF (100+L.EQ.106) GOTO 106
        IF (100+L.EQ.107) GOTO 107
        IF (100+L.EQ.108) GOTO 108
1111    IF (M.NE.0) GOTO 1122
        IF (M.EQ.0 .AND. SAVEX.NE.0) GOTO 16
        SEARCH(X,Y)=0
        GOTO 2
16      S=S+1
        LENGTH=LENGTH+1
        IF (LENGTH.LT.4) GOTO 17
        GOTO 18
17      SS=SS-1
        S=S-LENGTH
        GOTO 19
```

```
18      STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
19      SEARCH(X,Y)=0
        LENGTH=0
        PREVOUS1=1
        PREVOUS2=1
        X=SAVEX
        Y=SAVEY
        SAVEX=0
        SAVEY=0
        GOTO 2
1122    IF (M.NE.1) GOTO 1133
        IF (SAVEX.EQ.0) GOTO 20
        GOTO 21
20      SAVEX=X
        SAVEY=Y
        SS=SS+1
        PREVOUS1=Z
21      IF (Z.EQ.1 .AND. PREVOUS1.EQ.1) GOTO 22
        IF (Z.EQ.1 .AND. PREVOUS1.EQ.2) GOTO 22
        IF (Z.EQ.1 .AND. PREVOUS1.EQ.8) GOTO 22
        IF (Z.EQ.2 .AND. PREVOUS1.EQ.1) GOTO 22
        IF (Z.EQ.2 .AND. PREVOUS1.EQ.2) GOTO 22
        IF (Z.EQ.2 .AND. PREVOUS1.EQ.3) GOTO 22
        IF (Z.EQ.3 .AND. PREVOUS1.EQ.2) GOTO 22
        IF (Z.EQ.3 .AND. PREVOUS1.EQ.3) GOTO 22
        IF (Z.EQ.3 .AND. PREVOUS1.EQ.4) GOTO 22
        IF (Z.EQ.4 .AND. PREVOUS1.EQ.3) GOTO 22
        IF (Z.EQ.4 .AND. PREVOUS1.EQ.4) GOTO 22
        IF (Z.EQ.4 .AND. PREVOUS1.EQ.5) GOTO 22
        IF (Z.EQ.5 .AND. PREVOUS1.EQ.4) GOTO 22
        IF (Z.EQ.5 .AND. PREVOUS1.EQ.5) GOTO 22
        IF (Z.EQ.5 .AND. PREVOUS1.EQ.6) GOTO 22
        IF (Z.EQ.6 .AND. PREVOUS1.EQ.5) GOTO 22
        IF (Z.EQ.6 .AND. PREVOUS1.EQ.6) GOTO 22
        IF (Z.EQ.6 .AND. PREVOUS1.EQ.7) GOTO 22
        IF (Z.EQ.7 .AND. PREVOUS1.EQ.6) GOTO 22
        IF (Z.EQ.7 .AND. PREVOUS1.EQ.7) GOTO 22
        IF (Z.EQ.7 .AND. PREVOUS1.EQ.8) GOTO 22
        IF (Z.EQ.8 .AND. PREVOUS1.EQ.1) GOTO 22
        IF (Z.EQ.8 .AND. PREVOUS1.EQ.7) GOTO 22
        IF (Z.EQ.8 .AND. PREVOUS1.EQ.8) GOTO 22
        S=S+1
        LENGTH=LENGTH+1
        IF(LENGTH.LT.4) GOTO 23
        GOTO 24
23      SS=SS-1
        S=S-LENGTH
        GOTO 25
24      STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
25      SEARCH(X,Y)=0
        LENGTH=0
        PREVOUS1=1
        PREVOUS2=1
        X=SAVEX
        Y=SAVEY
        SAVEX=0
        SAVEY=0
        GOTO 2
```

```
22      S=S+1
        LENGTH=LENGTH+1
        PREVOUS2=PREVOUS1
        PREVOUS1=Z
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        IF (Z.EQ.1) GOTO 26
        GOTO 27
26      X=X+1
27      IF (Z.EQ.2) GOTO 28
        GOTO 29
28      X=X+1
        Y=Y-1
29      IF (Z.EQ.3) GOTO 30
        GOTO 31
30      Y=Y-1
31      IF (Z.EQ.4) GOTO 32
        GOTO 33
32      X=X-1
        Y=Y-1
33      IF (Z.EQ.5) GOTO 34
        GOTO 35
34      X=X-1
35      IF (Z.EQ.6) GOTO 36
        GOTO 37
36      X=X-1
        Y=Y+1
37      IF (Z.EQ.7) GOTO 38
        GOTO 39
38      Y=Y+1
39      IF (Z.EQ.8) GOTO 40
        GOTO 41
40      X=X+1
        Y=Y+1
41      L=1
        M=0
        GOTO 5
1133    IF (Z.EQ.12) GOTO 800
        IF (Z.EQ.23) GOTO 850
        IF (Z.EQ.34) GOTO 900
        IF (Z.EQ.45) GOTO 950
        IF (Z.EQ.56) GOTO 1000
        IF (Z.EQ.67) GOTO 1050
        IF (Z.EQ.78) GOTO 1100
        IF (Z.EQ.18) GOTO 1150
        IF (SAVEX.EQ.0) GOTO 1144
        GOTO 1250
1144    IF (Z.EQ.16) GOTO 200
        IF (Z.EQ.17) GOTO 250
        IF (Z.EQ.68) GOTO 300
        IF (Z.EQ.167) GOTO 350
        IF (Z.EQ.168) GOTO 400
        IF (Z.EQ.678) GOTO 450
        GOTO 1250
200     TMP=1
        TEMP(TMP,1)=X
        TEMP(TMP,2)=Y
        SEARCH(X,Y)=0
        SAVEX=X
        SAVEY=Y
        SS=SS+1
        X=X+1
        L=1
        M=0
```

```
        GOTO 5
250     TMP=1
        TEMP(TMP,1)=X
        TEMP(TMP,2)=Y
        SEARCH(X,Y)=0
        TMP=TMP+1
        TEMP(TMP,1)=X
        TEMP(TMP,2)=Y+1
        SEARCH(X,Y+1)=0
        SAVEX=X
        SAVEY=Y
        SS=SS+1
        X=X+1
        L=1
        M=0
        GOTO 5
300     TMP=1
        PREVOUS1=8
        TEMP(TMP,1)=X
        TEMP(TMP,2)=Y
        SEARCH(X,Y)=0
        SAVEX=X
        SAVEY=Y
        SS=SS+1
        X=X+1
        Y=Y+1
        L=1
        M=0
        GOTO 5
350     TMP=1
        TEMP(TMP,1)=X
        TEMP(TMP,2)=Y
        SEARCH(X,Y)=0
        TMP=TMP+1
        TEMP(TMP,1)=X
        TEMP(TMP,2)=Y+1
        SEARCH(X,Y+1)=0
        SAVEX=X
        SAVEY=Y
        SS=SS+1
        X=X+1
        L=1
        M=0
        GOTO 5
400     TMP=1
        PREVOUS1=8
        TEMP(TMP,1)=X
        TEMP(TMP,2)=Y
        SEARCH(X,Y)=0
        TMP=TMP+1
        TEMP(TMP,1)=X+1
        TEMP(TMP,2)=Y
        SEARCH(X+1,Y)=0
        SAVEX=X
        SAVEY=Y
        SS=SS+1
        X=X+1
        Y=Y+1
        L=1
        M=0
        GOTO 5
150     SEARCH(X,Y)=0
        GOTO 2
500     IF (M.EQ.0) GOTO 510
        GOTO 520
510     DO 805 I=1,TMP
        SEARCH(TEMP(I,1),TEMP(I,2))=1
805     CONTINUE
        TMP=0
        L=1
```

```
        IF (PREVOUS1.EQ.1) GOTO 811
        IF (PREVOUS1.EQ.2) GOTO 812
        IF (PREVOUS1.EQ.3) GOTO 813
        IF (PREVOUS1.EQ.4) GOTO 814
        IF (PREVOUS1.EQ.5) GOTO 815
        IF (PREVOUS1.EQ.6) GOTO 816
        IF (PREVOUS1.EQ.7) GOTO 817
        IF (PREVOUS1.EQ.8) GOTO 818
11      PREVOUS1=5
        GOTO 808
12      PREVOUS1=6
        GOTO 808
13      PREVOUS1=7
        GOTO 808
14      PREVOUS1=8
        GOTO 808
15      PREVOUS1=1
        GOTO 808
16      PREVOUS1=2
        GOTO 808
17      PREVOUS1=3
        GOTO 808
18      PREVOUS1=4
08      GOTO 5
20      IF (M.EQ.1) GOTO 530
        GOTO 55
30      TMP=TMP+1
        TEMP(TMP,1)=X
        TEMP(TMP,2)=Y
        SEARCH(X,Y)=0
        PREVOUS1=Z
        IF (Z.EQ.1) GOTO 540
        GOTO 550
40      X=X+1
50      IF (Z.EQ.2) GOTO 560
        GOTO 570
60      X=X+1
        Y=Y-1
70      IF (Z.EQ.3) GOTO 580
        GOTO 590
80      Y=Y-1
590     IF (Z.EQ.4) GOTO 600
        GOTO 610
600     X=X-1
        Y=Y-1
610     IF (Z.EQ.5) GOTO 620
        GOTO 630
620     X=X-1
630     IF (Z.EQ.6) GOTO 640
        GOTO 650
640     X=X-1
        Y=Y+1
650     IF (Z.EQ.7) GOTO 660
        GOTO 670
660     Y=Y+1
670     IF (Z.EQ.8) GOTO 680
        GOTO 690
680     X=X+1
        Y=Y+1
690     L=1
        M=0
        GOTO 5
55      IF (PREVOUS1.EQ.1) GOTO 56
        GOTO 57
56      IF (Z.EQ.12) GOTO 58
        GOTO 59
58      PREVOUS1=2
        TMP=TMP+1
        TEMP(TMP,1)=X
        TEMP(TMP,2)=Y
```

```
            SEARCH(X,Y)=0
            TMP=TMP+1
            TEMP(TMP,1)=X+1
            TEMP(TMP,2)=Y
            SEARCH(X+1,Y)=0
            X=X+1
            Y=Y-1
            L=1
            M=0
            GOTO 5
    59      IF (Z.EQ.18) GOTO 60
            GOTO 61
    60      PREVOUS1=8
            TMP=TMP+1
            TEMP(TMP,1)=X
            TEMP(TMP,2)=Y
            SEARCH(X,Y)=0
            TMP=TMP+1
            TEMP(TMP,1)=X+1
            TEMP(TMP,2)=Y
            SEARCH(X+1,Y)=0
            X=X+1
            Y=Y+1
            L=1
            M=0
            GOTO 5
    61      IF (Z.EQ.28) GOTO 62
            GOTO 63
    62      PREVOUS1=2
            TMP=TMP+1
            TEMP(TMP,1)=X
            TEMP(TMP,2)=Y
            SEARCH(X,Y)=0
            TMP=TMP+1
            TEMP(TMP,1)=X+1
            TEMP(TMP,2)=Y+1
            SEARCH(X+1,Y+1)=0
            X=X+1
            Y=Y-1
            L=1
            M=0
            GOTO 5
    63      PREVOUS1=2
            TMP=TMP+1
            TEMP(TMP,1)=X
            TEMP(TMP,2)=Y
            SEARCH(X,Y)=0
            TMP=TMP+1
            TEMP(TMP,1)=X+1
            TEMP(TMP,2)=Y
            SEARCH(X+1,Y)=0
            TMP=TMP+1
            TEMP(TMP,1)=X+1
            TEMP(TMP,2)=Y+1
            SEARCH(X+1,Y+1)=0
            X=X+1
            Y=Y-1
            L=1
            M=0
            GOTO 5
    57      IF (PREVOUS1.EQ.2) GOTO 64
            GOTO 65
    64      IF (SEARCH(X+1,Y-1).EQ.1) GOTO 66
            GOTO 67
    66      PREVOUS1=2
            TMP=TMP+1
            TEMP(TMP,1)=X
            TEMP(TMP,2)=Y
            SEARCH(X,Y)=0
            IF (SEARCH(X+1,Y).EQ.1) GOTO 68
```

```
        GOTO 69
68      TMP=TMP+1
        TEMP(TMP,1)=X+1
        TEMP(TMP,2)=Y
        SEARCH(X+1,Y)=0
69      IF (SEARCH(X,Y-1).EQ.1) GOTO 70
        GOTO 71
70      TMP=TMP+1
        TEMP(TMP,1)=X
        TEMP(TMP,2)=Y-1
        SEARCH(X,Y-1)=0
71      IF (SEARCH(X-1,Y-1).EQ.1) GOTO 72
        GOTO 73
72      TMP=TMP+1
        TEMP(TMP,1)=X-1
        TEMP(TMP,2)=Y-1
        SEARCH(X-1,Y-1)=0
73      IF (SEARCH(X+1,Y+1).EQ.1) GOTO 74
        GOTO 75
74      TMP=TMP+1
        TEMP(TMP,1)=X+1
        TEMP(TMP,2)=Y+1
        SEARCH(X+1,Y+1)=0
75      X=X+1
        Y=Y-1
        L=1
        M=0
        GOTO 5
67      IF (SEARCH(X-1,Y-1).EQ.1) GOTO 76
        GOTO 77
76      PREVOUS1=4
        TMP=TMP+1
        TEMP(TMP,1)=X
        TEMP(TMP,2)=Y
        SEARCH(X,Y)=0
        IF (SEARCH(X+1,Y).EQ.1) GOTO 78
        GOTO 79
78      TMP=TMP+1
        TEMP(TMP,1)=X+1
        TEMP(TMP,2)=Y
        SEARCH(X+1,Y)=0
79      IF (SEARCH(X,Y-1).EQ.1) GOTO 80
        GOTO 81
80      TMP=TMP+1
        TEMP(TMP,1)=X
        TEMP(TMP,2)=Y-1
        SEARCH(X,Y-1)=0
81      IF (SEARCH(X+1,Y+1).EQ.1) GOTO 82
        GOTO 83
82      TMP=TMP+1
        TEMP(TMP,1)=X+1
        TEMP(TMP,2)=Y+1
        SEARCH(X+1,Y+1)=0
83      X=X-1
        Y=Y-1
        L=1
        M=0
        GOTO 5
77      IF (SEARCH(X+1,Y+1).EQ.1) GOTO 84
        GOTO 85
84      PREVOUS1=8
        TMP=TMP+1
        TEMP(TMP,1)=X
        TEMP(TMP,2)=Y
        SEARCH(X,Y)=0
        IF (SEARCH(X+1,Y).EQ.1) GOTO 86
        GOTO 87
86      TMP=TMP+1
        TEMP(TMP,1)=X+1
        TEMP(TMP,2)=Y
```

```
           SEARCH(X+1,Y)=0
87         IF (SEARCH(X,Y-1).EQ.1) GOTO 88
           GOTO 89
88         TMP=TMP+1
           TEMP(TMP,1)=X
           TEMP(TMP,2)=Y-1
           SEARCH(X,Y-1)=0
89         X=X+1
           Y=Y+1
           L=1
           M=0
           GOTO 5
85         PREVOUS1=3
           TMP=TMP+1
           TEMP(TMP,1)=X
           TEMP(TMP,2)=Y
           SEARCH(X,Y)=0
           IF (SEARCH(X+1,Y).EQ.1) GOTO 90
           GOTO 91
90         TMP=TMP+1
           TEMP(TMP,1)=X+1
           TEMP(TMP,2)=Y
           SEARCH(X+1,Y)=0
91         Y=Y-1
           L=1
           M=0
           GOTO 5
65         IF (PREVOUS1.EQ.3) GOTO 92
           GOTO 93
92         IF (Z.EQ.34) GOTO 94
           GOTO 95
94         PREVOUS1=4
           TMP=TMP+1
           TEMP(TMP,1)=X
           TEMP(TMP,2)=Y
           SEARCH(X,Y)=0
           TMP=TMP+1
           TEMP(TMP,1)=X
           TEMP(TMP,2)=Y-1
           SEARCH(X,Y-1)=0
           X=X-1
           Y=Y-1
           L=1
           M=0
           GOTO 5
95         IF (Z.EQ.23) GOTO 96
           GOTO 97
96         PREVOUS1=2
           TMP=TMP+1
           TEMP(TMP,1)=X
           TEMP(TMP,2)=Y
           SEARCH(X,Y)=0
           TMP=TMP+1
           TEMP(TMP,1)=X
           TEMP(TMP,2)=Y-1
           SEARCH(X,Y-1)=0
           X=X+1
           Y=Y-1
           L=1
           M=0
           GOTO 5
97         IF (Z.EQ.24) GOTO 98
           GOTO 99
98         PREVOUS1=4
           TMP=TMP+1
           TEMP(TMP,1)=X
           TEMP(TMP,2)=Y
           SEARCH(X,Y)=0
           TMP=TMP+1
           TEMP(TMP,1)=X+1
```

```
            TEMP(TMP,2)=Y-1
            SEARCH(X+1,Y-1)=0
            X=X-1
            Y=Y-1
            L=1
            M=0
            GOTO 5
99          PREVOUS1=4
            TMP=TMP+1
            TEMP(TMP,1)=X
            TEMP(TMP,2)=Y
            SEARCH(X,Y)=0
            TMP=TMP+1
            TEMP(TMP,1)=X+1
            TEMP(TMP,2)=Y-1
            SEARCH(X+1,Y-1)=0
            TMP=TMP+1
            TEMP(TMP,1)=X
            TEMP(TMP,2)=Y-1
            SEARCH(X,Y-1)=0
            X=X-1
            Y=Y-1
            L=1
            M=0
            GOTO 5
93          IF (PREVOUS1.EQ.4) GOTO 110
            GOTO 111
110         IF (SEARCH(X-1,Y-1).EQ.1) GOTO 112
            GOTO 113
112         PREVOUS1=4
            TMP=TMP+1
            TEMP(TMP,1)=X
            TEMP(TMP,2)=Y
            SEARCH(X,Y)=0
            IF (SEARCH(X+1,Y-1).EQ.1) GOTO 114
            GOTO 115
114         TMP=TMP+1
            TEMP(TMP,1)=X+1
            TEMP(TMP,2)=Y-1
            SEARCH(X+1,Y-1)=0
115         IF (SEARCH(X,Y-1).EQ.1) GOTO 116
            GOTO 117
116         TMP=TMP+1
            TEMP(TMP,1)=X
            TEMP(TMP,2)=Y-1
            SEARCH(X,Y-1)=0
117         IF (SEARCH(X-1,Y).EQ.1) GOTO 118
            GOTO 119
118         TMP=TMP+1
            TEMP(TMP,1)=X-1
            TEMP(TMP,2)=Y
            SEARCH(X-1,Y)=0
119         IF (SEARCH(X-1,Y+1).EQ.1) GOTO 120
            GOTO 121
120         TMP=TMP+1
            TEMP(TMP,1)=X-1
            TEMP(TMP,2)=Y+1
            SEARCH(X-1,Y+1)=0
121         X=X-1
            Y=Y-1
            L=1
            M=0
            GOTO 5
113         IF (SEARCH(X-1,Y+1).EQ.1) GOTO 122
            GOTO 123
122         PREVOUS1=6
            TMP=TMP+1
            TEMP(TMP,1)=X
            TEMP(TMP,2)=Y
            SEARCH(X,Y)=0
            IF (SEARCH(X+1,Y-1).EQ.1) GOTO 124
```

```
         GOTO 125
126      TMP=TMP+1
         TEMP(TMP,1)=X+1
         TEMP(TMP,2)=Y-1
         SEARCH(X+1,Y-1)=0
125      IF (SEARCH(X,Y-1).EQ.1) GOTO 126
         GOTO 127
126      TMP=TMP+1
         TEMP(TMP,1)=X
         TEMP(TMP,2)=Y-1
         SEARCH(X,Y-1)=0
127      IF (SEARCH(X-1,Y).EQ.1) GOTO 128
         GOTO 129
128      TMP=TMP+1
         TEMP(TMP,1)=X-1
         TEMP(TMP,2)=Y
         SEARCH(X-1,Y)=0
129      X=X-1
         Y=Y+1
         L=1
         M=0
         GOTO 5
123      IF (SEARCH(X+1,Y-1).EQ.1) GOTO 130
         GOTO 131
130      PREVOUS1=2
         TMP=TMP+1
         TEMP(TMP,1)=X
         TEMP(TMP,2)=Y
         SEARCH(X,Y)=0
         IF (SEARCH(X,Y-1).EQ.1) GOTO 132
         GOTO 133
132      TMP=TMP+1
         TEMP(TMP,1)=X
         TEMP(TMP,2)=Y-1
         SEARCH(X,Y-1)=0
133      IF (SEARCH(X-1,Y).EQ.1) GOTO 134
         GOTO 135
134      TMP=TMP+1
         TEMP(TMP,1)=X-1
         TEMP(TMP,2)=Y
         SEARCH(X-1,Y)=0
135      X=X+1
         Y=Y-1
         L=1
         M=0
         GOTO 5
131      PREVOUS1=5
         TMP=TMP+1
         TEMP(TMP,1)=X
         TEMP(TMP,2)=Y
         SEARCH(X,Y)=0
         IF (SEARCH(X,Y-1).EQ.1) GOTO 136
         GOTO 137
136      TMP=TMP+1
         TEMP(TMP,1)=X
         TEMP(TMP,2)=Y-1
         SEARCH(X,Y-1)=0
137      X=X-1
         L=1
         M=0
         GOTO 5
111      IF (PREVOUS1.EQ.5) GOTO 138
         GOTO 139
138      IF (Z.EQ.56) GOTO 140
         GOTO 141
140      PREVOUS1=6
         TMP=TMP+1
         TEMP(TMP,1)=X
         TEMP(TMP,2)=Y
         SEARCH(X,Y)=0
```

```
          TMP=TMP+1
          TEMP(TMP,1)=X-1
          TEMP(TMP,2)=Y
          SEARCH(X-1,Y)=0
          X=X-1
          Y=Y+1
          L=1
          M=0
          GOTO 5
141       IF (Z.EQ.45) GOTO 142
          GOTO 143
142       PREVOUS1=4
          TMP=TMP+1
          TEMP(TMP,1)=X
          TEMP(TMP,2)=Y
          SEARCH(X,Y)=0
          TMP=TMP+1
          TEMP(TMP,1)=X-1
          TEMP(TMP,2)=Y
          SEARCH(X-1,Y)=0
          X=X-1
          Y=Y-1
          L=1
          M=0
          GOTO 5
143       IF (Z.EQ.46) GOTO 144
          GOTO 145
144       PREVOUS1=6
          TMP=TMP+1
          TEMP(TMP,1)=X
          TEMP(TMP,2)=Y
          SEARCH(X,Y)=0
          TMP=TMP+1
          TEMP(TMP,1)=X-1
          TEMP(TMP,2)=Y-1
          SEARCH(X-1,Y-1)=0
          X=X-1
          Y=Y+1
          L=1
          M=0
          GOTO 5
145       PREVOUS1=6
          TMP=TMP+1
          TEMP(TMP,1)=X
          TEMP(TMP,2)=Y
          SEARCH(X,Y)=0
          TMP=TMP+1
          TEMP(TMP,1)=X-1
          TEMP(TMP,2)=Y-1
          SEARCH(X-1,Y-1)=0
          TMP=TMP+1
          TEMP(TMP,1)=X-1
          TEMP(TMP,2)=Y
          SEARCH(X-1,Y)=0
          X=X-1
          Y=Y+1
          L=1
          M=0
          GOTO 5
39        IF (PREVOUS1.EQ.6) GOTO 146
          GOTO 147
46        IF (SEARCH(X-1,Y+1).EQ.1) GOTO 148
          GOTO 149
48        PREVOUS1=6
          TMP=TMP+1
          TEMP(TMP,1)=X
          TEMP(TMP,2)=Y
          SEARCH(X,Y)=0
          IF (SEARCH(X-1,Y-1).EQ.1) GOTO 150
          GOTO 151
```

```
150     TMP=TMP+1
        TEMP(TMP,1)=X-1
        TEMP(TMP,2)=Y-1
        SEARCH(X-1,Y-1)=0
151     IF (SEARCH(X-1,Y).EQ.1) GOTO 152
        GOTO 153
152     TMP=TMP+1
        TEMP(TMP,1)=X-1
        TEMP(TMP,2)=Y
        SEARCH(X-1,Y)=0
153     IF (SEARCH(X,Y+1).EQ.1) GOTO 154
        GOTO 155
154     TMP=TMP+1
        TEMP(TMP,1)=X
        TEMP(TMP,2)=Y+1
        SEARCH(X,Y+1)=0
155     IF (SEARCH(X+1,Y+1).EQ.1) GOTO 156
        GOTO 157
156     TMP=TMP+1
        TEMP(TMP,1)=X+1
        TEMP(TMP,2)=Y+1
        SEARCH(X+1,Y+1)=0
157     X=X-1
        Y=Y+1
        L=1
        M=0
        GOTO 5
149     IF (SEARCH(X+1,Y+1).EQ.1) GOTO 158
        GOTO 159
158     PREVOUS1=8
        TMP=TMP+1
        TEMP(TMP,1)=X
        TEMP(TMP,2)=Y
        SEARCH(X,Y)=0
        IF (SEARCH(X-1,Y-1).EQ.1) GOTO 160
        GOTO 161
160     TMP=TMP+1
        TEMP(TMP,1)=X-1
        TEMP(TMP,2)=Y-1
        SEARCH(X-1,Y-1)=0
161     IF (SEARCH(X-1,Y).EQ.1) GOTO 162
        GOTO 163
162     TMP=TMP+1
        TEMP(TMP,1)=X-1
        TEMP(TMP,2)=Y
        SEARCH(X-1,Y)=0
163     IF (SEARCH(X,Y+1).EQ.1) GOTO 164
        GOTO 165
164     TMP=TMP+1
        TEMP(TMP,1)=X
        TEMP(TMP,2)=Y+1
        SEARCH(X,Y+1)=0
165     X=X+1
        Y=Y+1
        L=1
        M=0
        GOTO 5
159     IF (SEARCH(X-1,Y-1).EQ.1) GOTO 166
        GOTO 167
166     PREVOUS1=4
        TMP=TMP+1
        TEMP(TMP,1)=X
        TEMP(TMP,2)=Y
        SEARCH(X,Y)=0
        IF (SEARCH(X-1,Y).EQ.1) GOTO 168
        GOTO 169
168     TMP=TMP+1
        TEMP(TMP,1)=X-1
        TEMP(TMP,2)=Y
        SEARCH(X-1,Y)=0
```

```
169   IF (SEARCH(X,Y+1).EQ.1) GOTO 170
      GOTO 171
170   TMP=TMP+1
      TEMP(TMP,1)=X
      TEMP(TMP,2)=Y+1
      SEARCH(X,Y+1)=0
171   X=X-1
      Y=Y-1
      L=1
      M=0
      GOTO 5
167   PREVOUS1=7
      TMP=TMP+1
      TEMP(TMP,1)=X
      TEMP(TMP,2)=Y
      SEARCH(X,Y)=0
      IF (SEARCH(X-1,Y).EQ.1) GOTO 172
      GOTO 173
172   TMP=TMP+1
      TEMP(TMP,1)=X-1
      TEMP(TMP,2)=Y
      SEARCH(X-1,Y)=0
173   Y=Y+1
      L=1
      M=0
      GOTO 5
147   IF (PREVOUS1.EQ.7) GOTO 174
      GOTO 175
174   IF (Z.EQ.78) GOTO 176
      GOTO 177
176.  PREVOUS1=8
      TMP=TMP+1
      TEMP(TMP,1)=X
      TEMP(TMP,2)=Y
      SEARCH(X,Y)=0
      TMP=TMP+1
      TEMP(TMP,1)=X
      TEMP(TMP,2)=Y+1
      SEARCH(X,Y+1)=0
      X=X+1
      Y=Y+1
      L=1
      M=0
      GOTO 5
.77   IF (Z.EQ.67) GOTO 178
      GOTO 179
.78   PREVOUS1=6
      TMP=TMP+1
      TEMP(TMP,1)=X
      TEMP(TMP,2)=Y
      SEARCH(X,Y)=0
      TMP=TMP+1
      TEMP(TMP,1)=X
      TEMP(TMP,2)=Y+1
      SEARCH(X,Y+1)=0
      X=X-1
      Y=Y+1
      L=1
      M=0
      GOTO 5
179   IF (Z.EQ.68) GOTO 180
      GOTO 181
180   PREVOUS1=8
      TMP=TMP+1
      TEMP(TMP,1)=X
      TEMP(TMP,2)=Y
      SEARCH(X,Y)=0
      TMP=TMP+1
      TEMP(TMP,1)=X-1
      TEMP(TMP,2)=Y+1
```

```
            SEARCH(X-1,Y+1)=0
            X=X+1
            Y=Y+1
            L=1
            M=0
            GOTO 5
    .81     PREVOUS1=8
            TMP=TMP+1
            TEMP(TMP,1)=X
            TEMP(TMP,2)=Y
            SEARCH(X,Y)=0
            TMP=TMP+1
            TEMP(TMP,1)=X-1
            TEMP(TMP,2)=Y+1
            SEARCH(X-1,Y+1)=0
            TMP=TMP+1
            TEMP(TMP,1)=X
            TEMP(TMP,2)=Y+1
            SEARCH(X,Y+1)=0
            X=X+1
            Y=Y+1
            L=1
            M=0
            GOTO 5
    175     IF (SEARCH(X+1,Y+1).EQ.1) GOTO 182
            GOTO 183
    182.    PREVOUS1=8
            TMP=TMP+1
            TEMP(TMP,1)=X
            TEMP(TMP,2)=Y
            SEARCH(X,Y)=0
            IF (SEARCH(X-1,Y+1).EQ.1) GOTO 184
            GOTO 185
    184     TMP=TMP+1
            TEMP(TMP,1)=X-1
            TEMP(TMP,2)=Y+1
            SEARCH(X-1,Y+1)=0
    185     IF (SEARCH(X,Y+1).EQ.1) GOTO 186
            GOTO 187
    186     TMP=TMP+1
            TEMP(TMP,1)=X
            TEMP(TMP,2)=Y+1
            SEARCH(X,Y+1)=0
    187     IF (SEARCH(X+1,Y).EQ.1) GOTO 188
            GOTO 189
    188     TMP=TMP+1
            TEMP(TMP,1)=X+1
            TEMP(TMP,2)=Y
            SEARCH(X+1,Y)=0
    189     IF (SEARCH(X+1,Y-1).EQ.1) GOTO 190
            GOTO 191
    190     TMP=TMP+1
            TEMP(TMP,1)=X+1
            TEMP(TMP,2)=Y-1
            SEARCH(X+1,Y-1)=0
    191     X=X+1
            Y=Y+1
            L=1
            M=0
            GOTO 5
    183     IF (SEARCH(X+1,Y-1).EQ.1) GOTO 192
            GOTO 193
    192     PREVOUS1=2
            TMP=TMP+1
            TEMP(TMP,1)=X
            TEMP(TMP,2)=Y
            SEARCH(X,Y)=0
            IF (SEARCH(X-1,Y+1).EQ.1) GOTO 194
            GOTO 195
    194     TMP=TMP+1
```

```
            TEMP(TMP,1)=X-1
            TEMP(TMP,2)=Y+1
            SEARCH(X-1,Y+1)=0
   195      IF (SEARCH(X,Y+1).EQ.1) GOTO 196
            GOTO 197
   196      TMP=TMP+1
            TEMP(TMP,1)=X
            TEMP(TMP,2)=Y+1
            SEARCH(X,Y+1)=0
   197      IF (SEARCH(X+1,Y).EQ.1) GOTO 198
            GOTO 199
   198      TMP=TMP+1
            TEMP(TMP,1)=X+1
            TEMP(TMP,2)=Y
            SEARCH(X+1,Y)=0
   199      X=X+1
            Y=Y-1
            L=1
            M=0
            GOTO 5
   193      IF (SEARCH(X-1,Y+1).EQ.1) GOTO 700
            GOTO 701
   700      PREVOUS1=6
            TMP=TMP+1
            TEMP(TMP,1)=X
            TEMP(TMP,2)=Y
            SEARCH(X,Y)=0
            IF (SEARCH(X,Y+1).EQ.1) GOTO 702
            GOTO 703
   702      TMP=TMP+1
            TEMP(TMP,1)=X
            TEMP(TMP,2)=Y+1
            SEARCH(X,Y+1)=0
   703      IF (SEARCH(X+1,Y).EQ.1) GOTO 704
            GOTO 705
   704      TMP=TMP+1
            TEMP(TMP,1)=X+1
            TEMP(TMP,2)=Y
            SEARCH(X+1,Y)=0
   705      X=X-1
            Y=Y+1
            L=1
            M=0
            GOTO 5
   701      PREVOUS1=1
            TMP=TMP+1
            TEMP(TMP,1)=X
            TEMP(TMP,2)=Y
            SEARCH(X,Y)=0
            IF (SEARCH(X,Y+1).EQ.1) GOTO 706
            GOTO 707
   706      TMP=TMP+1
            TEMP(TMP,1)=X
            TEMP(TMP,2)=Y+1
            SEARCH(X,Y+1)=0
   707      X=X+1
            L=1
            M=0
            GOTO 5
   800      IF (SAVEX.EQ.0) GOTO 708
            GOTO 709
   708      SAVEX=X
            SAVEY=Y
            SS=SS+1
            GOTO 958
   709      IF (PREVOUS1.EQ.1 .OR. PREVOUS1.EQ.8) GOTO 967
            GOTO 958
   967      S=S+1
            LENGTH=LENGTH+1
            PREVOUS2=PREVOUS1
```

```
           PREVOUS1=1
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           X=X+1
           L=1
           M=0
           GOTO 5
958        S=S+1
           LENGTH=LENGTH+1
           PREVOUS2=PREVOUS1
           PREVOUS1=1
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           X=X+1
           S=S+1
           LENGTH=LENGTH+1
           PREVOUS2=PREVOUS1
           PREVOUS1=2
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           Y=Y-1
           L=1
           M=0
           GOTO 5
850        IF (SAVEX.EQ.0) GOTO 710
           GOTO 711
710        SAVEX=X
           SAVEY=Y
           SS=SS+1
           GOTO 957
711        IF (PREVOUS1.EQ.3 .OR. PREVOUS1.EQ.4) GOTO 966
           GOTO 957
966        S=S+1
           LENGTH=LENGTH+1
           PREVOUS2=PREVOUS1
           PREVOUS1=3
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           Y=Y-1
           L=1
           M=0
           GOTO 5
957        S=S+1
           LENGTH=LENGTH+1
           PREVOUS2=PREVOUS1
           PREVOUS1=3
```

```
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        Y=Y-1
        S=S+1
        LENGTH=LENGTH+1
        PREVOUS2=PREVOUS1
        PREVOUS1=2
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        X=X+1
        L=1
        M=0
        GOTO 5
900     IF (SAVEX.EQ.0) GOTO 712
        GOTO 713
712     SAVEX=X
        SAVEY=Y
        SS=SS+1
        GOTO 956
713     IF (PREVOUS1.EQ.3 .OR. PREVOUS1.EQ.2) GOTO 965
        GOTO 956
965     S=S+1
        LENGTH=LENGTH+1
        PREVOUS2=PREVOUS1
        PREVOUS1=3
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        Y=Y-1
        L=1
        M=0
        GOTO 5
956     S=S+1
        LENGTH=LENGTH+1
        PREVOUS2=PREVOUS1
        PREVOUS1=3
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        Y=Y-1
        S=S+1
        LENGTH=LENGTH+1
        PREVOUS2=PREVOUS1
        PREVOUS1=4
        STRING(S,1)=X
        STRING(S,2)=Y
        STRING(S,3)=ELEV(X,Y)
        STRING(S,4)=TREND(X,Y)
```

```
           STRING(S,5)=PLUNGE(X,Y)
           STRING(S,6)=HITS(X,Y)
           STRING(S,7)=SS
           SEARCH(X,Y)=0
           X=X-1
           L=1
           M=0
           GOTO 5
950        IF (SAVEX.EQ.0) GOTO 714
           GOTO 715
714        SAVEX=X
           SAVEY=Y
           SS=SS+1
           GOTO 955
715        IF (PREVOUS1.EQ.5 .OR. PREVOUS1.EQ.6) GOTO 964
           GOTO 955
964        S=S+1
           LENGTH=LENGTH+1
           PREVOUS2=PREVOUS1
           PREVOUS1=5
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           X=X-1
           L=1
           M=0
           GOTO 5
955        S=S+1
           LENGTH=LENGTH+1
           PREVOUS2=PREVOUS1
           PREVOUS1=5
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           X=X-1
           S=S+1
           LENGTH=LENGTH+1
           PREVOUS2=PERVOUS1
           PERVOUS1=4
           STRING(S,1)=X
           STRING(S,2)=Y
           STRING(S,3)=ELEV(X,Y)
           STRING(S,4)=TREND(X,Y)
           STRING(S,5)=PLUNGE(X,Y)
           STRING(S,6)=HITS(X,Y)
           STRING(S,7)=SS
           SEARCH(X,Y)=0
           Y=Y-1
           L=1
           M=0
           GOTO 5
1000       IF (SAVEX.EQ.0) GOTO 716
           GOTO 717
716        SAVEX=X
           SAVEY=Y
           SS=SS+1
           GOTO 954
717        IF (PREVOUS1.EQ.5 .OR. PREVOUS1.EQ.4) GOTO 960
           GOTO 954
960        S=S+1
```

```
        LENGTH=LENGTH+1
        PREVOUS2=PREVOUS1
        PREVOUS1=5
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        X=X-1
        L=1
        M=0
        GOTO 5
954     S=S+1
        LENGTH=LENGTH+1
        PREVOUS2=PREVOUS1
        PREVOUS1=5
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        X=X-1
        S=S+1
        LENGTH=LENGTH+1
        PREVOUS2=PERVOUS1
        PERVOUS1=6
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        Y=Y+1
        L=1
        M=0
        GOTO 5
1050    IF (SAVEX.EQ.0) GOTO 718
        GOTO 719
718     SAVEX=X
        SAVEY=Y
        SS=SS+1
        GOTO 953
719     IF (PREVOUS1.EQ.7 .OR. PREVOUS1.EQ.8) GOTO 961
        GOTO 953
961     S=S+1
        LENGTH=LENGTH+1
        PREVOUS2=PREVOUS1
        PREVOUS1=7
        STRING(S,1)=X
        STRING(S,2)=Y
        STRING(S,3)=ELEV(X,Y)
        STRING(S,4)=TREND(X,Y)
        STRING(S,5)=PLUNGE(X,Y)
        STRING(S,6)=HITS(X,Y)
        STRING(S,7)=SS
        SEARCH(X,Y)=0
        Y=Y+1
        L=1
        M=0
        GOTO 5
953     S=S+1
        LENGTH=LENGTH+1
```

```
            PREVOUS2=PREVOUS1
            PREVOUS1=7
            STRING(S,1)=X
            STRING(S,2)=Y
            STRING(S,3)=ELEV(X,Y)
            STRING(S,4)=TREND(X,Y)
            STRING(S,5)=PLUNGE(X,Y)
            STRING(S,6)=HITS(X,Y)
            STRING(S,7)=SS
            SEARCH(X,Y)=0
            Y=Y+1
            S=S+1
            LENGTH=LENGTH+1
            PREVOUS2=PREVOUS1
            PREVOUS1=6
            STRING(S,1)=X
            STRING(S,2)=Y
            STRING(S,3)=ELEV(X,Y)
            STRING(S,4)=TREND(X,Y)
            STRING(S,5)=PLUNGE(X,Y)
            STRING(S,6)=HITS(X,Y)
            STRING(S,7)=SS
            SEARCH(X,Y)=0
            X=X-1
            L=1
            M=0
            GOTO 5
1100        IF (SAVEX.EQ.0) GOTO 720
            GOTO 721
720         SAVEX=X
            SAVEY=Y
            SS=SS+1
            GOTO 951
721         IF (PREVOUS1.EQ.7 .OR. PREVOUS1.EQ.6) GOTO 962
            GOTO 951
962         S=S+1
            LENGTH=LENGTH+1
            PREVOUS2=PREVOUS1
            PREVOUS1=7
            STRING(S,1)=X
            STRING(S,2)=Y
            STRING(S,3)=ELEV(X,Y)
            STRING(S,4)=TREND(X,Y)
            STRING(S,5)=PLUNGE(X,Y)
            STRING(S,6)=HITS(X,Y)
            STRING(S,7)=SS
            SEARCH(X,Y)=0
            Y=Y+1
            L=1
            M=0
            GOTO 5
951         S=S+1
            LENGTH=LENGTH+1
            PREVOUS2=PREVOUS1
            PREVOUS1=7
            STRING(S,1)=X
            STRING(S,2)=Y
            STRING(S,3)=ELEV(X,Y)
            STRING(S,4)=TREND(X,Y)
            STRING(S,5)=PLUNGE(X,Y)
            STRING(S,6)=HITS(X,Y)
            STRING(S,7)=SS
            SEARCH(X,Y)=0
            Y=Y+1
            S=S+1
            LENGTH=LENGTH+1
            PREVOUS2=PREVOUS1
            PREVOUS1=8
            STRING(S,1)=X
            STRING(S,2)=Y
```

```
              STRING(S,3)=ELEV(X,Y)
              STRING(S,4)=TREND(X,Y)
              STRING(S,5)=PLUNGE(X,Y)
              STRING(S,6)=HITS(X,Y)
              STRING(S,7)=SS
              SEARCH(X,Y)=0
              X=X+1
              L=1
              M=0
              GOTO 5
1150          IF (SAVEX.EQ.0) GOTO 722
              GOTO 723
722           SAVEX=X
              SAVEY=Y
              SS=SS+1
              GOTO 952
723           IF (PREVOUS1.EQ.1 .OR. PREVOUS1.EQ.2) GOTO 963
              GOTO 952
963           S=S+1
              LENGTH=LENGTH+1
              PREVOUS2=PREVOUS1
              PREVOUS1=1
              STRING(S,1)=X
              STRING(S,2)=Y
              STRING(S,3)=ELEV(X,Y)
              STRING(S,4)=TREND(X,Y)
              STRING(S,5)=PLUNGE(X,Y)
              STRING(S,6)=HITS(X,Y)
              STRING(S,7)=SS
              SEARCH(X,Y)=0
              X=X+1
              L=1
              M=0
              GOTO 5
952           S=S+1
              LENGTH=LENGTH+1
              PREVOUS2=PREVOUS1
              PREVOUS1=1
              STRING(S,1)=X
              STRING(S,2)=Y
              STRING(S,3)=ELEV(X,Y)
              STRING(S,4)=TREND(X,Y)
              STRING(S,5)=PLUNGE(X,Y)
              STRING(S,6)=HITS(X,Y)
              STRING(S,7)=SS
              SEARCH(X,Y)=0
              X=X+1
              S=S+1
              LENGTH=LENGTH+1
              PREVOUS2=PREVOUS1
              PREVOUS1=8
              STRING(S,1)=X
              STRING(S,2)=Y
              STRING(S,3)=ELEV(X,Y)
              STRING(S,4)=TREND(X,Y)
              STRING(S,5)=PLUNGE(X,Y)
              STRING(S,6)=HITS(X,Y)
              STRING(S,7)=SS
              SEARCH(X,Y)=0
              Y=Y+1
              L=1
              M=0
              GOTO 5
1250          S=S+1
              LENGTH=LENGTH+1
              STRING(S,1)=X
              STRING(S,2)=Y
              STRING(S,3)=ELEV(X,Y)
              STRING(S,4)=TREND(X,Y)
              STRING(S,5)=PLUNGE(X,Y)
```

```
        STRING(S,6)=HITS(X,Y)
        STRING(S,7)=SS
        SEARCH(X,Y)=0
        IF (PREVOUS1.EQ.1 .AND. SEARCH(X+1,Y).EQ.1) GOTO 724
        GOTO 725
724     X=X+1
        PREVOUS2=PREVOUS1
        PREVOUS1=1
        GOTO 726
725     IF (PREVOUS1.EQ.2 .AND. SEARCH(X+1,Y-1).EQ.1) GOTO 727
        GOTO 728
727     X=X+1
        Y=Y-1
        PREVOUS2=PREVOUS1
        PREVOUS1=2
        GOTO 726
728     IF (PREVOUS1.EQ.3 .AND. SEARCH(X,Y-1).EQ.1) GOTO 729
        GOTO 730
729     Y=Y-1
        PREVOUS2=PREVOUS1
        PREVOUS1=3
        GOTO 726
730     IF (PREVOUS1.EQ.4 .AND. SEARCH(X-1,Y-1).EQ.1) GOTO 731
        GOTO 732
731     X=X-1
        Y=Y-1
        PREVOUS2=PREVOUS1
        PREVOUS1=4
        GOTO 726
732     IF (PREVOUS1.EQ.5 .AND. SEARCH(X-1,Y).EQ.1) GOTO 733
        GOTO 734
733     X=X-1
        PREVOUS2=PREVOUS1
        PREVOUS1=5
        GOTO 726
734     IF (PREVOUS1.EQ.6 .AND. SEARCH(X-1,Y+1).EQ.1) GOTO 735
        GOTO 736
735     X=X-1
        Y=Y+1
        PREVOUS2=PREVOUS1
        PREVOUS1=6
        GOTO 726
736     IF (PREVOUS1.EQ.7 .AND. SEARCH(X,Y+1).EQ.1) GOTO 737
        GOTO 738
737     Y=Y+1
        PREVOUS2=PREVOUS1
        PREVOUS1=7
        GOTO 726
738     IF (PREVOUS1.EQ.8 .AND. SEARCH(X+1,Y+1).EQ.1) GOTO 739
        GOTO 740
739     X=X+1
        Y=Y+1
        PREVOUS2=PREVOUS1
        PREVOUS1=8
        GOTO 726
740     IF (PREVOUS2.EQ.1 .AND. SEARCH(X+1,Y).EQ.1) GOTO 741
        GOTO 742
741     X=X+1
        PREVOUS2=PREVOUS1
        PREVOUS1=1
        GOTO 726
742     IF (PREVOUS2.EQ.2 .AND. SEARCH(X+1,Y-1).EQ.1) GOTO 743
        GOTO 744
743     X=X+1
        Y=Y-1
        PREVOUS2=PREVOUS1
        PREVOUS1=2
        GOTO 726
744     IF (PREVOUS2.EQ.3 .AND. SEARCH(X,Y-1).EQ.1) GOTO 745
        GOTO 746
```

```
745     Y=Y-1
        PREVOUS2=PREVOUS1
        PREVOUS1=3
        GOTO 726
746     IF (PREVOUS2.EQ.4 .AND. SEARCH(X-1,Y-1).EQ.1) GOTO 747
        GOTO 748
747     X=X-1
        Y=Y-1
        PREVOUS2=PREVOUS1
        PREVOUS1=4
        GOTO 726
748     IF (PREVOUS2.EQ.5 .AND. SEARCH(X-1,Y).EQ.1) GOTO 749
        GOTO 750
749     X=X-1
        PREVOUS2=PREVOUS1
        PREVOUS1=5
        GOTO 726
750     IF (PREVOUS2.EQ.6 .AND. SEARCH(X-1,Y+1).EQ.1) GOTO 751
        GOTO 752
751     X=X-1
        Y=Y+1
        PREVOUS2=PREVOUS1
        PREVOUS1=6
        GOTO 726
752     IF (PREVOUS2.EQ.7 .AND. SEARCH(X,Y+1).EQ.1) GOTO 753
        GOTO 754
753     Y=Y+1
        PREVOUS2=PREVOUS1
        PREVOUS1=7
        GOTO 726
754     IF (PREVOUS2.EQ.8 .AND. SEARCH(X+1,Y+1).EQ.1) GOTO 755
        GOTO 756
755     X=X+1
        Y=Y+1
        PREVOUS2=PREVOUS1
        PREVOUS1=8
        GOTO 726
756     IF (PREVOUS1.EQ.1 .AND. SEARCH(X+1,Y+1).EQ.1) GOTO 757
        GOTO 758
757     X=X+1
        Y=Y+1
        PREVOUS2=PREVOUS1
        PREVOUS1=8
        GOTO 726
758     IF (PREVOUS1.EQ.1 .AND. SEARCH(X+1,Y-1).EQ.1) GOTO 759
        GOTO 760
759     X=X+1
        Y=Y-1
        PREVOUS2=PREVOUS1
        PREVOUS1=2
        GOTO 726
760     IF (PREVOUS1.EQ.2 .AND. SEARCH(X+1,Y).EQ.1) GOTO 761
        GOTO 762
761     X=X+1
        PREVOUS2=PREVOUS1
        PREVOUS1=1
        GOTO 726
762     IF (PREVOUS1.EQ.2 .AND. SEARCH(X,Y-1).EQ.1) GOTO 763
        GOTO 764
763     Y=Y-1
        PREVOUS2=PREVOUS1
        PREVOUS1=3
        GOTO 726
764     IF (PREVOUS1.EQ.3 .AND. SEARCH(X+1,Y-1).EQ.1) GOTO 765
        GOTO 766
765     X=X+1
        Y=Y-1
        PREVOUS2=PREVOUS1
        PREVOUS1=2
        GOTO 726
```

```
766     IF (PREVOUS1.EQ.3 .AND. SEARCH(X-1,Y-1).EQ.1) GOTO 767
        GOTO 768
767     X=X-1
        Y=Y-1
        PREVOUS2=PREVOUS1
        PREVOUS1=4
        GOTO 726
768     IF (PREVOUS1.EQ.4 .AND. SEARCH(X,Y-1).EQ.1) GOTO 769
        GOTO 770
769     Y=Y-1
        PREVOUS2=PREVOUS1
        PREVOUS1=3
        GOTO 726
770     IF (PREVOUS1.EQ.4 .AND. SEARCH(X-1,Y).EQ.1) GOTO 771
        GOTO 772
771     X=X-1
        PREVOUS2=PREVOUS1
        PREVOUS1=5
        GOTO 726
772     IF (PREVOUS1.EQ.5 .AND. SEARCH(X-1,Y-1).EQ.1) GOTO 773
        GOTO 774
773     X=X-1
        Y=Y-1
        PREVOUS2=PREVOUS1
        PREVOUS1=4
        GOTO 726
774     IF (PREVOUS1.EQ.5 .AND. SEARCH(X-1,Y+1).EQ.1) GOTO 775
        GOTO 776
775     X=X-1
        Y=Y+1
        PREVOUS2=PREVOUS1
        PREVOUS1=6
        GOTO 726
776     IF (PREVOUS1.EQ.6 .AND. SEARCH(X-1,Y).EQ.1) GOTO 777
        GOTO 778
777     X=X-1
        PREVOUS2=PREVOUS1
        PREVOUS1=5
        GOTO 726
778     IF (PREVOUS1.EQ.6 .AND. SEARCH(X,Y+1).EQ.1) GOTO 779
        GOTO 780
779     Y=Y+1
        PREVOUS2=PREVOUS1
        PREVOUS1=7
        GOTO 726
780     IF (PREVOUS1.EQ.7 .AND. SEARCH(X-1,Y+1).EQ.1) GOTO 781
        GOTO 782
781     X=X-1
        Y=Y+1
        PREVOUS2=PREVOUS1
        PREVOUS1=6
        GOTO 726
782     IF (PREVOUS1.EQ.7 .AND. SEARCH(X+1,Y+1).EQ.1) GOTO 783
        GOTO 784
783     X=X+1
        Y=Y+1
        PREVOUS2=PREVOUS1
        PREVOUS1=8
        GOTO 726
784     IF (PREVOUS1.EQ.8 .AND. SEARCH(X,Y+1).EQ.1) GOTO 785
        GOTO 786
785     Y=Y+1
        PREVOUS2=PREVOUS1
        PREVOUS1=7
        GOTO 726
786     IF (PREVOUS1.EQ.8 .AND. SEARCH(X+1,Y).EQ.1) GOTO 787
        GOTO 788
787     X=X+1
        PREVOUS2=PREVOUS1
        PREVOUS1=1
```

```
        GOTO 726
788     IF (LENGTH.LT.4) GOTO 789
        GOTO 790
789     SS=SS-1
        S=S-LENGTH
790     LENGTH=0
        X=SAVEX
        Y=SAVEY
        SAVEX=0
        SAVEY=0
        GOTO 2
726     L=1
        M=0
        GOTO 5
11000   TYPE *, 'FORMATING OUTPUT'
        WRITE (2,13000)((STRING(J,I),I=1,7),J=1,3)
12000   FORMAT (6F10.2)
13000   FORMAT (7F10.2)
        STOP
        END
C       ***********************************************
C       PROGRAM FOR CONVERTING STRING DATA TO VECTORS
C       JAY R. ELIASON -- MARCH 15, 1984
C       ***********************************************
C
C       THIS PROGRAM REQUIRES THE FOLLOWING ASSIGNMENTS
C       ASSIGN (INPUT FILE NAME) FOR001   (INPUT DATA FILE)
C       ASSIGN VECTOR.DAT FOR002          (OUTPUT DATA FILE)
C
C
        INTEGER X,Y,S,ST,XCORD,YCORD,STRING,X1,X2,Y1,Y2
        DIMENSION VECTOR(15000,10),VEC(15000,10)
        DIMENSION STRING(40000),NODE(40000),XCORD(40000)
        DIMENSION YCORD(40000),ELEV(40000)
        TREND = 0.
        PLUNGE = 0.
        XLENGTH = 0.
        ST = 1
        N = 1
        DO 100 I=1,40000
        READ (1,12000,END=200) (XX,YY,EE,TT,PP,HH,SS)
        IF (I.EQ.1) TYPE *,'READING INPUT DATA'
        X=INT(XX)
        Y=INT(YY)
        S=INT(SS)
        IF (S.EQ.ST) GOTO 50
        ST=S
        N=1
50      STRING(I)=S
        NODE(I)=N
        XCORD(I)=X
        YCORD(I)=Y
        ELEV(I)=EE
        N=N+1
        JJ=I
100     CONTINUE
200     TYPE *,'INPUT DATA READY'
        TYPE *, 'ENTER NODE SPACING IN FEET'
        ACCEPT *, SCALE
        S=1
        L=0
        IVEC=1
        DO 500 I=1,JJ
        IF (L.EQ.0) GOTO 201
        GOTO 202
201     L = 2
        IFRST = I
202     IF (L.EQ.1) IFRST=I-1
        L=L+1
        IF (I.EQ.JJ) GOTO 203
```

```
            IF (STRING(I).EQ.S) GOTO 500
            LAST=I-1
            GOTO 205
203         LAST =I
205         STRTOTL=NODE(LAST)
            PTSTOTL=INT((STRTOTL-1)/6)+STRTOTL
            FULSEG=INT(PTSTOTL/7)
            FINLSEG=PTSTOTL-(FULSEG*7)
            S=S+1
            L=1
            IF (STRTOTL.GT.8) GOTO 210
            VECTOR(IVEC,1)=S-1
            VECTOR(IVEC,2)=XCORD(IFRST)
            X1=XCORD(IFRST)
            VECTOR(IVEC,3)=YCORD(IFRST)
            Y1=YCORD(IFRST)
            VECTOR(IVEC,4)=ELEV(IFRST)
            E1=ELEV(IFRST)
            VECTOR(IVEC,5)=XCORD(LAST)
            X2=XCORD(LAST)
            VECTOR(IVEC,6)=YCORD(LAST)
            Y2=YCORD(LAST)
            VECTOR(IVEC,7)=ELEV(LAST)
            E2=ELEV(LAST)
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            GOTO 500
210         IF (STRTOTL.EQ.9) GOTO 220
            GOTO 230
220         VECTOR(IVEC,1)=S-1
            VECTOR(IVEC,2)=XCORD(IFRST)
            X1=XCORD(IFRST)
            VECTOR(IVEC,3)=YCORD(IFRST)
            Y1=YCORD(IFRST)
            VECTOR(IVEC,4)=ELEV(IFRST)
            E1=ELEV(IFRST)
            VECTOR(IVEC,5)=XCORD(IFRST+4)
            X2=XCORD(IFRST+4)
            VECTOR(IVEC,6)=YCORD(IFRST+4)
            Y2=YCORD(IFRST+4)
            VECTOR(IVEC,7)=ELEV(IFRST+4)
            E2=ELEV(IFRST+4)
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            VECTOR(IVEC,1)=S-1
            X1=XCORD(IFRST+4)
            VECTOR(IVEC,2)=X1
            Y1=YCORD(IFRST+4)
            VECTOR(IVEC,3)=Y1
            E1=ELEV(IFRST+4)
            VECTOR(IVEC,4)=E1
            X2=XCORD(LAST)
            VECTOR(IVEC,5)=X2
            Y2=YCORD(LAST)
            VECTOR(IVEC,6)=Y2
            E2=ELEV(LAST)
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            GOTO 500
230         IF (STRTOTL.EQ.10 .OR. STRTOTL.EQ.11) GOTO 240
```

```
      GOTO 250
240   VECTOR(IVEC,1)=S-1
      X1=XCORD(IFRST)
      VECTOR(IVEC,2)=X1
      Y1=YCORD(IFRST)
      VECTOR(IVEC,3)=Y1
      E1=ELEV(IFRST)
      VECTOR(IVEC,4)=E1
      X2=XCORD(IFRST+5)
      VECTOR(IVEC,5)=X2
      Y2=YCORD(IFRST+5)
      VECTOR(IVEC,6)=Y2
      E2=ELEV(IFRST+5)
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
      VECTOR(IVEC,1)=S-1
      X1=XCORD(IFRST+5)
      VECTOR(IVEC,2)=X1
      Y1=YCORD(IFRST+5)
      VECTOR(IVEC,3)=Y1
      E1=ELEV(IFRST+5)
      VECTOR(IVEC,4)=E1
      X2=XCORD(LAST)
      VECTOR(IVEC,5)=X2
      Y2=YCORD(LAST)
      VECTOR(IVEC,6)=Y2
      E2=ELEV(LAST)
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
      GOTO 500
250   IF (STRTOTL.EQ.12 .OR. STRTOTL.EQ.13) GOTO 260
      GOTO 270
260   VECTOR(IVEC,1)=S-1
      X1=XCORD(IFRST)
      VECTOR(IVEC,2)=X1
      Y1=YCORD(IFRST)
      VECTOR(IVEC,3)=Y1
      E1=ELEV(IFRST)
      VECTOR(IVEC,4)=E1
      X2=XCORD(IFRST+6)
      VECTOR(IVEC,5)=X2
      Y2=YCORD(IFRST+6)
      VECTOR(IVEC,6)=Y2
      E2=ELEV(IFRST+6)
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
      VECTOR(IVEC,1)=S-1
      X1=XCORD(IFRST+6)
      VECTOR(IVEC,2)=X1
      Y1=YCORD(IFRST+6)
      VECTOR(IVEC,3)=Y1
      E1=ELEV(IFRST+6)
      VECTOR(IVEC,4)=E1
      X2=XCORD(LAST)
      VECTOR(IVEC,5)=X2
      Y2=YCORD(LAST)
      VECTOR(IVEC,6)=Y2
      E2=ELEV(LAST)
```

```
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            GOTO 500
270         IF (STRTOTL.EQ.14 .OR. STRTOTL.EQ.15) GOTO 280
            GOTO 290
280         VECTOR(IVEC,1)=S-1
            X1=XCORD(IFRST)
            VECTOR(IVEC,2)=X1
            Y1=YCORD(IFRST)
            VECTOR(IVEC,3)=Y1
            E1=ELEV(IFRST)
            VECTOR(IVEC,4)=E1
            X2=XCORD(IFRST+7)
            VECTOR(IVEC,5)=X2
            Y2=YCORD(IFRST+7)
            VECTOR(IVEC,6)=Y2
            E2=ELEV(IFRST+7)
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            VECTOR(IVEC,1)=S-1
            X1=XCORD(IFRST+7)
            VECTOR(IVEC,2)=X1
            Y1=YCORD(IFRST+7)
            VECTOR(IVEC,3)=Y1
            E1=ELEV(IFRST+7)
            VECTOR(IVEC,4)=E1
            X2=XCORD(LAST)
            VECTOR(IVEC,5)=X2
            Y2=YCORD(LAST)
            VECTOR(IVEC,6)=Y2
            E2=ELEV(LAST)
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            GOTO 500
290         IF (FINLSEG.EQ.1 .OR. FINLSEG.EQ.6) GOTO 300
            GOTO 320
300         DO 310 J=1,FULSEG
            VECTOR(IVEC,1)=S-1
            X1=XCORD(IFRST+(6*(J-1)))
            VECTOR(IVEC,2)=X1
            Y1=YCORD(IFRST+(6*(J-1)))
            VECTOR(IVEC,3)=Y1
            E1=ELEV(IFRST+(6*(J-1)))
            VECTOR(IVEC,4)=E1
            X2=XCORD(IFRST+(6*J))
            VECTOR(IVEC,5)=X2
            Y2=YCORD(IFRST+(6*J))
            VECTOR(IVEC,6)=Y2
            E2=ELEV(IFRST+(6*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            LL=(IFRST+(6*J))
310         CONTINUE
            IF (FINLSEG.EQ.1) GOTO 500
```

```
            IFRST=LL
            J=1
            VECTOR(IVEC,1)=S-1
            X1=XCORD(IFRST+(5*(J-1)))
            VECTOR(IVEC,2)=X1
            Y1=YCORD(IFRST+(5*(J-1)))
            VECTOR(IVEC,3)=Y1
            E1=ELEV(IFRST+(5*(J-1)))
            VECTOR(IVEC,4)=E1
            X2=XCORD(IFRST+(5*J))
            VECTOR(IVEC,5)=X2
            Y2=YCORD(IFRST+(5*J))
            VECTOR(IVEC,6)=Y2
            E2=ELEV(IFRST+(5*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            GOTO 500
   320      IF (FINLSEG.EQ.5) GOTO 330
            GOTO 360
   330      IF (FULSEG-1.LT.1) GOTO 341
            DO 340 J=1,(FULSEG-1)
            VECTOR(IVEC,1)=S-1
            X1=XCORD(IFRST+(6*(J-1)))
            VECTOR(IVEC,2)=X1
            Y1=YCORD(IFRST+(6*(J-1)))
            VECTOR(IVEC,3)=Y1
            E1=ELEV(IFRST+(6*(J-1)))
            VECTOR(IVEC,4)=E1
            X2=XCORD(IFRST+(6*J))
            VECTOR(IVEC,5)=X2
            Y2=YCORD(IFRST+(6*J))
            VECTOR(IVEC,6)=Y2
            E2=ELEV(IFRST+(6*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            LL=(IFRST+(6*J))
   340      CONTINUE
            IFRST=LL
   341      DO 350 J=1,2
            VECTOR(IVEC,1)=S-1
            X1=XCORD(IFRST+(5*(J-1)))
            VECTOR(IVEC,2)=X1
            Y1=YCORD(IFRST+(5*(J-1)))
            VECTOR(IVEC,3)=Y1
            E1=ELEV(IFRST+(5*(J-1)))
            VECTOR(IVEC,4)=E1
            X2=XCORD(IFRST+(5*J))
            VECTOR(IVEC,5)=X2
            Y2=YCORD(IFRST+(5*J))
            VECTOR(IVEC,6)=Y2
            E2=ELEV(IFRST+(5*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
   350      CONTINUE
            GOTO 500
   360      IF (FINLSEG.EQ.4) GOTO 370
            GOTO 400
   370      IF (FULSEG-2.LT.1) GOTO 381
```

```
      DO 380 J=1,(FULSEG-2)
      VECTOR(IVEC,1)=S-1
      X1=XCORD(IFRST+(6*(J-1)))
      VECTOR(IVEC,2)=X1
      Y1=YCORD(IFRST+(6*(J-1)))
      VECTOR(IVEC,3)=Y1
      E1=ELEV(IFRST+(6*(J-1)))
      VECTOR(IVEC,4)=E1
      X2=XCORD(IFRST+(6*J))
      VECTOR(IVEC,5)=X2
      Y2=YCORD(IFRST+(6*J))
      VECTOR(IVEC,6)=Y2
      E2=ELEV(IFRST+(6*J))
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
      LL=(IFRST+(6*J))
380   CONTINUE
      IFRST=LL
381   DO 390 J=1,3
      VECTOR(IVEC,1)=S-1
      X1=XCORD(IFRST+(5*(J-1)))
      VECTOR(IVEC,2)=X1
      Y1=YCORD(IFRST+(5*(J-1)))
      VECTOR(IVEC,3)=Y1
      E1=ELEV(IFRST+(5*(J-1)))
      VECTOR(IVEC,4)=E1
      X2=XCORD(IFRST+(5*J))
      VECTOR(IVEC,5)=X2
      Y2=YCORD(IFRST+(5*J))
      VECTOR(IVEC,6)=Y2
      E2=ELEV(IFRST+(5*J))
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
390   CONTINUE
      GOTO 500
400   IF (FINLSEG.EQ.3) GOTO 410
      GOTO 440
410   IF (FULSEG-2.LT.1) GOTO 421
      DO 420 J=1,(FULSEG-2)
      VECTOR(IVEC,1)=S-1
      X1=XCORD(IFRST+(6*(J-1)))
      VECTOR(IVEC,2)=X1
      Y1=YCORD(IFRST+(6*(J-1)))
      VECTOR(IVEC,3)=Y1
      E1=ELEV(IFRST+(6*(J-1)))
      VECTOR(IVEC,4)=E1
      X2=XCORD(IFRST+(6*J))
      VECTOR(IVEC,5)=X2
      Y2=YCORD(IFRST+(6*J))
      VECTOR(IVEC,6)=Y2
      E2=ELEV(IFRST+(6*J))
      VECTOR(IVEC,7)=E2
      CALL TANDP(X1,Y1,E1,X2,Y2,E2,XLENGTH,TREND,PLUNGE,SCALE)
      VECTOR(IVEC,8)=XLENGTH
      VECTOR(IVEC,9)=TREND
      VECTOR(IVEC,10)=PLUNGE
      IVEC=IVEC+1
      LL=(IFRST+(6*J))
420   CONTINUE
      IFRST=LL
421   DO 430 J=1,2
      VECTOR(IVEC,1)=S-1
```

```
            X1=XCORD(IFRST+(7*(J-1)))
            VECTOR(IVEC,2)=X1
            Y1=YCORD(IFRST+(7*(J-1)))
            VECTOR(IVEC,3)=Y1
            E1=ELEV(IFRST+(7*(J-1)))
            VECTOR(IVEC,4)=E1
            X2=XCORD(IFRST+(7*J))
            VECTOR(IVEC,5)=X2
            Y2=YCORD(IFRST+(7*J))
            VECTOR(IVEC,6)=Y2
            E2=ELEV(IFRST+(7*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
430         CONTINUE
            GOTO 500
440         IF (FINLSEG.EQ.2) GOTO 450
            GOTO 500
450         IF (FULSEG-1.LT.1) GOTO 461
            DO 460 J=1, (FULSEG-1)
            VECTOR(IVEC,1)=S-1
            X1=XCORD(IFRST+(6*(J-1)))
            VECTOR(IVEC,2)=X1
            Y1=YCORD(IFRST+(6*(J-1)))
            VECTOR(IVEC,3)=Y1
            E1=ELEV(IFRST+(6*(J-1)))
            VECTOR(IVEC,4)=E1
            X2=XCORD(IFRST+(6*J))
            VECTOR(IVEC,5)=X2
            Y2=YCORD(IFRST+(6*J))
            VECTOR(IVEC,6)=Y2
            E2=ELEV(IFRST+(6*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
            LL=(IFRST+(6*J))
460         CONTINUE
            IFRST=LL
461         J=1
            VECTOR(IVEC,1)=S-1
            X1=XCORD(IFRST+(7*(J-1)))
            VECTOR(IVEC,2)=X1
            Y1=YCORD(IFRST+(7*(J-1)))
            VECTOR(IVEC,3)=Y1
            E1=ELEV(IFRST+(7*(J-1)))
            VECTOR(IVEC,4)=E1
            X2=XCORD(IFRST+(7*J))
            VECTOR(IVEC,5)=X2
            Y2=YCORD(IFRST+(7*J))
            VECTOR(IVEC,6)=Y2
            E2=ELEV(IFRST+(7*J))
            VECTOR(IVEC,7)=E2
            CALL TANDP(X1,Y1,E1,X2,Y2,E2,XLENGTH,TREND,PLUNGE,SCALE)
            VECTOR(IVEC,8)=XLENGTH
            VECTOR(IVEC,9)=TREND
            VECTOR(IVEC,10)=PLUNGE
            IVEC=IVEC+1
500         CONTINUE
            TYPE *, 'ENTER THE TREND VARIANCE TO BE USED IN DETERMINATION'
            TYPE *, 'OF VECTOR CORRELATION IN DEGREES.'
            ACCEPT *, DTREND
            TYPE *, 'ENTER THE PLUNGE VARIANCE TO BE USED IN DETERMINATION'
            TYPE *, 'OF VECTOR CORRELATION IN DEGREES.'
            ACCEPT *, DPLUNGE
```

```
        M=1
        DO 1000 I=1,IVEC-1
        IF (VECTOR(I,1).NE.VECTOR(I+1,1)) GOTO 900
        IF (ABS(VECTOR(I,9)-VECTOR(I+1,9)).GT.180)
       1DTEST=360-(ABS(VECTOR(I,9)-VECTOR(I+1,9)))
        DTEST=ABS(VECTOR(I,9)-VECTOR(I+1,9))
        GOTO 700
700     IF (DTEST.LE.DTREND.AND.
       1ABS(VECTOR(I,10)-VECTOR(I+1,10)).LE.DPLUNGE) GOTO 800
        GOTO 900
800     X1=VECTOR(I,2)
        VECTOR(I+1,2)=X1
        Y1=VECTOR(I,3)
        VECTOR(I+1,3)=Y1
        E1=VECTOR(I,4)
        VECTOR(I+1,4)=E1
        X2=VECTOR(I+1,5)
        Y2=VECTOR(I+1,6)
        E2=VECTOR(I+1,7)
        CALL TANDP(X1,Y1,E1,X2,Y2,E2,XLENGTH,TREND,PLUNGE,SCALE)
        VECTOR(I+1,8)=XLENGTH
        VECTOR(I+1,9)=TREND
        VECTOR(I+1,10)=PLUNGE
        GOTO 1000
900     VEC(M,1)=VECTOR(I,1)
        VEC(M,2)=VECTOR(I,2)
        VEC(M,3)=VECTOR(I,3)
        VEC(M,4)=VECTOR(I,4)
        VEC(M,5)=VECTOR(I,5)
        VEC(M,6)=VECTOR(I,6)
        VEC(M,7)=VECTOR(I,7)
        VEC(M,8)=VECTOR(I,8)
        VEC(M,9)=VECTOR(I,9)
        VEC(M,10)=VECTOR(I,10)
        M=M+1
1000    CONTINUE
        TYPE *, 'FORMATING OUTPUT'
        WRITE (2,13000)((VEC(J,I),I=1,10),J=1,M-1)
12000   FORMAT(7F10.2)
13000   FORMAT(10F8.2)
        STOP
        END
        SUBROUTINE TANDP(X1,Y1,E1,X2,Y2,E2,XLENGTH,TREND,PLUNGE,SCALE)
        INTEGER X1,Y1,X2,Y2
        RADEG=.017453293
        IF (E1.LE.E2) GOTO 550
        DELX=X2-X1
        DELX=DELX*SCALE
        DELY=Y2-Y1
        DELY=DELY*SCALE
        XLENGTH=SQRT(DELX**2+DELY**2)
        DELE=E1-E2
        PLUNGE=ATAN(DELE/XLENGTH)/RADEG
        GOTO 600
550     DELX=X1-X2
        DELX=DELX*SCALE
        DELY=Y1-Y2
        DELY=DELY*SCALE
        XLENGTH=SQRT(DELX**2+DELY**2)
        DELE=E2-E1
        PLUNGE=ATAN(DELE/XLENGTH)/RADEG
600     IF ((DELX.EQ.0) .AND. (DELY.GT.0)) GOTO 601
        GOTO 602
601     TREND=0
        GOTO 700
602     IF ((DELX.EQ.0) .AND. (DELY.LT.0)) GOTO 603
        GOTO 604
603     TREND=180
        GOTO 700
604     IF ((DELX.GT.0) .AND. (DELY.EQ.0)) GOTO 605
```

```
        GOTO 606
605     TREND=90
        GOTO 700
606     IF ((DELX.LT.0) .AND. (DELY.EQ.0)) GOTO 607
        GOTO 608
607     TREND=270
        GOTO 700
608     IF ((DELX.GT.0) .AND. (DELY.GT.0))GOTO 610
        GOTO 620
610     TREND=ATAN(DELX/DELY)/RADEG
        GOTO 700
620     IF ((DELX.LT.0) .AND. (DELY.GT.0)) GOTO 630
        GOTO 640
630     TREND=270+(ATAN(ABS(DELY/DELX))/RADEG)
        GOTO 700
640     IF ((DELX.LT.0) .AND. (DELY.LT.0)) GOTO 650
        GOTO 660
650     TREND=180+(ATAN(DELX/DELY)/RADEG)
        GOTO 700
660     IF ((DELX.GT.0) .AND. (DELY.LT.0)) GOTO 670
        GOTO 700
670     TREND=90+(ATAN(ABS(DELY/DELX))/RADEG)
700     RETURN
        END
C       ****************************************************
C       *******************COPLANE3.FOR*********************
C       ****************************************************
C       *** JAY R. ELIASON ****************NOVEMBER 15,1984 ***
C       PLANE DIP LIMITS 40 TO 90 DEGREES
C       PROGRAM FOR CALCULATING COPLANAR CORRELATIONS OF VECTORS
C       COPLANE.DAT -- OUTPUT FORMAT -- STRIKE, DIP, VEC1X1,
C       VEC1Y1, VEC1X2, VEC1Y2, VEC2X1, VEC2Y1, VEC2X2, VEC2Y2
C       OUTPUT - 1 X 1, 2 X 2, 5 X 5, 10 X 10 DEGREE CORRELATIONS
C
C       THIS PROGRAM REQUIRES THE FOLLOWING ASSIGNMENTS
C       ASSIGN (INPUT FILE NAME) FOR001    (INPUT DATA FILE)
C       ASSIGN COPLANE1.DAT FOR002         (OUTPUT DATA FILE)
C       ASSIGN STER1.DAT FOR003            (OUTPUT DATA FILE)
C       ASSIGN COPLANE2.DAT FOR004         (OUTPUT DATA FILE)
C       ASSIGN STER2.DAT FOR005            (OUTPUT DATA FILE)
C       ASSIGN COPLANE5.DAT FOR006         (OUTPUT DATA FILE)
C       ASSIGN STER5.DAT FOR007            (OUTPUT DATA FILE)
C       ASSIGN COPLANE10.DAT FOR008        (OUTPUT DATA FILE)
C       ASSIGN STER10.DAT FOR009           (OUTPUT DATA FILE)
C
C
        REAL INPUT
        INTEGER O,P1X,P1Y,P3X,P3Y,P4X,P4Y,W,C,E
        INTEGER S,X1,Y1,X2,Y2,STRING,VECTOR,X1CORD,X2CORD
        INTEGER Y1CORD,Y2CORD,PLANE,TEST
        DIMENSION STRING(10000),X1CORD(10000),X2CORD(10000),Y1CORD(10000)
        DIMENSION Y2CORD(10000),ELEV1(10000),ELEV2(10000),PLUNGE(10000)
        DIMENSION VECTOR(10000),TREND(10000),HLENGTH(10000),STER1(10000,4)
        DIMENSION STER2(10000,4),STER5(10000,4),STER10(20000,4)
        DIMENSION COPLANE1(10000,10),COPLANE2(10000,10),COPLANE5(10000,10)
        DIMENSION COPLANE10(20000,10),COP(20000,24),COP1(20000,24)
        N=1
        DO 100 I=1,10000
        READ (1,12000,END=200)(SS,XX1,YY1,E1,XX2,YY2,E2,HL,T,P)
        IF (I.EQ.1) TYPE *, 'READING INPUT DATA'
        S=INT(SS)
        X1=INT(XX1)
        Y1=INT(YY1)
        X2=INT(XX2)
        Y2=INT(YY2)
        STRING(I)=S
        X1CORD(I)=X1
        Y1CORD(I)=Y1
        X2CORD(I)=X2
        Y2CORD(I)=Y2
```

```
            ELEV1(I)=E1
            ELEV2(I)=E2
            HLENGTH(I)=HL
            TREND(I)=T
            PLUNGE(I)=P
            VECTOR(I)=N
            N=N+1
100     CONTINUE
200     TYPE *, 'INPUT DATA READY'
            TYPE *, 'ENTER NODE SPACING IN FEET'
            ACCEPT *, SCALE
            TEST=0
            STRIKE=0
            DIP=0
            POLET=0
            POLEP=0
            L=0
            PLANE=0
            TYPE *,'NUMBER OF VECTORS + ONE',N
            E=0
250     L=L+1
            E=E+1
            IF (E.EQ.10)  TYPE *, 'ANALYSING VECTOR NUMBER',L
            IF (E.EQ.10 ) E=0
            IF (L.EQ.N) GOTO 351
            I=N-1
            DO 350 M=1,I
            IF (M.EQ.L) GOTO 350
            XMINV=AMIN1(HLENGTH(L),HLENGTH(M))
            IF((X1CORD(L).EQ.X1CORD(M) .AND. Y1CORD(L).EQ.Y1CORD(M))
        1.OR.(X2CORD(L).EQ.X1CORD(M) .AND.Y2CORD(L).EQ.Y1CORD(M))
        1.OR.(X1CORD(L).EQ.X2CORD(M) .AND.Y1CORD(L).EQ.Y2CORD(M))
        1.OR.(X2CORD(L).EQ.X2CORD(M) .AND.Y2CORD(L).EQ.Y2CORD(M)))
        1TEST=1
            P1X=X1CORD(L)-X2CORD(L)
            P1Y=Y1CORD(L)-Y2CORD(L)
            P1E=ELEV1(L)-ELEV2(L)
            P3X=X1CORD(M)-X2CORD(L)
            P3Y=Y1CORD(M)-Y2CORD(L)
            P3E=ELEV1(M)-ELEV2(L)
            P4X=X2CORD(M)-X2CORD(L)
            P4Y=Y2CORD(M)-Y2CORD(L)
            P4E=ELEV2(M)-ELEV2(L)
            DTREN1=1.0
            DTREN2=2.0
            DTREN5=5.0
            DTREN10=10.0
            DPLUN1=1.0
            DPLUN2=2.0
            DPLUN5=5.0
            DPLUN10=10.0
            TTT1=-1.0
            TTT2=-1.0
            TTT5=-1.0
            IF (TEST.EQ.1) GOTO 777
            XP1X=P1X*SCALE
            YP1Y=P1Y*SCALE
            XP3X=P3X*SCALE
            YP3Y=P3Y*SCALE
            XP4X=P4X*SCALE
            YP4Y=P4Y*SCALE
            P23=SQRT((SQRT(XP3X**2+YP3Y**2))**2+P3E**2)
            P24=SQRT((SQRT(XP4X**2+YP4Y**2))**2+P4E**2)
            P13=SQRT((SQRT((XP1X-XP3X)**2+(YP1Y-YP3Y)**2))**2
        1+(P1E-P3E)**2)
            P14=SQRT((SQRT((XP1X-XP4X)**2+(YP1Y-YP4Y)**2))**2
        1+(P1E-P4E)**2)
            XMIND=AMIN1(P23,P24,P13,P14)
            DTREN1=DTREN1/((XMIND/XMINV)+1)
            DTREN2=DTREN2/((XMIND/XMINV)+1)
```

```
      DTREN5=DTREN5/((XMIND/XMINV)+1)
      DTREN10=DTREN10/((XMIND/XMINV)+1)
      DPLUN1=DPLUN1/((XMIND/XMINV)+1)
      DPLUN2=DPLUN2/((XMIND/XMINV)+1)
      DPLUN5=DPLUN5/((XMIND/XMINV)+1)
      DPLUN10=DPLUN10/((XMIND/XMINV)+1)
777   CALL SDP (P1X,P1Y,P1E,P3X,P3Y,P3E,P4X,P4Y,P4E,SCALE,DTREN1,
     1DPLUN1,DTREN2,DPLUN2,DTREN5,DPLUN5,STRIKE,DIP,POLET,POLEP,TEST,
     1DTREN10,DPLUN10,TTT1,TTT2,TTT5)
      IF (DIP.LT.40) GOTO 350
      IF (POLET.EQ.999) GOTO 350
      PLANE=PLANE+1
      COP(PLANE,1)=PLANE
      COP(PLANE,2)=STRIKE
      COP(PLANE,3)=DIP
      COP(PLANE,4)=POLET
      COP(PLANE,5)=POLEP
      COP(PLANE,6)=L
      COP(PLANE,7)=STRING(L)
      COP(PLANE,8)=X1CORD(L)
      COP(PLANE,9)=Y1CORD(L)
      COP(PLANE,10)=ELEV1(L)
      COP(PLANE,11)=X2CORD(L)
      COP(PLANE,12)=Y2CORD(L)
      COP(PLANE,13)=ELEV2(L)
      COP(PLANE,14)=H
      COP(PLANE,15)=STRING(M)
      COP(PLANE,16)=X1CORD(M)
      COP(PLANE,17)=Y1CORD(M)
      COP(PLANE,18)=ELEV1(M)
      COP(PLANE,19)=X2CORD(M)
      COP(PLANE,20)=Y2CORD(M)
      COP(PLANE,21)=ELEV2(M)
      COP(PLANE,22)=TTT1
      COP(PLANE,23)=TTT2
      COP(PLANE,24)=TTT5
350   CONTINUE
      GOTO 250
351   C=0
      DO 600 I=0,359
      DO 599 J=1,PLANE
      IF (COP(J,2).LT.I .OR. COP(J,2).GE.(I+1)) GOTO 599
      C=C+1
      COP1(C,1)=C
      COP1(C,2)=COP(J,2)
      COP1(C,3)=COP(J,3)
      COP1(C,4)=COP(J,4)
      COP1(C,5)=COP(J,5)
      COP1(C,6)=COP(J,6)
      COP1(C,7)=COP(J,7)
      COP1(C,8)=COP(J,8)
      COP1(C,9)=COP(J,9)
      COP1(C,10)=COP(J,10)
      COP1(C,11)=COP(J,11)
      COP1(C,12)=COP(J,12)
      COP1(C,13)=COP(J,13)
      COP1(C,14)=COP(J,14)
      COP1(C,15)=COP(J,15)
      COP1(C,16)=COP(J,16)
      COP1(C,17)=COP(J,17)
      COP1(C,18)=COP(J,18)
      COP1(C,19)=COP(J,19)
      COP1(C,20)=COP(J,20)
      COP1(C,21)=COP(J,21)
      COP1(C,22)=COP(J,22)
      COP1(C,23)=COP(J,23)
      COP1(C,24)=COP(J,24)
599   CONTINUE
600   CONTINUE
      J=0
```

```
      DO 500 I=1,C
      J=J+1
      COPLANE10(J,1)=COP1(I,2)
      COPLANE10(J,2)=COP1(I,3)
      COPLANE10(J,3)=COP1(I,8)
      COPLANE10(J,4)=COP1(I,9)
      COPLANE10(J,5)=COP1(I,11)
      COPLANE10(J,6)=COP1(I,12)
      COPLANE10(J,7)=COP1(I,16)
      COPLANE10(J,8)=COP1(I,17)
      COPLANE10(J,9)=COP1(I,19)
      COPLANE10(J,10)=COP1(I,20)
      STER10(J,1)=COP1(I,1)
      STER10(J,2)=2
      STER10(J,3)=COP1(I,4)
      STER10(J,4)=COP1(I,5)
500   CONTINUE
      TYPE *, 'FORMATING OUTPUT'
      WRITE (8,13000)((COPLANE10(L,M),M=1,10),L=1,J)
      WRITE (9,14000)((STER10(L,M),M=1,4),L=1,J)
      J=0
      DO 666 I=1,C
      IF (COP1(I,22).LT.0) GOTO 666
      J=J+1
      COPLANE1(J,1)=COP1(I,2)
      COPLANE1(J,2)=COP1(I,3)
      COPLANE1(J,3)=COP1(I,8)
      COPLANE1(J,4)=COP1(I,9)
      COPLANE1(J,5)=COP1(I,11)
      COPLANE1(J,6)=COP1(I,12)
      COPLANE1(J,7)=COP1(I,16)
      COPLANE1(J,8)=COP1(I,17)
      COPLANE1(J,9)=COP1(I,19)
      COPLANE1(J,10)=COP1(I,20)
      STER1(J,1)=COP1(I,1)
      STER1(J,2)=2
      STER1(J,3)=COP1(I,4)
      STER1(J,4)=COP1(I,5)
666   CONTINUE
      WRITE (2,13000)((COPLANE1(L,M),M=1,10),L=1,J)
      WRITE (3,14000)((STER1(L,M),M=1,4),L=1,J)
      J=0
      DO 700 I=1,C
      IF (COP1(I,23).LT.0) GOTO 700
      J=J+1
      COPLANE2(J,1)=COP1(I,2)
      COPLANE2(J,2)=COP1(I,3)
      COPLANE2(J,3)=COP1(I,8)
      COPLANE2(J,4)=COP1(I,9)
      COPLANE2(J,5)=COP1(I,11)
      COPLANE2(J,6)=COP1(I,12)
      COPLANE2(J,7)=COP1(I,16)
      COPLANE2(J,8)=COP1(I,17)
      COPLANE2(J,9)=COP1(I,19)
      COPLANE2(J,10)=COP1(I,20)
      STER2(J,1)=COP1(I,1)
      STER2(J,2)=2
      STER2(J,3)=COP1(I,4)
      STER2(J,4)=COP1(I,5)
700   CONTINUE
      WRITE (4,13000)((COPLANE2(L,M),M=1,10),L=1,J)
      WRITE (5,14000)((STER2(L,M),M=1,4),L=1,J)
      J=0
      DO 800 I=1,C
      IF (COP1(I,24).LT.0) GOTO 800
      J=J+1
      COPLANE5(J,1)=COP1(I,2)
      COPLANE5(J,2)=COP1(I,3)
      COPLANE5(J,3)=COP1(I,8)
      COPLANE5(J,4)=COP1(I,9)
```

```
      COPLANE5(J,5)=COP1(I,11)
      COPLANE5(J,6)=COP1(I,12)
      COPLANE5(J,7)=COP1(I,16)
      COPLANE5(J,8)=COP1(I,17)
      COPLANE5(J,9)=COP1(I,19)
      COPLANE5(J,10)=COP1(I,20)
      STER5(J,1)=COP1(I,1)
      STER5(J,2)=2
      STER5(J,3)=COP1(I,4)
      STER5(J,4)=COP1(I,5)
800   CONTINUE
      WRITE (6,13000)((COPLANE5(L,M),M=1,10),L=1,J)
      WRITE (7,14000)((STER5(L,M),M=1,4),L=1,J)
12000 FORMAT(10F8.2)
13000 FORMAT(10F8.2)
14000 FORMAT(4F10.2)
      STOP
      END
      SUBROUTINE SDP (P1X,P1Y,P1E,P3X,P3Y,P3E,P4X,P4Y,P4E,SCALE,
     1DTREN1,DPLUN1,DTREN2,DPLUN2,DTREN5,DPLUN5,STRIKE,DIP,POLET,
     1POLEP,TEST,DTREN10,DPLUN10,TTT1,TTT2,TTT5)
      INTEGER P1X,P1Y,P3X,P3Y,P4X,P4Y,TEST
      RADEG=.017453293
      I=0
      X1=P1X*SCALE
      Y1=P1Y*SCALE
      X3=P3X*SCALE
      Y3=P3Y*SCALE
      X4=P4X*SCALE
      Y4=P4Y*SCALE
      IF (TEST.EQ.1) GOTO 710
      IF((P1E.EQ.0).AND.(P3E.EQ.0)) GOTO 603
      GOTO 602
603   POLEP=90
      POLET=0
      GOTO 700
602   POLEX=Y1*P3E-P1E*Y3
      POLEY=P1E*X3-X1*P3E
      POLEE=X1*Y3-Y1*X3
      XLENGTH=SQRT(POLEX**2+POLEY**2)
      IF (XLENGTH.EQ.0) GOTO 603
      POLEP=ATAN(ABS(POLEE)/XLENGTH)/RADEG
600   IF (POLEX.EQ.0) GOTO 601
      GOTO 604
601   IF ((POLEE.GT.0.AND.POLEY.GT.0).OR.(POLEE.LT.0.AND.POLEY.LT.0))
     1POLET=180
      IF ((POLEE.GT.0.AND.POLEY.LT.0).OR.(POLEE.LT.0.AND.POLEY.GT.0))
     1POLET=0
      IF (POLEE.EQ.0) POLET=180
      GOTO 700
604   IF (POLEY.EQ.0) GOTO 605
      GOTO 608
605   IF ((POLEE.GT.0.AND.POLEX.LT.0).OR.(POLEE.LT.0.AND.POLEX.GT.0))
     1POLET=90
      IF ((POLEE.GT.0.AND.POLEX.GT.0).OR.(POLEE.LT.0.AND.POLEX.LT.0))
     1POLET=270
      IF (POLEE.EQ.0) POLET=90
      GOTO 700
608   IF ((POLEX.GT.0) .AND. (POLEY.GT.0)) GOTO 610
      GOTO 620
610   POLET=90-ATAN(POLEY/POLEX)/RADEG
      IF(POLEE.GT.0) POLET=POLET+180
      GOTO 700
620   IF ((POLEX.LT.0) .AND. (POLEY.GT.0)) GOTO 630
      GOTO 640
630   POLET=360-(ATAN(ABS(POLEX/POLEY))/RADEG)
      IF(POLEE.GT.0) POLET=POLET-180
      GOTO 700
640   IF ((POLEX.LT.0) .AND. (POLEY.LT.0)) GOTO 650
      GOTO 660
```

```
650     POLET=270-(ATAN(POLEY/POLEX)/RADEG)
        IF(POLEE.GT.0) POLET=POLET-180
        GOTO 700
660     IF ((POLEX.GT.0) .AND. (POLEY.LT.0)) GOTO 670
        GOTO 700
670     POLET=180-(ATAN(ABS(POLEX/POLEY))/RADEG)
        IF(POLEE.GT.0) POLET=POLET+180
700     IF (TEST.EQ.1) GOTO 720
        IF (I.EQ.1) GOTO 715
        POLET1=POLET
        POLEP1=POLEP
710     IF((P1E.EQ.0).AND.(P4E.EQ.0)) GOTO 711
        GOTO 712
711     POLEP=90
        POLET=0
        I=1
        GOTO 700
712     POLEX=Y1*P4E-P1E*Y4
        POLEY=P1E*X4-X1*P4E
        POLEE=X1*Y4-Y1*X4
        XLENGTH=SQRT(POLEX**2+POLEY**2)
        IF ((TEST.EQ.1).AND.(XLENGTH.EQ.0)) GOTO 602
        IF (XLENGTH.EQ.0) GOTO 711
        POLEP=ATAN(ABS(POLEE)/XLENGTH)/RADEG
        I=1
        GOTO 600
715     IF((POLEP.EQ.90).AND.(POLEP1.EQ.90)) GOTO 720
        IF((POLEP.EQ.90).OR.(POLEP1.EQ.90)) GOTO 722
        IF (ABS(POLET1-POLET).GT.180) GOTO 716
        GOTO 717
716     DTEST=360-(ABS(POLET1-POLET))
        GOTO 718
717     DTEST=ABS(POLET1-POLET)
718     IF (DTEST.LE.DTREN1.AND.ABS(POLEP1-POLEP).LE.DPLUN1) TTT1=1
        IF (DTEST.LE.DTREN2.AND.ABS(POLEP1-POLEP).LE.DPLUN2) TTT2=1
        IF (DTEST.LE.DTREN5.AND.ABS(POLEP1-POLEP).LE.DPLUN5) TTT5=1
        IF (DTEST.LE.DTREN10 .AND. ABS(POLEP1-POLEP).LE.DPLUN10) GOTO 719
        POLET=999
        POLEP=999
        GOTO 750
719     POLET=(POLET1+POLET)/2
        POLEP=(POLEP1+POLEP)/2
720     DIP=90-POLEP
        STRIKE=POLET+90
        GOTO 730
722     IF (POLEP.NE.90) GOTO 720
        POLEP=POLEP1
        POLET=POLET1
        GOTO 720
730     IF(STRIKE.GT.360) GOTO 740
        IF(STRIKE.LT.0) GOTO 735
        GOTO 750
735     STRIKE=STRIKE+360
        GOTO 750
740     STRIKE=STRIKE-360
750     TEST=0
        RETURN
        END
C       **********************************************
C       *****************VECPLT.FOR*******************
C       **********************************************
C
C       VAX 11/780 VERSION
C       PLOTS VECTOR DATA FROM VECTOR.FOR (XXXXV.DAT FILES)
C
        CHARACTER*30 INFILE
        BYTE TITLE(60)
        AL=.001
        YAX=5.3
        XAX=7.1
```

```
        IVECT=0
1       XPAGE=11.0
        YPAGE=8.5
        WRITE (*,*) 'ENTER THE TITLE FOR THE VECTOR PLOT'
        READ (*,700) TITLE
        WRITE (*,*) 'ENTER THE MINIMUM AND MAXIMUM VECTOR LENGTHS'
        READ (*,*) VECMIN,VECMAX
        WRITE (*,*) 'ENTER THE INPUT FILE NAME AND EXTENSION'
        READ (*,600) INFILE
        WRITE (*,*) 'ENTER XMIN,XMAX'
        READ (*,*) X1,X2
        WRITE (*,*) 'ENTER YMIN,YMAX'
        READ (*,*) Y1,Y2
40      CALL COMPRS
        CALL PLOTS(0.0,0.0,8)
        CALL PAGE(XPAGE,YPAGE)
        CALL NEWPEN(8)
        XS=X2-X1
        YS=Y2-Y1
        RX=XAX/XS
        RY=YAX/YS
        SF=AMIN1(RX,RY)
        Y0=((YAX -SF*YS)/2)+.01
        X0=((XAX -SF*XS)/2)+.01
C
C       PLOT BOX
C
        XA=X0+SF*XS
        YA=Y0+SF*YS
        CALL PLOT (X0,Y0,3)
        CALL PLOT (XA,Y0,2)
        CALL PLOT (XA,YA,2)
        CALL PLOT (X0,YA,2)
        CALL PLOT (X0,Y0,2)
C
C
        OPEN(1,FILE=INFILE,STATUS='OLD')
        DO 100 I=1, 10000
        READ (1,800,END=200) S,XV1,YV1,EV1,XV2,YV2,EV2,HL,T,P
        CALL NEWPEN(8)
        IV=0
        IF (HL.GE.VECMIN.AND.HL.LE.VECMAX) GOTO 45
        GOTO 100
45      IF (IVECT.EQ.0) GOTO 50
50      XP1=(XV1-X1)*SF+X0
        YP1=(YV1-Y1)*SF+Y0
        XP2=(XV2-X1)*SF+X0
        YP2=(YV2-Y1)*SF+Y0
        XA=XP1
        YA=YP1
        XB=XP2
        YB=YP2
        IF (EV2.LT.EV1) GOTO 90
        XA=XP2
        YA=YP2
        XB=XP1
        YB=YP1
90      DX=XB-XA
        DY=YB-YA
        DS=SQRT(DX*DX+DY*DY)
        IF (DS.EQ.0) GOTO 100
        DXN=DX/DS
        DYN=DY/DS
C
        AX1=-AL*DXN
        AY1=-AL*DYN
        AX2=-AL*DYN/2
        AY2=AL*DXN/2
C
        CALL PLOT (XA,YA,3)
```

```
        CALL PLOT (XB,YB,2)
        CALL PLOT (XB+AX1+AX2,YB+AY1+AY2,2)
        CALL PLOT (XB+AX1-AX2,YB+AY1-AY2,2)
        CALL PLOT (XB,YB,2)
100     CONTINUE
200     CLOSE (1)
        IVECT=0
        CALL NEWPEN(8)
        CALL PLOT (0.0,0.0,3)
        CALL SYMBOL (1.,5.35,.2,TITLE,0.0,999)
600     FORMAT (A30)
700     FORMAT (60A1)
800     FORMAT (10F8.2)
        CALL PLOTND
        STOP
        END
C       *******************PLASTDP.FOR*********************
C
C
C       VAX 11/780 VERSION
C       THIS PROGRAM SORTS COPLANE3.FOR OUTPUT BY STRIKE AND DIP
C       INTO A 1 X 1 DEGREE MATRIX OF COPLANAR DETECTS FOR STRIKE
C       FROM 1 TO 360 DEGREES AND DIP FROM 40 TO 90 DEGREES.
C
        INTEGER*2 ISORT(360,52)
        CHARACTER*30 INFILE,OUTFIL
        WRITE (*,*) 'ENTER THE INPUT FILE NAME AND EXTENSION'
        READ (*,600) INFILE
        WRITE (*,*) 'ENTER  THE OUTPUT FILE NAME AND EXTENSION'
        READ (*,600) OUTFIL
        WRITE (*,*) 'ENTER THE MINIMUM AND MAXIMUM VECTOR LENGTHS'
        READ (*,*) VECMIN,VECMAX
        WRITE (*,*) 'ENTER THE NODE SPACING'
        READ (*,*) SF
        OPEN (1,FILE=INFILE,STATUS='OLD')
        OPEN (2,FILE=OUTFIL,STATUS='NEW')
        DO 90 I=1,360
        DO 80 J=1,52
        ISORT(I,J)=0
80      CONTINUE
90      CONTINUE
        DO 100 L=1,10000
        READ (1,800,END=200) S,D,X11,Y11,X12,Y12,X21,Y21,X22,Y22
        X11=X11*SF
        Y11=Y11*SF
        X12=X12*SF
        Y12=Y12*SF
        X21=X21*SF
        Y21=Y21*SF
        X22=X22*SF
        Y22=Y22*SF
        ITEST1=0
        ITEST2=0
        D1=SQRT((X11-X12)2+(Y11-Y12)2)
        D2=SQRT((X21-X22)2+(Y21-Y22)2)
        IF (D1.GE.VECMIN.AND.D1.LE.VECMAX) ITEST1=1
        IF (D2.GE.VECMIN.AND.D2.LE.VECMAX) ITEST2=1
        IF (ITEST1.EQ.1.AND.ITEST2.EQ.1) GOTO 45
        GOTO 100
45      IS=INT(S)
        ID=(INT(D)-40)+3
        IF (ID.EQ.53) ID=52
        ISORT(IS,ID)=ISORT(IS,ID)+1
100     CONTINUE
200     DO 120 I=1,360
        DO 110 J=1,2
        M=1
        IF (J.EQ.2) M=0
        ISORT(I,J)=M
110     CONTINUE
120     CONTINUE
```

```
          WRITE (2,900)((ISORT(J,I),I=1,52),J=1,360)
          CLOSE (1)
          CLOSE (2)
600       FORMAT(A30)
800       FORMAT(10F8.2)
900       FORMAT(I4,51I2)
          STOP
          END
C   *************************************************************
C   ****************PLAPLT.FOR***********************************
C   *************************************************************
C
C     VAX 11/780 VERSION
C     PLOTS PLANE DATA FROM COPLANE.FOR (XXXXP.DAT FILES)
C
          CHARACTER*30 INFILE
          BYTE TITLE(60)
          AL=.001
          YAX=10.65
          XAX=8.3
          IVECT=0
          XPAGE=8.5
          YPAGE=11.0
1         CALL COMPRS
          CALL PLOTS (0.0,0.0,8)
          CALL PAGE(XPAGE,YPAGE)
          WRITE (*,*) 'ENTER THE TITLE FOR THE PLOT'
          READ (*,700) TITLE
          WRITE (*,*) 'ENTER THE MINIMUM AND MAXIMUM VECTOR LENGTHS'
          READ (*,*) VECMIN,VECMAX
          WRITE (*,*) 'ENTER NODE SPACING'
          READ (*,*) XNS
          WRITE (*,*) 'ENTER THE INPUT FILE NAME AND EXTENSION'
          READ (*,600) INFILE
          WRITE (*,*) 'ENTER XMIN,XMAX'
          READ (*,*) X1,X2
          WRITE (*,*) 'ENTER YMIN,YMAX'
          READ (*,*) Y1,Y2
          X1=X1*XNS
          X2=X2*XNS
          Y1=Y1*XNS
          Y2=Y2*XNS
          XS=X2-X1
          YS=Y2-Y1
          RX=XAX/XS
          RY=YAX/YS
          SF=AMIN1(RX,RY)
          Y0=((YAX -SF*YS)/2)+.01
          X0=((XAX -SF*XS)/2)+.01
C
C     PLOT BOX
C
          XA=X0+SF*XS
          YA=Y0+SF*YS
          GOTO 201
30        CALL NEWPEN(8)
          CALL PLOT (X0,Y0,3)
          CALL PLOT (XA,Y0,2)
          CALL PLOT (XA,YA,2)
          CALL PLOT (X0,YA,2)
          CALL PLOT (X0,Y0,2)
C
C
40        OPEN(1,FILE=INFILE,STATUS='OLD')
          GOTO 42
42        DO 100 I=1, 10000
          READ (1,800,END=201) S,D,X11,Y11,X12,Y12,X21,Y21,X22,Y22
          IV=0
          X11=X11*XNS
          Y11=Y11*XNS
```

```
          X12=X12*XNS
          Y12=Y12*XNS
          X21=X21*XNS
          Y21=Y21*XNS
          X22=X22*XNS
          Y22=Y22*XNS
          ITEST1=0
          ITEST2=0
          D1=SQRT((X11-X12)2+(Y11-Y12)2)
          D2=SQRT((X21-X22)2+(Y21-Y22)2)
          IF (D1.GE.VECMIN.AND.D1.LE.VECMAX) ITEST1=1
          IF (D2.GE.VECMIN.AND.D2.LE.VECMAX) ITEST2=1
          IF (ITEST1.EQ.1.AND.ITEST2.EQ.1) GOTO 45
          GOTO 100
45        IF (IVECT.EQ.0) GOTO 50
          IF (S.GE.V1MIN .AND. S.LE.V1MAX) IV=1
          IF (DIP2.NE.90) GOTO 101
          IF (S.GE.V2MIN .AND. S.LE.V2MAX) IV=1
101       IF (ABS(V1MAX-V1MIN).GT.180) GOTO 46
          IF (DIP2.NE.90) GOTO 49
          GOTO 47
46        IF (S.GE.V1MIN.AND.S.LE.360) IV=1
          IF (S.GE.0.AND.S.LE.V1MAX) IV=1
          IF (DIP2.NE.90) GOTO 49
47        IF (ABS(V2MAX-V2MIN).GT.180) GOTO 48
          GOTO 49
48        IF (S.GE.V2MIN.AND.S.LE.360) IV=1
          IF (S.GE.0.AND.S.LE.V2MAX) IV=1
49        IF ((IV.EQ.1).AND.(D.GE.DIP1.AND.D.LE.DIP2)) GOTO 111
          GOTO 100
111       IF (JJ.EQ.1) GOTO 60
          CALL NEWPEN(ICOLV)
50        XP1=(X11-X1)*SF+X0
          YP1=(Y11-Y1)*SF+Y0
          XP2=(X12-X1)*SF+X0
          YP2=(Y12-Y1)*SF+Y0
          CALL PLOT (XP1,YP1,3)
          CALL PLOT (XP2,YP2,2)
          XP1=(X21-X1)*SF+X0
          YP1=(Y21-Y1)*SF+Y0
          XP2=(X22-X1)*SF+X0
          YP2=(Y22-Y1)*SF+Y0
          CALL PLOT (XP1,YP1,3)
          CALL PLOT (XP2,YP2,2)
          GOTO 100
60        CALL NEWPEN(ICOLV)
          IF((X11.EQ.X12) .OR. (X21.EQ.X22)) GOTO 70
          IF (X11.GT.X12) GOTO 61
          XP1=(X12-X1)*SF+X0
          YP1=(Y12-Y1)*SF+Y0
          GOTO 62
61        XP1=(X11-X1)*SF+X0
          YP1=(Y11-Y1)*SF+Y0
62        IF(XP1.EQ.((X11-X1)*SF+X0)) GOTO 63
          XP2=(X11-X1)*SF+X0
          YP2=(Y11-Y1)*SF+Y0
          GOTO 64
63        XP2=(X12-X1)*SF+X0
          YP2=(Y12-Y1)*SF+Y0
64        IF(X21.GT.X22) GOTO 65
          XP3=(X22-X1)*SF+X0
          YP3=(Y22-Y1)*SF+Y0
          GOTO 66
65        XP3=(X21-X1)*SF+X0
          YP3=(Y21-Y1)*SF+Y0
66        IF(XP3.EQ.((X21-X1)*SF+X0)) GOTO 67
          XP4=(X21-X1)*SF+X0
          YP4=(Y21-Y1)*SF+Y0
          GOTO 68
67        XP4=(X22-X1)*SF+X0
```

```
        YP4=(Y22-Y1)*SF+Y0
68      GOTO 78
70      IF(Y11.GT.Y12) GOTO 71
        YP1=(Y12-Y1)*SF+Y0
        XP1=(X12-X1)*SF+X0
        GOTO 72
71      YP1=(Y11-Y1)*SF+Y0
        XP1=(X11-X1)*SF+X0
72      IF(YP1.EQ.((Y11-Y1)*SF+Y0)) GOTO 73
        YP2=(Y11-Y1)*SF+Y0
        XP2=(X11-X1)*SF+X0
        GOTO 74
73      YP2=(Y12-Y1)*SF+Y0
        XP2=(X12-X1)*SF+X0
74      IF(Y21.GT.Y22) GOTO 75
        YP3=(Y22-Y1)*SF+Y0
        XP3=(X22-X1)*SF+X0
        GOTO 76
75      YP3=(Y21-Y1)*SF+Y0
        XP3=(X21-X1)*SF+X0
76      IF(YP3.EQ.((Y21-Y1)*SF+Y0)) GOTO 77
        YP4=(Y21-Y1)*SF+Y0
        XP4=(X21-X1)*SF+X0
        GOTO 79
77      YP4=(Y22-Y1)*SF+Y0
        XP4=(X22-X1)*SF+X0
        GOTO 79
78      IF((YP1.GE.YP2).AND.(YP4.GE.YP3)) GOTO 81
        IF((YP1.LE.YP2).AND.(YP4.LE.YP3)) GOTO 81
        GOTO 80
79      IF((XP1.GE.XP2).AND.(XP4.GE.XP3)) GOTO 81
        IF((XP1.LE.XP2).AND.(XP4.LE.XP3)) GOTO 81
        GOTO 80
80      CALL PLOT(XP1,YP1,3)
        CALL PLOT(XP2,YP2,2)
        CALL PLOT(XP3,YP3,2)
        CALL PLOT(XP4,YP4,2)
        CALL PLOT(XP1,YP1,2)
        GOTO 100
81      CALL PLOT(XP1,YP1,3)
        CALL PLOT(XP2,YP2,2)
        CALL PLOT(XP4,YP4,2)
        CALL PLOT(XP3,YP3,2)
        CALL PLOT(XP1,YP1,2)
100     CONTINUE
        GOTO 201
200     CALL NEWPEN(8)
        CALL PLOT (0.0,0.0,3)
        CALL SYMBOL (1.,10.7,.2,TITLE,0.0,999)
        GOTO 888
201     IVECT=0
        CLOSE(1)
        IX=0
        JJ=0
        WRITE (*,*) 'ENTER AN OPTION'
        WRITE (*,*) '(0) TO PLOT ALL COPLANAR VECTORS'
        WRITE (*,*) '(1) TO PLOT SELECTED COPLANAR VECTORS'
        WRITE (*,*) '(2) TO PLOT SELECTED COPLANAR'
        WRITE (*,*) '    VECTORS AND CONNECTING VECTORS'
        WRITE (*,*) '(3) TO STOP PROGRAM'
        READ (*,*) ISELECT
        IF (ISELECT.EQ.0) GOTO 30
        IF (ISELECT.EQ.2) JJ=1
        IF (ISELECT.EQ.3) GOTO 200
        WRITE (*,*) 'ENTER PLANE DIP RANGE TO BE SELECTED (MIN,MAX)'
        READ (*,*) DIP1,DIP2
        WRITE (*,*) 'ENTER PLANE STRIKE RANGE TO BE SELECTED (MIN,MAX)'
        READ (*,*) V1MIN,V1MAX
        IF (DIP2.NE.90) GOTO 280
        IF (V1MIN.GE.180) GOTO 250
```

```
            V2MIN=V1MIN+180
            GOTO 260
250         V2MIN=V1MIN-180
260         IF (V1MAX.GE.180) GOTO 270
            V2MAX=V1MAX+180
            GOTO 280
270         V2MAX=V1MAX-180
280         IX=1
            IVECT=1
            WRITE(*,*)'SELECT A COLOR 1 TO 8'
            READ (*,*) ICOLV
            IF (IX.EQ.1) GOTO 30
            GOTO 40
600         FORMAT (A30)
700         FORMAT (60A1)
800         FORMAT (10F8.2)
888         CLOSE(1)
            CALL PLOTND
            STOP
            END
C     ***********************************************************
C
C     ROSE.FOR -- PROGRAM FOR PLOTTING ROSE DIAGRAMS
C
C     JAY ELIASON -- VAX 11/780 VERSION
C
C     ***********************************************************
C
            CHARACTER*30 INFILE
            BYTE TITLE(60)
            DIMENSION ICOL(16)
            REAL NTOT,NVEC
C
            R=3.0
            PI=3.14159265
            STEP=0.04
            XPAGE=11.0
            YPAGE=8.5
            CALL COMPRS
            CALL PLOTS(0.0,0.0,8)
            CALL PAGE(XPAGE,YPAGE)
1           T1=0
            T2=0
            T3=0
            T4=0
            T5=0
            T6=0
            T7=0
            T8=0
            T9=0
            T10=0
            T11=0
            T12=0
            T13=0
            T14=0
            T15=0
            T16=0
            T17=0
            T18=0
            XOR=3.56
            YOR=1.0
            NVEC=0
            NTOT=0
            WRITE (*,*) 'ENTER THE INPUT DATA TYPE (1)VECTOR OR (2)PLANE'
            READ (*,*) ITYPE
            WRITE (*,*) 'ENTER THE TITLE FOR THE ROSE DIAGRAM'
            READ (*,1100) TITLE
            WRITE (*,*) 'ENTER THE MINIMUM AND MAXIMUM VECTOR'
            WRITE (*,*) 'LENGTHS FOR THE ANALYSIS'
            READ (*,*) VECMIN,VECMAX
```

```
        WRITE (*,*) 'ENTER NODE SPACING'
        READ (*,*) XNS
        WRITE (*,*) 'ENTER THE INPUT FILE NAME AND EXTENSION'
        READ (*,1000) INFILE
        IF (ITYPE.EQ.2) GOTO 2
        GOTO 3
2       WRITE (*,*) 'ENTER MINIMUM AND MAXIMUM DIP ANGLES'
        READ (*,*) DMIN,DMAX
3       OPEN (1,FILE=INFILE,STATUS='OLD')
        DO 100 I=1,100000
        IF (ITYPE.EQ.2) GOTO 4
        READ (1,1200,END=200) S,XV1,YV1,EV1,XV2,YV2,EV2,HL,T,P
        NTOT=NTOT+1
        IF (HL.GE.VECMIN .AND. HL.LE.VECMAX) GOTO 5
        GOTO 100
4       READ (1,1200,END=200)S,D,X11,Y11,X12,Y12,X21,Y21,X22,Y22
        IF (D.LT.DMIN .OR. D.GT.DMAX) GOTO 100
        NTOT=NTOT+1
        X11=X11*XNS
        Y11=Y11*XNS
        X12=X12*XNS
        Y12=Y12*XNS
        X21=X21*XNS
        Y21=Y21*XNS
        X22=X22*XNS
        Y22=Y22*XNS
        ITEST1=0
        ITEST2=0
        T=S
        HL=1
        D1=SQRT((X11-X12)**2+(Y11-Y12)**2)
        D2=SQRT((X21-X22)2+(Y21-Y22)2)
        IF (D1.GE.VECMIN .AND. D1.LE.VECMAX) ITEST1=1
        IF (D2.GE.VECMIN .AND. D2.LE.VECMAX) ITEST2=1
        IF (ITEST1.EQ.1 .AND. ITEST2.EQ.1) GOTO 6
        GOTO 100
5       HL=HL/100
        NVEC=NVEC+1
6       IF ((T.GT.80 .AND. T.LE.90).OR.(T.GE.260 .AND. T.LT.270))GOTO 10
        GOTO 12
10      T1=T1+HL
        GOTO 100
12      IF ((T.GT.70 .AND. T.LE.80).OR.(T.GE.250 .AND. T.LT.260))GOTO 14
        GOTO 16
14      T2=T2+HL
        GOTO 100
16      IF ((T.GT.60 .AND. T.LE.70).OR.(T.GE.240 .AND. T.LT.250))GOTO 18
        GOTO 20
18      T3=T3+HL
        GOTO 100
20      IF ((T.GT.50 .AND. T.LE.60).OR.(T.GE.230 .AND. T.LT.240))GOTO 22
        GOTO 24
22      T4=T4+HL
        GOTO 100
24      IF ((T.GT.40 .AND. T.LE.50).OR.(T.GE.220 .AND. T.LT.230))GOTO 26
        GOTO 28
26      T5=T5+HL
        GOTO 100
28      IF ((T.GT.30 .AND. T.LE.40).OR.(T.GE.210 .AND. T.LT.220))GOTO 30
        GOTO 32
30      T6=T6+HL
        GOTO 100
32      IF ((T.GT.20 .AND. T.LE.30).OR.(T.GE.200 .AND. T.LT.210))GOTO 34
        GOTO 36
34      T7=T7+HL
        GOTO 100
36      IF ((T.GT.10 .AND. T.LE.20).OR.(T.GE.190 .AND. T.LT.200))GOTO 38
        GOTO 40
38      T8=T8+HL
        GOTO 100
```

```
40      IF ((T.GT.0 .AND. T.LE.10).OR.(T.GE.180 .AND. T.LT.190))GOTO 42
        GOTO 44
42      T9=T9+HL
        GOTO 100
44      IF ((T.GT.350.AND.T.LE.360).OR.(T.EQ.0)) GOTO 46
        IF (T.GE.170.AND.T.LT.180) GOTO 46
        GOTO 48
46      T10=T10+HL
        GOTO 100
48      IF ((T.GT.340 .AND. T.LE.350).OR.(T.GE.160 .AND. T.LT.170))GOTO 50
        GOTO 52
50      T11=T11+HL
        GOTO 100
52      IF ((T.GT.330 .AND. T.LE.340).OR.(T.GE.150 .AND. T.LT.160))GOTO 54
        GOTO 56
54      T12=T12+HL
        GOTO 100
56      IF ((T.GT.320 .AND. T.LE.330).OR.(T.GE.140 .AND. T.LT.150))GOTO 58
        GOTO 60
58      T13=T13+HL
        GOTO 100
60      IF ((T.GT.310 .AND. T.LE.320).OR.(T.GE.130 .AND. T.LT.140))GOTO 62
        GOTO 64
62      T14=T14+HL
        GOTO 100
64      IF ((T.GT.300 .AND. T.LE.310).OR.(T.GE.120 .AND. T.LT.130))GOTO 66
        GOTO 68
66      T15=T15+HL
        GOTO 100
68      IF ((T.GT.290 .AND. T.LE.300).OR.(T.GE.110 .AND. T.LT.120))GOTO 70
        GOTO 72
70      T16=T16+HL
        GOTO 100
72      IF ((T.GT.280 .AND. T.LE.290).OR.(T.GE.100 .AND. T.LT.110))GOTO 74
        GOTO 76
74      T17=T17+HL
        GOTO 100
76      IF ((T.GE.270 .AND. T.LE.280).OR.(T.GE.90 .AND. T.LT.100))
       1T18=T18+HL
100     CONTINUE
200     CLOSE (1)
        FRAC=NVEC/NTOT
        WRITE(*,*)'TOTAL COUNT',NTOT
        WRITE(*,*)'NUMBER PLOTTED',NVEC
        WRITE(*,*)'FRACTION OF TOTAL',FRAC
        TMAX=AMAX1(T1,T2,T3,T4,T5,T6,T7,T8,T9,T10,T11,T12,T13,T14,T15,
       1T16,T17,T18)
        IF(ITYPE.EQ.1) WRITE(*,*)'100% VECTOR LENGTH =',TMAX*100
        IF(ITYPE.EQ.2) WRITE(*,*)'100% NUMBER OF PLANES =',TMAX*100
        TL1=R*T1/TMAX
        TL2=R*T2/TMAX
        TL3=R*T3/TMAX
        TL4=R*T4/TMAX
        TL5=R*T5/TMAX
        TL6=R*T6/TMAX
        TL7=R*T7/TMAX
        TL8=R*T8/TMAX
        TL9=R*T9/TMAX
        TL10=R*T10/TMAX
        TL11=R*T11/TMAX
        TL12=R*T12/TMAX
        TL13=R*T13/TMAX
        TL14=R*T14/TMAX
        TL15=R*T15/TMAX
        TL16=R*T16/TMAX
        TL17=R*T17/TMAX
        TL18=R*T18/TMAX
        CALL NEWPEN(2)
        S=0
        DO 205 I=1,200
```

```
              S=S+STEP
              IF (S.GE.TL1) S=TL1
              CALL PLOT (XOR,YOR,3)
              ANGR=0*PI/180
              XP=XOR+S*COS(ANGR)
              YP=YOR+S*SIN(ANGR)
              CALL PLOT (XP,YP,3)
              ANGR=10*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL1) GOTO 210
205           CONTINUE
210           CALL NEWPEN(2)
              S=0
              DO 215 I=1,200
              S=S+STEP
              IF (S.GE.TL2) S=TL2
              ANGR=10*PI/180
              XP=XOR+S*COS(ANGR)
              YP=YOR+S*SIN(ANGR)
              CALL PLOT (XP,YP,3)
              ANGR=20*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL2) GOTO 220
215           CONTINUE
220           CALL NEWPEN(2)
              S=0
              DO 225 I=1,200
              S=S+STEP
              IF(S.GE.TL3) S=TL3
              ANGR=20*PI/180
              XP=XOR+S*COS(ANGR)
              YP=YOR+S*SIN(ANGR)
              CALL PLOT (XP,YP,3)
              ANGR=30*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL3) GOTO 230
225           CONTINUE
230           CALL NEWPEN(2)
              S=0
              DO 235 I=1,200
              S=S+STEP
              IF (S.GE.TL4) S=TL4
              ANGR=30*PI/180
              XP=XOR+S*COS(ANGR)
              YP=YOR+S*SIN(ANGR)
              CALL PLOT (XP,YP,3)
              ANGR=40*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL4) GOTO 240
235           CONTINUE
240           CALL NEWPEN(2)
              S=0
              DO 245 I=1,200
              S=S+STEP
              IF(S.GE.TL5) S=TL5
              ANGR=40*PI/180
              XP=XOR+S*COS(ANGR)
              YP=YOR+S*SIN(ANGR)
```

```
              CALL PLOT (XP,YP,3)
              ANGR=50*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL5) GOTO 250
245           CONTINUE
250           CALL NEWPEN(2)
              S=0
              DO 255 I=1,200
              S=S+STEP
              IF(S.GE.TL6) S=TL6
              ANGR=50*PI/180
              XP=XOR+S*COS(ANGR)
              YP=YOR+S*SIN(ANGR)
              CALL PLOT (XP,YP,3)
              ANGR=60*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL6) GOTO 260
255           CONTINUE
260           CALL NEWPEN(2)
              S=0
              DO 265 I=1,200
              S=S+STEP
              IF(S.GE.TL7) S=TL7
              ANGR=60*PI/180
              XP=XOR+S*COS(ANGR)
              YP=YOR+S*SIN(ANGR)
              CALL PLOT (XP,YP,3)
              ANGR=70*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL7) GOTO 270
265           CONTINUE
270           CALL NEWPEN(2)
              S=0
              DO 275 I=1,200
              S=S+STEP
              IF(S.GE.TL8) S=TL8
              ANGR=70*PI/180
              XP=XOR+S*COS(ANGR)
              YP=YOR+S*SIN(ANGR)
              CALL PLOT (XP,YP,3)
              ANGR=80*PI/180
              XP=XOR+S*COS(ANGR)
              YP=YOR+S*SIN(ANGR)
              CALL PLOT (XP,YP,2)
              CALL PLOT(XOR,YOR,3)
              IF(S.EQ.TL8) GOTO 280
275           CONTINUE
280           CALL NEWPEN(2)
              S=0
              DO 285 I=1,200
              S=S+STEP
              IF(S.GE.TL9) S=TL9
              ANGR=80*PI/180
              XP=XOR+S*COS(ANGR)
              YP=YOR+S*SIN(ANGR)
              CALL PLOT (XP,YP,3)
              ANGR=90*PI/180
              XP=XOR+S*COS(ANGR)
              YP=YOR+S*SIN(ANGR)
              CALL PLOT (XP,YP,2)
              CALL PLOT (XOR,YOR,3)
```

```
            IF(S.EQ.TL9) GOTO 290
285     CONTINUE
290     CALL NEWPEN(2)
        S=0
        DO 295 I=1,200
        S=S+STEP
        IF(S.GE.TL10) S=TL10
        ANGR=90*PI/180
        XP=XOR+S*COS(ANGR)
        YP=YOR+S*SIN(ANGR)
        CALL PLOT (XP,YP,3)
        ANGR=100*PI/180
        XP=XOR+S*COS(ANGR)
        YP=YOR+S*SIN(ANGR)
        CALL PLOT (XP,YP,2)
        CALL PLOT(XOR,YOR,3)
        IF(S.EQ.TL10) GOTO 300
295     CONTINUE
300     CALL NEWPEN(2)
        S=0
        DO 305 I=1,200
        S=S+STEP
        IF(S.GE.TL11) S=TL11
        ANGR=100*PI/180
        XP=XOR+S*COS(ANGR)
        YP=YOR+S*SIN(ANGR)
        CALL PLOT (XP,YP,3)
        ANGR=110*PI/180
        XP=XOR+S*COS(ANGR)
        YP=YOR+S*SIN(ANGR)
        CALL PLOT (XP,YP,2)
        CALL PLOT(XOR,YOR,3)
        IF(S.EQ.TL11) GOTO 310
305     CONTINUE
310     CALL NEWPEN(2)
        S=0
        DO 315 I=1,200
        S=S+STEP
        IF(S.GE.TL12) S=TL12
        ANGR=110*PI/180
        XP=XOR+S*COS(ANGR)
        YP=YOR+S*SIN(ANGR)
        CALL PLOT (XP,YP,3)
        ANGR=120*PI/180
        XP=XOR+S*COS(ANGR)
        YP=YOR+S*SIN(ANGR)
        CALL PLOT (XP,YP,2)
        CALL PLOT(XOR,YOR,3)
        IF(S.EQ.TL12) GOTO 320
315     CONTINUE
320     CALL NEWPEN(2)
        S=0
        DO 325 I=1,200
        S=S+STEP
        IF(S.GE.TL13) S=TL13
        ANGR=120*PI/180
        XP=XOR+S*COS(ANGR)
        YP=YOR+S*SIN(ANGR)
        CALL PLOT (XP,YP,3)
        ANGR=130*PI/180
        XP=XOR+S*COS(ANGR)
        YP=YOR+S*SIN(ANGR)
        CALL PLOT (XP,YP,2)
        CALL PLOT(XOR,YOR,3)
        IF(S.EQ.TL13) GOTO 330
325     CONTINUE
330     CALL NEWPEN(2)
        S=0
        DO 335 I=1,200
        S=S+STEP
```

```
            IF(S.GE.TL14) S=TL14
            ANGR=130*PI/180
            XP=XOR+S*COS(ANGR)
            YP=YOR+S*SIN(ANGR)
            CALL PLOT (XP,YP,3)
            ANGR=140*PI/180
            XP=XOR+S*COS(ANGR)
            YP=YOR+S*SIN(ANGR)
            CALL PLOT (XP,YP,2)
            CALL PLOT(XOR,YOR,3)
            IF(S.EQ.TL14) GOTO 340
335         CONTINUE
340         CALL NEWPEN(2)
            S=0
            DO 345 I=1,200
            S=S+STEP
            IF(S.GE.TL15) S=TL15
            ANGR=140*PI/180
            XP=XOR+S*COS(ANGR)
            YP=YOR+S*SIN(ANGR)
            CALL PLOT (XP,YP,3)
            ANGR=150*PI/180
            XP=XOR+S*COS(ANGR)
            YP=YOR+S*SIN(ANGR)
            CALL PLOT (XP,YP,2)
            CALL PLOT(XOR,YOR,3)
            IF(S.EQ.TL15) GOTO 350
345         CONTINUE
350         CALL NEWPEN(2)
            S=0
            DO 355 I=1,200
            S=S+STEP
            IF(S.GE.TL16) S=TL16
            ANGR=150*PI/180
            XP=XOR+S*COS(ANGR)
            YP=YOR+S*SIN(ANGR)
            CALL PLOT (XP,YP,3)
            ANGR=160*PI/180
            XP=XOR+S*COS(ANGR)
            YP=YOR+S*SIN(ANGR)
            CALL PLOT (XP,YP,2)
            CALL PLOT(XOR,YOR,3)
            IF(S.EQ.TL16) GOTO 360
355         CONTINUE
360         CALL NEWPEN(2)
            S=0
            DO 365 I=1,200
            S=S+STEP
            IF(S.GE.TL17) S=TL17
            ANGR=160*PI/180
            XP=XOR+S*COS(ANGR)
            YP=YOR+S*SIN(ANGR)
            CALL PLOT (XP,YP,3)
            ANGR=170*PI/180
            XP=XOR+S*COS(ANGR)
            YP=YOR+S*SIN(ANGR)
            CALL PLOT (XP,YP,2)
            CALL PLOT(XOR,YOR,3)
            IF(S.EQ.TL17) GOTO 370
365         CONTINUE
370         CALL NEWPEN(2)
            S=0
            DO 375 I=1,200
            S=S+STEP
            IF (S.GE.TL18) S=TL18
            ANGR=170*PI/180
            XP=XOR+S*COS(ANGR)
            YP=YOR+S*SIN(ANGR)
            CALL PLOT (XP,YP,3)
            ANGR=180*PI/180
```

```
            XP=XOR+S*COS(ANGR)
            YP=YOR+S*SIN(ANGR)
            CALL PLOT (XP,YP,2)
            CALL PLOT(XOR,YOR,3)
            IF(S.EQ.TL18) GOTO 380
375         CONTINUE
380         CALL NEWPEN(8)
            RX=0
            RS=R/10
            DO 500 IX=1,10
            RX=RX+RS
            CALL PLOT (XOR,YOR,3)
            DO 400 IANG=0,180,2
            ANGR=IANG*PI/180
            XP=XOR+RX*COS(ANGR)
            YP=YOR+RX*SIN(ANGR)
            IF (IANG.EQ.0) CALL PLOT (XP,YP,3)
            CALL PLOT (XP,YP,2)
400         CONTINUE
500,        CONTINUE
            DO 600 IANG=0,180,10
            CALL PLOT (XOR,YOR,3)
            ANGR=IANG*PI/180
            XP=XOR+R*COS(ANGR)
            YP=YOR+R*SIN(ANGR)
            CALL PLOT (XP,YP,2)
600         CONTINUE
            CALL NEWPEN(8)
            CALL PLOT (0.0,0.0,3)
            CALL SYMBOL (.56,5.0,.2,TITLE,0.0,999)
            CALL SYMBOL (3.46,4.1,.2,'N',0.0,1)
            CALL SYMBOL (.26,.9,.2,'W',0.0,1)
            CALL SYMBOL (6.66,.9,.2,'E',0.0,1)
1000        FORMAT (A30)
1100        FORMAT (60A1)
1200        FORMAT (10F8.2)
            CALL PLOTND
            STOP
            END
```

We claim:

1. The method of analyzing topographical data to detect and plot geological fracture and/or bedding planes, comprising:

inputting a matrix of data derived from undulations of the earth into a computer memory wherein said matrix comprises point elevations over a geographical area corresponding to said matrix, comparing said point elevations within a predetermined detection area smaller than said geographical area to determine lower points identified as valley points, assembling adjacent valley points into strings, and said strings into vectors of substantially common direction, comparing vectors to determine vectors lying in substantially common planes, and outputting data identifying said substantially common planes.

2. A method of analyzing data points consisting of the elevation of the surface of the earth over a given area of the earth's surface, comprising inputting a matrix of data derived from measurement of the elevation of the earth's surface such that said matrix comprises point elevations over a geographical area corresponding to said matrix, comparing said point elevations within a predetermined detection area smaller than said geographical area to determine lower points identified as valley points, assembling adjacent valley points into strings, and said strings into vectors of substantially common direction, comparing vectors to determine vectors lying in substantially common planes, and outputting data identifying said substantially common planes.

* * * * *